United States Patent
Chang et al.

(10) Patent No.: US 10,152,524 B2
(45) Date of Patent: Dec. 11, 2018

(54) WAVEFRONT MUXING AND DEMUXING FOR CLOUD DATA STORAGE AND TRANSPORT

(71) Applicant: SPATIAL DIGITAL SYSTEMS, INC., Agoura Hills, CA (US)

(72) Inventors: Donald C. D. Chang, Thousand Oaks, CA (US); Juo-Yu Lee, Westlake Village, CA (US); Steve K Chen, Pacific Palisades, CA (US)

(73) Assignee: SPATIAL DIGITAL SYSTEMS, INC., Agoura Hills, CA (US)

( * ) Notice: Subject to any disclaimer, the term of this patent is extended or adjusted under 35 U.S.C. 154(b) by 106 days.

(21) Appl. No.: 13/953,715

(22) Filed: Jul. 29, 2013

(65) Prior Publication Data
US 2014/0081989 A1   Mar. 20, 2014

Related U.S. Application Data

(60) Provisional application No. 61/677,013, filed on Jul. 30, 2012, provisional application No. 61/679,781, (Continued)

(51) Int. Cl.
G06F 17/30 (2006.01)
G06F 11/10 (2006.01)
(Continued)

(52) U.S. Cl.
CPC .... *G06F 17/30569* (2013.01); *G06F 11/1076* (2013.01); *G06F 11/2058* (2013.01);
(Continued)

(58) Field of Classification Search
CPC .......... G06F 17/30598; G06F 21/6209; G06F 17/30153; G06F 17/30569; G06F 11/1076; G06F 11/2058; G06F 11/2071
(Continued)

(56) References Cited

U.S. PATENT DOCUMENTS 6,275,990 B1 * 8/2001 Dapper .................. G06F 17/14
                                                   348/E7.07
6,571,224 B1 * 5/2003 He et al. ........................ 706/8
(Continued)

OTHER PUBLICATIONS

Marc Alexa, "Linear combination of transformations", ACM, vol. 21 Issue 3, Jul. 2002, pp. 380-387.*

*Primary Examiner* — Alexander Khong
(74) *Attorney, Agent, or Firm* — Phuong-Quan Hoang

(57) ABSTRACT

Security on data storage and transport are important concerns on cloud computing. Wavefront multiplexing/demultiplexing process (WF muxing/demuxing) embodying an architecture that utilizes multi-dimensional waveforms has found applications in data storage and transport on cloud. Multiple data sets are preprocessed by WF muxing before stored/transported. WF muxed data is aggregated data from multiple data sets that have been "customized processed" and disassembled into any scalable number of sets of processed data, with each set being stored on a storage site. The original data is reassembled via WF demuxing after retrieving a lesser but scalable number of WF muxed data sets. In short, the WF muxed data storage solution enhances data security and data redundancy by, respectively, creating a new dimension to existing security/privacy methods and significantly reducing the storage space needed for data redundancy. In addition, WF muxing/demuxing methods enable a monitoring capability on the integrity of stored data.

21 Claims, 30 Drawing Sheets

Related U.S. Application Data filed on Aug. 6, 2012, provisional application No. 61/815,752, filed on Apr. 25, 2013.

(51) Int. Cl.
 *H04L 29/08* (2006.01)
 *G06F 11/20* (2006.01)
(52) U.S. Cl.
 CPC ......... *G06F 11/2071* (2013.01); *H04L 67/10* (2013.01); *G06F 2211/1028* (2013.01)
(58) Field of Classification Search
 USPC ........................................................ 707/748
 See application file for complete search history.

(56) References Cited

U.S. PATENT DOCUMENTS

| | | | | |
|---|---|---|---|---|
| 7,133,463 | B1* | 11/2006 | Amirkhany | G06F 17/141 370/210 |
| 2005/0259723 | A1* | 11/2005 | Blanchard | H04B 1/7075 375/146 |
| 2006/0280259 | A1* | 12/2006 | Alon | H04L 1/0033 375/295 |
| 2007/0238420 | A1* | 10/2007 | Legouable | H04L 1/0625 455/101 |
| 2009/0219021 | A1* | 9/2009 | Dai | G01R 33/5635 324/309 |
| 2010/0332401 | A1* | 12/2010 | Prahlad | G06F 17/3002 705/80 |
| 2011/0262023 | A1* | 10/2011 | Brabec | G06T 5/002 382/131 |
| 2011/0267482 | A1* | 11/2011 | Wetzstein et al. | 348/218.1 |
| 2011/0268225 | A1* | 11/2011 | Cronie et al. | 375/296 |
| 2012/0016845 | A1* | 1/2012 | Bates | G06F 3/0608 707/692 |
| 2013/0060804 | A1* | 3/2013 | Bernbo | G06F 17/30206 707/769 |
| 2013/0121568 | A1* | 5/2013 | Krishnan et al. | 382/162 |
| 2013/0151653 | A1* | 6/2013 | Sawicki | G06F 15/17331 709/216 |
| 2013/0257646 | A1* | 10/2013 | Gopalsami et al. | 342/179 |

\* cited by examiner

Fig. 2C

Writing and Reading to / from 4 storages; Example 1

| Original data | 1, 2, 3, 4, 5, 6, 7, 8, 9, 10, 11, 12, | | |
|---|---|---|---|
| Storage locations | Stored data via a Writer | | |
| | Method 1 | Method 2 | Method 3 |
| Cloud storage 1 | 1, 5, 9 | 10, 26, 42 | 6, 15, 24, 33 |
| Cloud storage 2 | 2, 6, 10 | -2, -2, -2 | 2, 5, 8, 11 |
| Cloud storage 3 | 3, 7, 11 | -4, -4, -4 | 0, 3, 6, 9 |
| Cloud storage 4 | 4, 8, 12 | 0, 0, 0 | -4, -7, -10, -13 |
| | Reader 1 | Reader 2 | Reader 3 |
| | all 4 | all 4 | 3 out of 4 |
| Recovered Data | 1, 2, 3, 4, 5, 6, 7, 8, 9, 10, 11, 12, | | |

Fig. 9A

Writing and Reading to / from 4 storages; Example 3

| Original data | video1 (11.7 MB), video2 (11.7 MB), video3 (11.7 MB) | | |
|---|---|---|---|
| Storage locations | Stored data via a Writer | | |
| | Method 1 | Method 2 | Method 3 |
| Cloud storage 1 | n/a | n/a | 13.3 MB |
| Cloud storage 2 | n/a | n/a | 13.3 MB |
| Cloud storage 3 | n/a | n/a | 13.3 MB |
| Cloud storage 4 | n/a | n/a | 13.3 MB |
| | Reader 1 | Reader 2 | Reader 3 |
| | n/a | n/a | 3 out of 4 |
| Recovered Data | video1 (11.7 MB), video2 (11.7 MB), video3 (11.7 MB) | | |

Fig. 9C

WAVEFRONT MUXING AND DEMUXING FOR CLOUD DATA STORAGE AND TRANSPORT

RELATED APPLICATION

This application claims priority to provisional application No. 61/677,013, filed on Jul. 30, 2012, provisional application No. 61/679,781, filed on Aug. 6, 2012, and provisional application No. 61/815,752, filed on Apr. 25, 2013, all of which are incorporated herein by reference in their entireties.

BACKGROUND OF THE DISCLOSURE

Field of the Disclosure

The disclosure relates to methods and architectures of distributed data storage and data streaming using Wavefront multiplexing (WF muxing). It is focused to data redundancy, storage reliability, and survivability. The WF muxing techniques will use less memory space to achieve better redundancy, reliability, and survivability as compared to conventional techniques of (1) segmenting, or striping, a stream of data into M substreams, (2) creating additional N redundancy among the M substreams via parity or equivalent techniques, and (3) encrypting all M+N sets of substreams before storing them in M+N separated data storage space. In addition, these techniques enable the capabilities of monitoring data integrity of stored data sets without scrutinizing the stored data sets themselves. The same techniques can be extended to data streaming via cloud.

Brief Description of the Related Art

The existing RAID (redundant array of independent disks) techniques have been used extensively for data storage technologies that combine multiple disk drive components into a logical unit. Data is distributed across the drives in one of several ways called "RAID levels", depending on what level of redundancy and performance (via parallel communication) is required. RAID is an example of storage virtualization and was first defined in 1987 by David Patterson, Garth A. Gibson, and Randy Katz at the University of California, Berkeley. Marketers representing industry RAID manufacturers later attempted to reinvent the term to describe a redundant array of independent disks as a means of dissociating a low-cost expectation from RAID technology. The techniques used to provide redundancy in a RAID array is through the use of mirroring or parity.

Mirroring is one of the two data redundancy techniques used in RAID (the other being parity). In a redundant array system using mirroring, all data in the system is written simultaneously to two hard disks instead of one; thus the "mirror" concept. The principle behind mirroring is that this 100% data redundancy provides full protection against the failure of either of the disks containing the duplicated data. Mirroring setups always require an even number of drives for obvious reasons. The chief advantage of mirroring is that it provides not only complete redundancy of data, but also reasonably fast recovery from a disk failure. Since all the data is on the second drive, it is ready to use if the first one fails. The chief disadvantage of mirroring is expense: that data duplication means half the space in the redundant array is "wasted" so a user must buy twice the capacity that the user wants to end up with in the array. Performance is also not as good as some other techniques.

Duplexing is an extension of mirroring that is based on the same principle as that technique. Like in mirroring, all data is duplicated onto two distinct physical hard drives. Duplexing processing goes one step beyond mirroring processing, however, in that a duplexing processing also duplicates the hardware that controls the two hard drives (or sets of hard drives). So if mirroring on two hard disks is implemented, the two hard disks would both be connected to a single host adapter or controller. If a "duplexing" processing is implemented, one of the drives would be connected to one adapter and the other to a second adapter.

The main performance-limiting issues with disk storage relate to the slow mechanical components that are used for positioning and transferring data. Since a RAID array has many drives in it, an opportunity presents itself to improve performance by using the hardware in all these drives in parallel. For example, if a large file is to be read, instead of via a single hard disk, it is much faster to have it chopped up into pieces, some of the pieces stored on each of the drives in an array, and then all the disks are used to read back the file when needed. This technique is called striping, after the pattern that might be visible if you could see these "chopped up pieces" on the various drives with a different color used for each file. It is similar in concept to the memory performance-enhancing technique called interleaving. Striping can be done at the byte level, or in blocks. Byte-level striping means that the file is broken into "byte-sized pieces". The first byte of the file is sent to the first drive, then the second to the second drive, and so on. Sometimes byte-level striping is done as a sector of 512 bytes. Block-level striping means that each file is split into blocks of a certain size and those are distributed to the various drives. The size of the blocks used is also called the stripe size (or block size, or several other names), and can be selected from a variety of choices when the array is set up.

Mirroring is a data redundancy technique used by some RAID levels, in particular RAID level 1, to provide data protection on a RAID array. While mirroring has some advantages and is well-suited for certain RAID implementations, it also has some limitations. It has a high overhead cost, because fully 50% of the drives in the array are reserved for duplicate data; and it doesn't improve performance as much as data striping does for many applications. For this reason, a different way of protecting data is provided as an alternate to mirroring. It involves the use of parity information which is redundancy information calculated from the actual data values. The term "parity" has been used in the context of system memory error detection; in fact, the parity used in RAID is very similar. The principle behind parity is simple: take "N" pieces of data, and from them, compute an extra piece of data. Take the "N+1" pieces of data and store them on "N+1" drives. If any one of the "N+1" pieces of data is lost, all pieces of data can be recovered from the "N" remaining drives, regardless of which piece is lost.

Parity protection is used with striping, and the "N" pieces of data are typically the blocks or bytes distributed across the drives in the array. The parity information can either be stored on a separate, dedicated drive, or be mixed with the data across all the drives in the array.

Compared to mirroring, parity (used with striping) has some advantages and disadvantages. The most obvious advantage is that parity protects data against any single drive in the array failing without requiring the 50% "waste" of mirroring; only one of the "N+1" drives contains redundancy information. (The overhead of parity is equal to (100/N) % where N is the total number of drives in the array.) Striping with parity enables advantage of the performance advantages of striping. The chief disadvantages of striping with parity relate to complexity: all those parity bytes have to be computed—millions of them per second!—and that takes computing power.

Norman Ken Ouchi at IBM was awarded a 1978 U.S. Pat. No. 4,092,732 titled "System for recovering data stored in failed memory unit". The claims for this patent describe what would later be termed RAID 5 with full stripe writes. This 1978 patent also mentions that drive mirroring or duplexing (what would later be termed RAID 1) and protection with dedicated parity that would later be termed RAID 4 were prior art at that time.

Cloud storage refers to saving data to a storage system maintained by a third party. Instead of storing information to a user computer's hard drive or other local storage device, the user saves it to a remote database. The Internet provides the connection between the user's computer and the database. In general, cloud storage is convenient and offers more flexibility. However, the two biggest concerns about cloud storage are reliability and security [1, 2, 3, 4]. Clients aren't likely to entrust their data to another company without a guarantee that they'll be able to access their information whenever they want and no one else will be able to get at it. To secure data, most systems use a combination of techniques, including (1) encryption, using a complex algorithm to encrypt information without additional memory size, (2) authentication, creating a user name and password, and (3) authorization; listing the people who are authorized to access information stored on the cloud system. As to reliability, it is generally true that cloud storage system reliability is significantly enhanced with a redundant storage site. Redundancy is to ensure clients that they could access their information at any given time, even if one of many data sites fails.

There are two more concerns. Many operators offer secured and encrypted storage services. However, secured files are only encrypted on the server side and therefore a client has to rely on honesty of the server operator. The second is concerns about the right of stored data; which are under debate.

SUMMARY OF THE DISCLOSURE

This invention application addresses enhanced privacy, reliability and survivability of stored (image) data, and (image) data transports on cloud via wavefront multiplexing (WF muxing)/demultiplexing (demuxing) methods and techniques. Since stored on multiple image data will be preprocessed on client sides, each of the stored data on cloud is a multiplexed (muxed) data set individually which is unintelligible by itself. Therefore, the proposed approaches shall remove the concerns on integrity confidence of operators, and those on the right of stored data. Camouflaged (image) cloud data storage and transport is one highlight of this application. Embodiments of "writing" and "reading" processes will be presented. "Writing" features a process on multiple original images concurrently via WF muxing transformations, generating WF muxed (image) data to be stored on cloud. A "reading" process corresponds to a WF demuxing transformation on WF muxed (image) data stored on cloud, reconstituting original (image) data sets.

Wavefront multiplexing/demultiplexing (WF muxing/demuxing) process features an algorithm invented by Spatial Digital Systems (SDS) for satellite communications where transmissions demand a high degree of power combining, security, reliability, and optimization [1,2]. WF muxing/demuxing, embodying an architecture that utilizes multidimensional transmissions, has found applications in fields beyond the satellite communication domain. One such application is data storage on cloud where privacy, data integrity, and redundancy are important for both data transports and data storage.

A method for storing data in IP cloud comprises: transforming multiple first data sets into multiple second data sets at a transmitting site, wherein one of said second data sets comprises a weighted sum of said first data sets; storing said second data sets in an IP cloud via an Internet; and storing multiple links linking to said second data sets at said transmitting site.

In accordance with an embodiment, the method may comprise storing said second data sets at a receiving site via Internet in accordance with said links.

In accordance with an embodiment, the method may comprise transforming said second data sets into multiple third data sets at a receiving site, wherein one of said third data sets comprises a weighted sum of said second data sets.

In accordance with an embodiment, one of said second data sets carries an image with intensities mainly controlled by one of said first data sets.

A data processing method comprises: transforming multiple first data sets and a known data set into multiple second data sets at a transmitting site, wherein one of said second data sets comprises a weighted sum of said first data sets; and recovering a third data sets from some of said second data sets and said known data set at a receiving site, wherein one of said third data sets comprises a weighted sum of said some of said second data sets.

A method for storing data in IP cloud, comprises: transforming multiple first data sets into multiple second data sets at a transmitting site, wherein one of said second data sets comprises a weighted sum of said first data sets and carries an image with intensities mainly controlled by one of said first data sets.

BRIEF DESCRIPTION OF THE DRAWINGS

The drawings disclose illustrative embodiments of the present disclosure. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same reference number or reference indicator appears in different drawings, it may refer to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings:

FIG. 2C depicts a small leading portion of one of 8 stored WF muxed data sets D1-D8 on cloud of a "wild life" video clip opened by Notepad.

FIG. 9A depicts an example of a numerical operation on a set of data with three different methods for cloud storages.

FIG. 9C summaries the required storage size on cloud for storing and/or transporting three independent files cloud with building redundancy via orthogonal WF muxing/demuxing transformations.

DETAILED DESCRIPTION OF THE INVENTION

Figure 1:
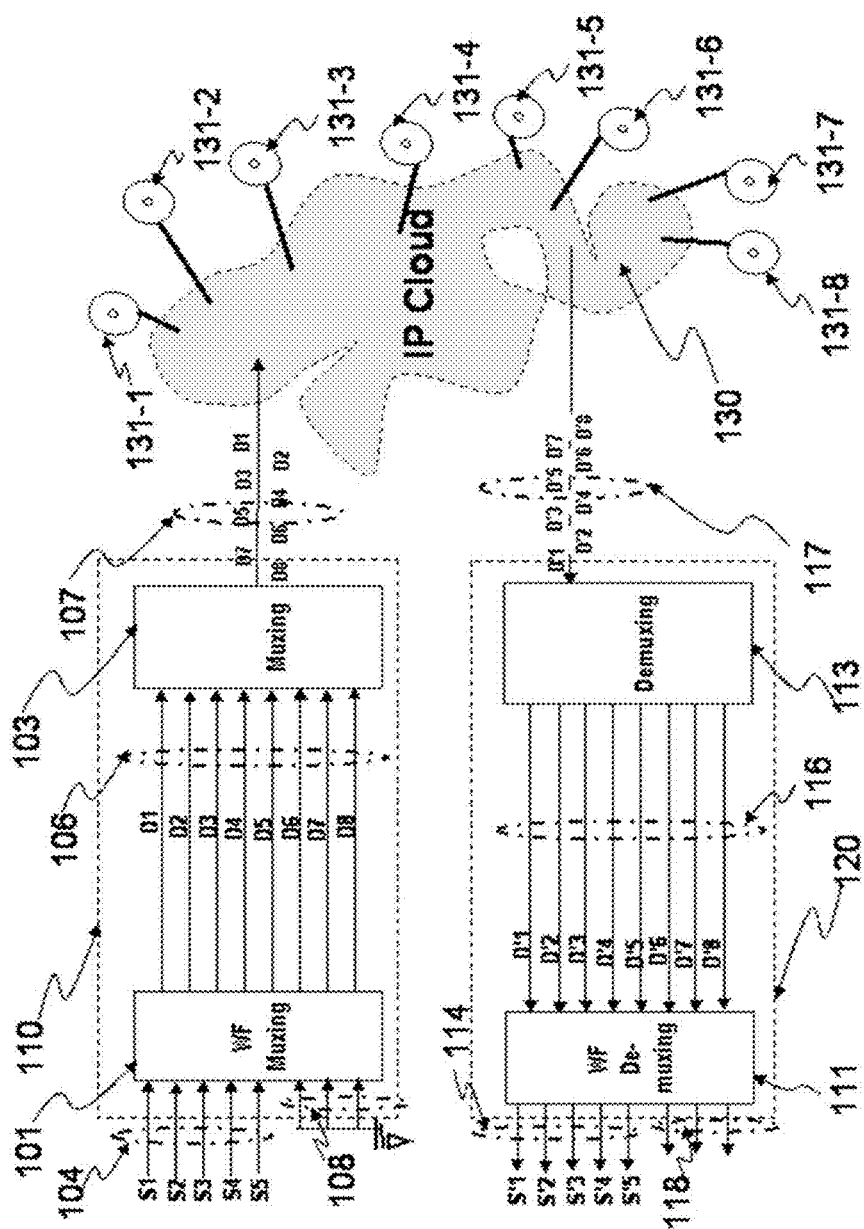
FIG. 1 depicts a block diagram on distributed data storage for 5 independent data sets with nearly identical data size via Wavefront muxing techniques and associated retrieval processing from multiple stored data sets.

The present invention relates to distributed data storages with built-in redundancy for a single stream data subdivided into M multiple data substreams or M independent data streams, converted into WF muxed domain with M+N output wavefront components (wfcs), and stored these M+N wfc output data into N+M separated data storage sets, where N and M are integers and N>0. As a result, the stored data sets are wavefront components in forms of linear combinations of the data sets, instead of the data sets themselves.

Let us use an example to illustrate the proposed procedures. A data set S with 6 numerical data points S=[1, 2, 3, 4, 5, 6] will be stored in 4 memory sets through the following procedures;

Segmenting S, or striping S, into 3 segments a, b, and c, each of which consists of 2 data points:

$$a=[a1,a2]=[1,2];$$

$$b=[b1,b2]=[3,4]; \text{and}$$

$$c=[c1,c2]=[5,6]$$

generating a null segment n, where n=[n1, n2]=[0, 0]

putting a, b, c, and n through a Wavefront multiplexing process (a 4-to-4 Hadamard matrix), and generating 4 sets of wavefront components (wfcs):

wfc_a=[8,12];

wfc_b=[3,4];

wfc_c=[−1,0], and wfc_d=[−7,−8]

where the 4-to-4

$$\text{Hadamard Matrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

The 4 sets of wfcs, i.e. wfc_a, wfc_b, wfc_c and wfc_d, may be stored in 4 separated memory sets, such as 4 individual optical disks or 4 individual hard disks for cloud storage, via Internet transmission; the memory sets may be placed in different locations.

When retrieving, the data set S with 6 data points can be restored if 3 of the four stored data sets are available.

Alternatively, without losing generality, let us assume M=6 and N=2 for the following example. As a result of a (N+M)-to-(N+M) WF muxing, each memory set stores an individual sum of weighted M (M=6) data substreams, or equivalently a linear combination of all M (M=6) data substreams. Each substream features a unique weighting distribution in the N+M (N+M=8) memory sets. There are M (M=6) weighting components among the M (M=6) data substreams in a memory set, and these M (M=6) weighting components are different from one memory set to another. There are M weighting distributions in a M+N dimension, which are mutually orthogonal to one another in the N+M dimensional space.

Accordingly, for performing the above WF muxing, a wavefront multiplexer (WF muxer) may be provided with (N+M) inputs, e.g. eight inputs in this example from eight input data sets respectively, and (N+M) outputs, e.g. eight outputs, i.e. output data sets, in this example, each of which is transmitted via Internet to and stored in one of eight separated memory sets, such as eight individual optical disks or eight individual hard disks in the cloud for cloud storage. Each of the outputs may be a linear combination of the inputs each weighted by a corresponding weighting parameter. Each of the outputs contains information associated with all of the inputs.

The present invention also relates to distributed data storages with built-in redundancy for multiple (M) independent data streams concurrently converted into WF muxed domain with M+N output wavefront components (wfcs), and stored these M+N wfc output data into N+M separated data storage sets, where N and M are integers and N>0. As a result, (1) each memory set stores a weighted sum of the M independent data streams, i.e. a linear combination of all the M independent data streams, and (2) each data stream features a unique weighting distribution in the N+M memory sets. There are M weighting distributions, which are mutually orthogonal to one another in the N+M dimensional space. Each dimension is associated to an output of the WF muxer.

When each of the input data sets of a WF muxer feature, a size of 100 MB, and each of the output data sets of the WF muxer will then feature about (1+a)*100 MB. The overhead constant, i.e. a, can be designed to be about 15% or less. For example, if a 8-to-8 WF muxer has eight inputs in parallel, seven of which comes from input data sets and one of which comes from a redundant data set for redundancy, and eight outputs in parallel, each of which is a linear combination of the eight inputs weighted by weighting parameters respectively, the overhead constant, i.e. a, can be about 14.3%. The total input data sets with a size of 700 MB will be stored in 8 physical separated memory sites or local folders, i.e. memory sets at a transmitting site, synchronized automatically in series with 8 respective data storage sites in IP cloud, which may be provided by different cloud storage providers respectively, via Internet. Each memory site features a storage of the size of (1+a)*100 MB for each of the output data sets. This storage architecture via WF muxing will have the following feature:

Distributed and securely stored data is processed via "summing and weighting" independent data, not encrypted nor encoded;

Each input data set is stored eight times in 8 different locations with a unique weighting distribution;

Different input data sets are stored in the same memory locations via various weighting distributions which are mutually orthogonal to one another.

As a result, the stored data, i.e. output data sets, in each storage site, i.e. memory sets, is a linear combination of all 7 original input data sets. With the seven input data sets featuring a total size of 700 MB, the eight output data sets only featuring a total size of about 800 MB may be used to recover and securely backup the seven input data sets via only about 14.3%, i.e. overhead constant, of redundant memory size. In another case, the redundant memory size may be less than 50%, or even less than 20%.

With built-in redundancy for survivability, only 7 of the 8 stored data sets, i.e. output data sets, is required to reconstruct 7 data sets substantially equivalent the 7 original data sets, i.e. input data sets, if the 7 stored data sets are not contaminated.

The distributed data sets, i.e. output data sets, may be monitored for data integrity via recovered diagnostic signals, i.e. redundant data sets recovered at a port of a WF demuxing processor, without examining the data sets themselves, substantially equivalent to the input data sets, recovered at the other ports of the WF demuxing processor.

The present invention discloses operation concepts, methods and implementations of distributed data storages via wavefront multiplexing in Cloud storage as depicted in FIG. 1. Similar techniques can be applied to video streaming, secured mail services, secured file transfers, and other applications via Internet Clouds. The embodiments of present inventions comprise three important segments including the pre-storage processing, i.e. the above WF muxing, at a user end, multiple physical data storages, i.e. the above memory sets, in cloud, and a post-retrieval processing, i.e. the above WF demuxing, at the user end. We will use a single user for both pre-storage processing and a post-retrieval processing as an example for illustrating the operation concepts. In principle, the pre-storage processing and the post-retrieval processing may be performed in user segments and performed in equipment at the user end or in storage facilities of an operator. The operator will aggregate the data storage sets in cloud distributed over remote networks.

Embodiment 1

FIG. 1 depicts an operation concept of using WF multiplexing techniques for storing 5 sets of input data 104, S1, S2, S3, S4, and S5 in 8 physically separated data storage sites, i.e. memory sets, 131-1 to 131-8 connected through IP Cloud or Internet. It also shows a retrieval process for the 5 sets of input data. There are three segments including (1) a pre-storage processing 110, (2) cloud storage 130 including multiple of the memory sets at downstream of the pre-storage processing 110, and (3) post retrieval processing 120 at downstream of the cloud storage 130. The storage sites, i.e. memory sets, 131-1 to 131-8 may feature nearly equal data storage space.

Pre-Storage Processing 110:

In the pre-storage processing, an 8-to-8 WF muxer 101 is used to convert 5 sets of input data 104, i.e. S1, S2, S3, S4 and S5, to 8 sets of output data, i.e. D1, D2, D3, D4, D5, D6, D7 and D8, where:

$$D1 = S1+S2+S3+S4+S5 \qquad (1\text{-}1)$$

$$D2 = S1-S2+S3-S4+S5 \qquad (1\text{-}2)$$

$$D3 = S1+S2-S3-S4+S5 \qquad (1\text{-}3)$$

$$D4 = S1-S2-S3+S4+S5 \qquad (1\text{-}4)$$

$$D5 = S1+S2+S3+S4-S5 \qquad (1\text{-}5)$$

$$D6 = S1-S2+S3-S4-S5 \qquad (1\text{-}6)$$

$$D7 = S1+S2-S3-S4-S5 \qquad (1\text{-}6)$$

$$D8 = S1-S2-S3+S4-S5 \qquad (1\text{-}8)$$

A 8-to-8 Hadamard matrix HM, in which all elements are "1" or "−1" only, or other Fourier full-rank matrix is chosen for the 8-to-8 WF muxing. Equations (1-1) to (1-8) can be written in a matrix form as $$D = HM * S \qquad (2)$$

where: $D = [D1, D2, D3, D4, D5, D6, D7, D8]^T \qquad (2\text{-}1)$ $$HM = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix} \qquad (2\text{-}2)$$

$$S = [S1, S2, S3, S4, S5, 0, 0, 0]^T \qquad (2\text{-}3)$$

The input ports of a WF muxer 101 are referred to as slices, and its output ports are wavefront components (wfc's). In this example, the five input data sets 104, i.e. S1, S2, S3, S4 and S5, are connected to the input ports, i.e. slice 1, slice 2, slice 3, slice 4 and slice 5, of the WF muxer 101 respectively. The 8 output data sets 106, i.e. D1-D8, are connected to the output ports, i.e. wfc1-wfc8, of the WF muxer 101 respectively. When the WF muxer is connected by a unity input data set only, e.g. S4=[1] through the input port of slice 4, the corresponding outputs of the WF muxer are written as:

$$D1 = S1+S2+S3+S4+S5 = [1] \qquad (3\text{-}1)$$

$$D2 = S1-S2+S3-S4+S5 = [-1] \qquad (3\text{-}2)$$

$$D3 = S1+S2-S3-S4+S5 = [-1] \qquad (3\text{-}3)$$

$$D4 = S1-S2-S3+S4+S5 = [1] \qquad (3\text{-}4)$$

$$D5 = S1+S2+S3+S4-S5 = [1] \qquad (3\text{-}5)$$

$$D6 = S1-S2+S3-S4-S5 = [-1] \qquad (3\text{-}6)$$

$$D7 = S1+S2-S3-S4-S5 = [-1] \qquad (3\text{-}7)$$

$$D8 = S1-S2-S3+S4-S5 = [1] \qquad (3\text{-}8)$$

The 8 output data sets are represented as a column vector or an output column matrix. The elements of the output matrix D, under the condition, become identical to the 8 elements of the 4$^{th}$ column in the HM. In this case, the wavefront vector of the output data sets representing the matrix D is referred to as the 4$^{th}$ wavefront vector (WFV), or WFV4. Similarly, the wavefront vector associated with the k$^{th}$ input port, Slice k, is referred to as k$^{th}$ WFV or WFVk. A WF vector specifies the distribution of a set of input data among the 8-output ports or among 8 aggregated output data sets, i.e. D1, D2, D3, D4, D5, D6, D7 and D8.

In general an 8-to-8 WF muxer, such as the WF muxer 101, features 8 orthogonal WFV's. Let us define a coefficient wjk of a WF transformation performed by the WF muxer 101 to be the coefficient at the j$^{th}$ row and k$^{th}$ column of the WF muxer 101. A WF vector of the WF muxer 101 featuring a distribution among the 8 outputs, i.e. D1-D8 at the 8 WF component ports wfc1-wfc8, is defined as an 8-dimensional vector. They are mutually orthogonal.

The first 5 WFVs of the WF muxer 101 are:

$$WFV1 = [w11, w21, w31, w41, w51, w61, w71, w81]^T \qquad (4.1)$$

$$WFV2 = [w12, w22, w32, w42, w52, w62, w72, w82]^T \qquad (4.2)$$

$$WFV3 = [w13, w23, w33, w43, w53, w63, w73, w83]^T \qquad (4.3)$$

$$WFV4 = [w14, w24, w34, w44, w54, w64, w74, w84]^T \qquad (4.4)$$

$$WFV5 = [w15, w25, w35, w45, w55, w65, w75, w85]^T \qquad (4.5)$$

S1, S2, S3, S4, and S5 are "attached" to 5 WF vectors by respectively connected to the first five input ports of the WF muxing device, i.e. WF muxer, 101. There are 3 remaining WFVs, i.e. WFV6, WFV7 and WFV8, which are not "utilized" in this illustration. All components of the 8 orthogonal WFVs are related to input and output port numbers or (spatial) sequences, but are independent from the input and output data sets.

The arithmetic operations of "linear combinations" may operate on blocks of data after all inputs are aligned as digital streams sample-after-sample for various inputs. A "byte" of data may be "selected" as a sample and a block of X samples, i.e. 7 samples or 7 bytes, of a digital data stream will be treated as a numerical number for calculations in WF muxing transformations. The 7 samples or bytes may be the 7 respective inputs of the 8-to-8 WF muxer. A block size of X+1 samples, i.e. 8 samples or 8 bytes in this case, will be reserved for the results of arithmetic operations on a number of the digital streams to avoid issues of overflows and underflows at the outputs of the WF muxing transformations. There shall be 12.5% in data size overhead of the 7 byte arithmetic operations, with respect to the results in 8 byte forms in the outputs. In different embodiments, we may choose blocks with a block length of 99 bytes for arithmetic operation, i.e. X=99, reducing the operation overhead to 1%.

There are other choices in selecting data blocks for arithmetic operations of linear combinations or weighted sums in the WF muxing transformations. For imaging processing, a pixel by pixel as operation blocks may be more important preserving unique features for some applications, or a row or a column of pixels as a data block for efficient usage of storage. In this case, each seven pixels, for 7 respective inputs of the 8-to-8 WF muxer, may be set as a block. Alternatively, each block may be set with greater than 3 pixels for greater than 3 inputs of a WF muxer. Alternatively, each block may be set with greater than 100 pixels for greater than 100 inputs of a WF muxer. In acoustic (music and audio data) processing, sample-by-sample as operation blocks offer flexibility in data storage and transport on cloud. In this case, each seven samples, for 7 respective inputs of the 8-to-8 WF muxer, may be set as a block. Alternatively, each block may be set with greater than 3 samples for greater than 3 inputs of a WF muxer. Alternatively, each block may be set with greater than 100 samples for greater than 100 inputs of a WF muxer.

The 8 output data sets 106, i.e. D1-D8, at the 8 wfc ports of the WF muxer 101 feature 8 different linear combinations of the 5 input data sets weighted by 5 respective weighting parameters in one of 8 wavefront vectors each for a corresponding one of the linear combinations, or 8 aggregated data sets each containing one of the 8 linear combinations. Each aggregated data set is a weighted sum of the 5 input data sets, which are completely independent to one another; for example, one of the input date sets may be a power point presentation, another of the input data sets may be a multimedia data file, the third one of the input data sets may be a word document, and so on. As a result, each of the 8 aggregated data sets D1-D8 features a result of structured arithmetic operations (weighting, or multiplying, and summing) on the 5 independent data sets S1 -S5. The 8 aggregated or WF muxed video substreams D1-D8 appear as 8 respective data sets with random numbers. The muxing processor 103, such as time, frequency or code domain multiplexer, will allow the 8 pre-processed data sets, i.e. the output data sets D1 -D8 from the WF muxer 101 in parallel, to be muxed based on time, frequency or code and delivered in series through a single pipe, or communication output port 107 to various data storage sites 131-1 through 131-8 in IP Cloud 130 via Internet.

Cloud Storage 130:

As shown in FIG. 1, the five independent data sets 104, i.e. S1, S2, S3, S4 and S5, and three independent data sets 108 are muxed by the WF muxer 101 into eight data sets D1-D8 to be stored in 8 local folders, i.e. memory sets at a transmitting site, synchronized automatically in series with 8 respective data storage or mirror sites 131-1 through 131-8 in IP cloud 130, which may be provided by different cloud storage providers respectively, via Internet. Furthermore, multiple links linking to the eight data sets stored in the eight respective data storage or mirror sites 131-1 through 131-8 may be passed to one or more of the data storage or mirror sites 131-1 through 131-8 and/or stored in the transmitting site. Some of the data sets D1-D8 may be stored locally at the transmitting site. The output data sets from the WF muxer 101 are in forms of streams of numerical numbers as results of 8 different linear combinations of the same five data sets. Each of the 8-storage sites 131-1, 131-2, 131-3, 131-4, 131-5, 131-6, 131-7, and 131-8, i.e. memory sets, only stores an assigned one of the 8 WF muxed data sets 106, i.e. the output data sets. The data storage sites 131-1 through 131-8 may store the output data sets 106, i.e. D1-D8, respectively. The 8 processed data sets, or WF muxed data sets 106, are the output data sets, i.e. D1, D2, D3, D4, D5, D6, D7 and D8. Each of the WF muxed data sets 106 is not comprehensible, and/or may appear with misleading information.

Post Retrieval Processing 120:

Referring to FIG. 1, the post retrieval processor 120 may include a demuxing processor 113, such as time, frequency or code domain demultiplexer, that will recover data sets 116, i.e. D'1-D'8, in parallel based on time, frequency or code from the data sets, stored in 8 separated local folders, i.e. memory sets in a local memory device at a receiving site, synchronized automatically in series with the 8 respective storage or mirror sites 131-1, 131-2, 131-3, 131-4, 131-5, 131-6, 131-7 and 131-8 in IP Cloud storage 130 via Internet optionally in accordance with the links passed from one or more of the storage or mirror sites 131-1 through 131-8 or transmitting site to the receiving site, so as to enable users to retrieve original input data sets S'1-S'5, substantially equivalent to the input data sets S1-S5 respectively, by a WF demuxing transformation 111. The data sets 116, i.e. D'1-D'8, may be substantially equivalent to the data sets 106, i.e. D1-D8, respectively.

Referring to FIG. 1, in the post-retrieving processing, a 8-to-8 WF demuxer 111 is used to convert 8 sets of stored data sets 116, i.e. D'1, D'2, D'3, D'4, D'5, D'6, D'7 and D'8, substantially equivalent to the output data sets, i.e. D1, D2, D3, D4, D5, D6, D7 and D8, respectively if not contaminated, into 5 sets of recovered outputs 114, i.e. S'1, S'2, S'3, S'4 and S'5, substantially equivalent to the input data sets, i.e. S1, S2, S3, S4 and S5, respectively, where $$S'1=(D'1+D'2+D'3+D'4+D'5+D'6+D'7+D'8)/8 \quad (5\text{-}1)$$

$$S'2=(D'1-D'2+D'3-D'4+D'5-D'6+D'7-D'8)/8 \quad (5\text{-}2)$$

$$S'3=(D'1+D'2-D'3-D'4+D'5+D'6-D'7-D'8)/8 \quad (5\text{-}3)$$

$$S'4=(D'1+D'2+D'3+D'4+D'5+D'6+D'7+D'8)/8 \quad (5\text{-}4)$$

$$S'5=(D'1+D'2+D'3+D'4-D'5-D'6-D'7-D'8)/8 \quad (5\text{-}5)$$

$$S'6=(D'1-D'2+D'3-D'4-D'5+D'6-D'7+D'8)/8 \quad (5\text{-}6)$$

$$S'7=(D'1+D'2-D'3-D'4-D'5-D'6+D'7+D'8)/8 \quad (5\text{-}7)$$

$$S'8=(D'1+D'2+D'3+D'4+D'5+D'6+D'7+D'8)/8 \quad (5\text{-}8)$$

A 8-to-8 Hadamard matrix or other inverse Fourier full-rank matrix with scaling factor of 1/8 may be chosen as the 8-to-8 WF demuxer. The matrix elements of 8-to-8 Hadamard matrix feature "1" or "−1" only. Equations (5-1) to (5-8) may also be written in a matrix form as $$S'=HM*D \quad (6)$$

Where: $D=[D'1,D'2,D'3,D'4,D'5,D'6,D'7,D'8]^T$ (6-1)

$$S'=[S'1,S'2,S'3,S'4,S'5,S'6,S'7,S'8]^T \quad (6\text{-}2)$$

and the 8-to-8 Hadamard matrix HM is expressed in equation (2-2).

The input ports of a WF demuxer 111 are referred to as wavefront components (wfcs), i.e. wfc1', wfc2', wfc3', wfc4', wfc5', wfc6', wfc7' and wfc8', and its output ports are slices, i.e. slice1', slice2', slice3', slice4', slice5', slice6', slice7' and slice8'. In this example, the 8 input data sets 116, i.e. D'1-D'8, are connected to its input ports wfc1'-wfc8' of the WF demuxer 111, respectively. The five retrieved data sets 114, i.e. S'1-S'8, are connected to its output ports, i.e. slice1' through slice5', respectively. The three retrieved data sets 118, i.e. S'6-S'8 are connected to its output ports, i.e. slice6' through slice8', respectively. Each of the outputs or retrieved data sets 114 and 118, i.e. S'1-S'8, may be a linear combination of the inputs 116, i.e. D'1-D'8, each weighted by a corresponding weighting parameter. Each of the outputs or retrieved data sets 114 and 118, i.e. S'1-S'8, contains information associated with all of the inputs 116, i.e. D'1-D'8.

When the retrieved data sets of S'6, S'7, and S'8 118 feature data sets with zeros or negligibly small numbers representing empty data sets, and they are the indications that the retrieved data sets 114 have not been contaminated in the storage sites 131 of Cloud storage 130 or during transports in the storing and retrieving processes 107 and 117. As a result, the retrieved data sets of S'1, S'2, S'3, S'4 and S'5 will be identified with confidence as the retrieved data sets of S1, S2, S3, S4, and S5, respectively. On the other hand, when the retrieved data sets of S'6, S'7, and S'8 118 feature non-zeros or numbers which are non-negligibly small, representing data sets which are not empty sets, and implying the retrieved data sets 114, i.e. S'1, S'2, S'3, S'4 and S'5, are contaminated either in storage sites 131-1 through 131-8 in the Cloud storage 130 or during transportation for the data sets D1-D8 from the WF muxer 101 to the Cloud storage 130 or for the data sets D'1-D'8 from the Cloud storage 130 to the WF demuxer 111.

This feature will be used as data integrity monitoring for storages on cloud based on the outputs or retrieved data sets 118 of S'6, S'7 or S'8 from the WF demuxer 111. Operators may not have access to the outputs 114 or retrieved data sets 118 of, S'3, S'4 and S'5 at all. These operators will be able to monitor the integrity of the 5 retrieved data sets 114 of S'1, S'2, S'3, S'4 and S'5 stored on cloud without accessing the retrieved data sets 114 of S'1, S'2, S'3, S'4 and S'5 themselves.

Data storage/retrieval processing 100 comprises of both the pre-storage processing 110 and post retrieval processing 120.

Figure 1A:
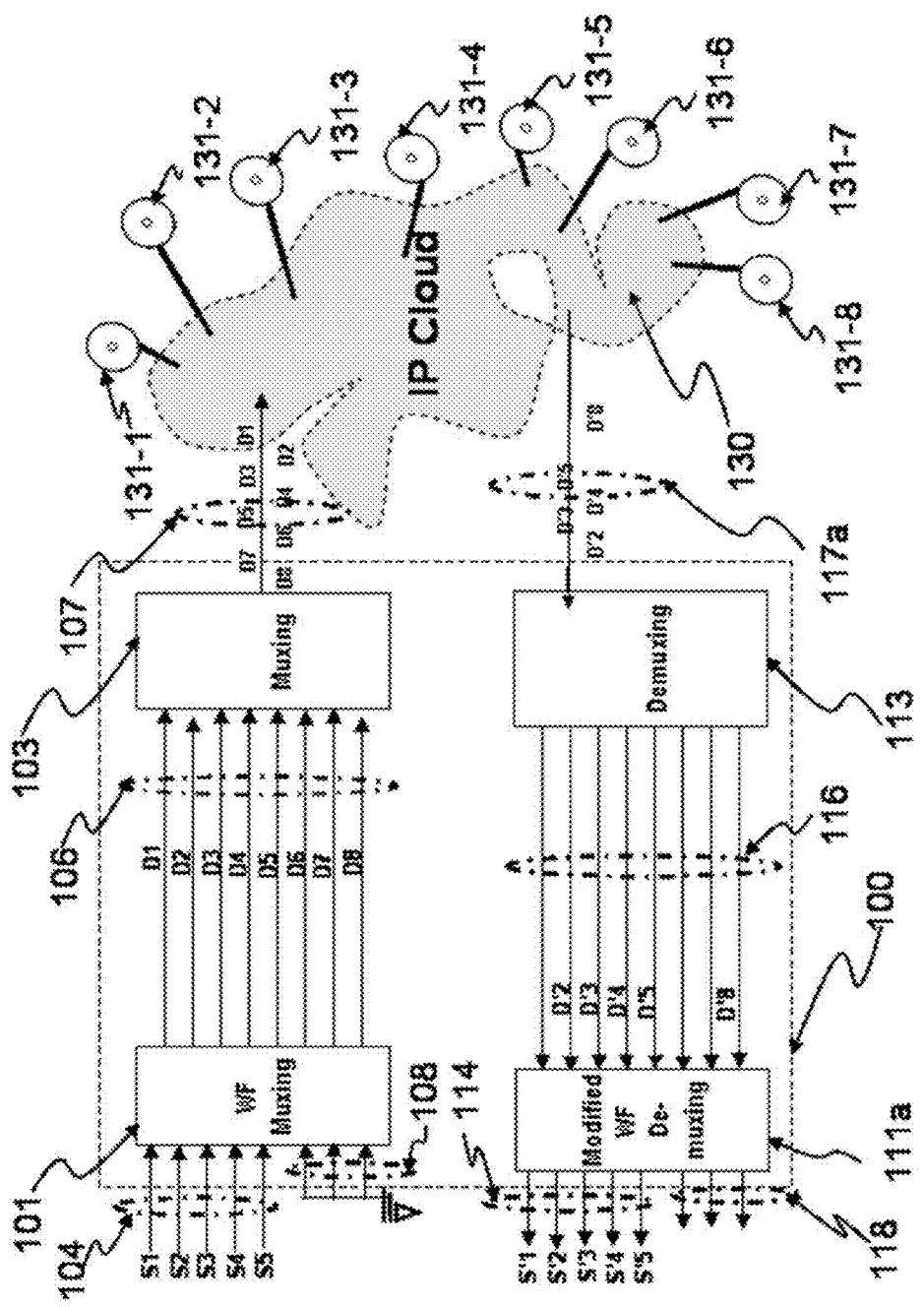
FIG. 1A depicts a block diagram on distributed data storage for 5 independent data sets with nearly identical data size via Wavefront muxing techniques, associated retrieval processing when some of the stored data sets are not available.

Further processing may be required to restore the stored data referring to FIG. 1A, which is identical to FIG. 1 except the post retrieval processing or the data reading 111a. FIG. 1A features a new post retrieval processing or the data reading 111a. With only 5 unknown data sets of D'2, D'3, D'4, D'5 and D'8, 8 linear combinations S'1-S'8 can be created. Each of the linear combinations S'1-S'8 may be combined by the 5 unknown data sets D'2, D'3, D'4, D'5 and D'8 weighted by five weighting parameters respectively. It is possible to identify 3 contaminated ones, D'1, D'6 and D'7, from the 8 stored data sets based on the 8 different linear combinations. The extra data sets shall be used for better survivability, better reliability, and better authentications.

As indicated in this example, the storage sites for D'1, D'6 and D'7 are not accessed or applied. Only D'2, D'3, D'4, D'5, and D'8 data sets are accessible and retrievable via retrieval paths, where $$D'2=S'1-S'2+S'3-S'4+S'5 \quad (7\text{-}1)$$

$$D'3=S'1+S'2-S'3-S'4+S'5 \quad (7\text{-}2)$$

$$D'4=S'1-S'2-S'3+S'4+S'5 \quad (7\text{-}3)$$

$$D'5=S'1+S'2+S'3+S'4-S'5 \quad (7\text{-}4)$$

$$D'8=S'1-S'2-S'3+S'4-S'5 \quad (7\text{-}5)$$

Therefore, S'1, S'2, S'3, S'4, and S'5 can then be solved by a modified wavefront demuxer 111a as:

$$S'1=(D'2+D'3+D'5+D'8)/4 \quad (7\text{-}6)$$

$$S'5=(D'4-D'8)/2 \quad (7\text{-}7)$$

$$S'3=(D'2+D'5)/2-S'1 \quad (7\text{-}8)$$

$$S'2=(D'5-D'8)/2-S'3 \quad (7\text{-}9)$$

$$S'4=(D'3-D'4)/2+S'2 \quad (7\text{-}10)$$

There are many different combinations of taking 5 WF muxed data sets 117 from 8 ones stored in the eight data storage sites 131-1 through 131-8. In this case, there are 56 possible combinations of availabilities. The modified WF muxer 111a shall be designed to handle all possible combinations. The unavailability of the stored data may be caused by physical site damages, electronic upsets on the data contents, sabotaged by hackers, and/or by other causes.

Figure 2A:
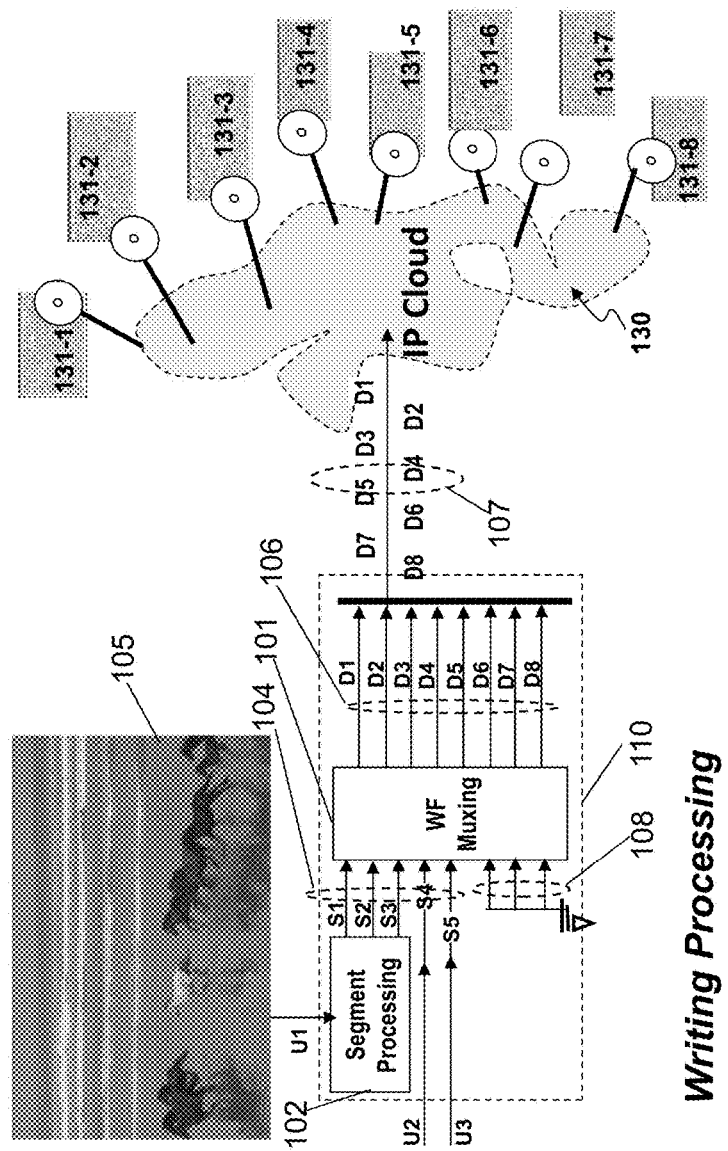
FIG. 2A depicts a block diagram on distributed data storage for 3 independent users U1, U2, and U3 with non identical data sizes stored in up to 8 storage sites on cloud via Wavefront muxing techniques and associated retrieval processing from multiple stored data sets.

Similar to FIGS. 1 and 1A, FIG. 2A depicts a writing process; an operation concept of using WF multiplexing techniques to store 5 sets of data 104, i.e. S1, S2, S3, S4 and S5, in 8 physically separated data storage sites 131 connected through IP Cloud, except the first three data sets, S1, S2 and S3, are generated by segmenting a large data set 105 belonged to a first user, U1, by a segmentation processor 102. Data set 105 is a short video clip on wild life. Input data sets S4 and S5 belong to second and third users, U2 and U3 respectively. Each of the outputs or data sets 106, i.e. D1-D8, may be a linear combination of the inputs 104 and 108, i.e. including S1-S5, each weighted by a corresponding weighting parameter. Each of the outputs 106, i.e. D1-D8, contains information associated with all of the inputs 104 and 108, i.e. including S1-55. The data storage sites 131-1 through 131-8 may store the output data sets 106, i.e. D1-D8, respectively. Elements in FIG. 2A having the same reference number as those in FIGS. 1 and 1A may refer to those illustrated in FIGS. 1 and 1A.

Figure 2B:
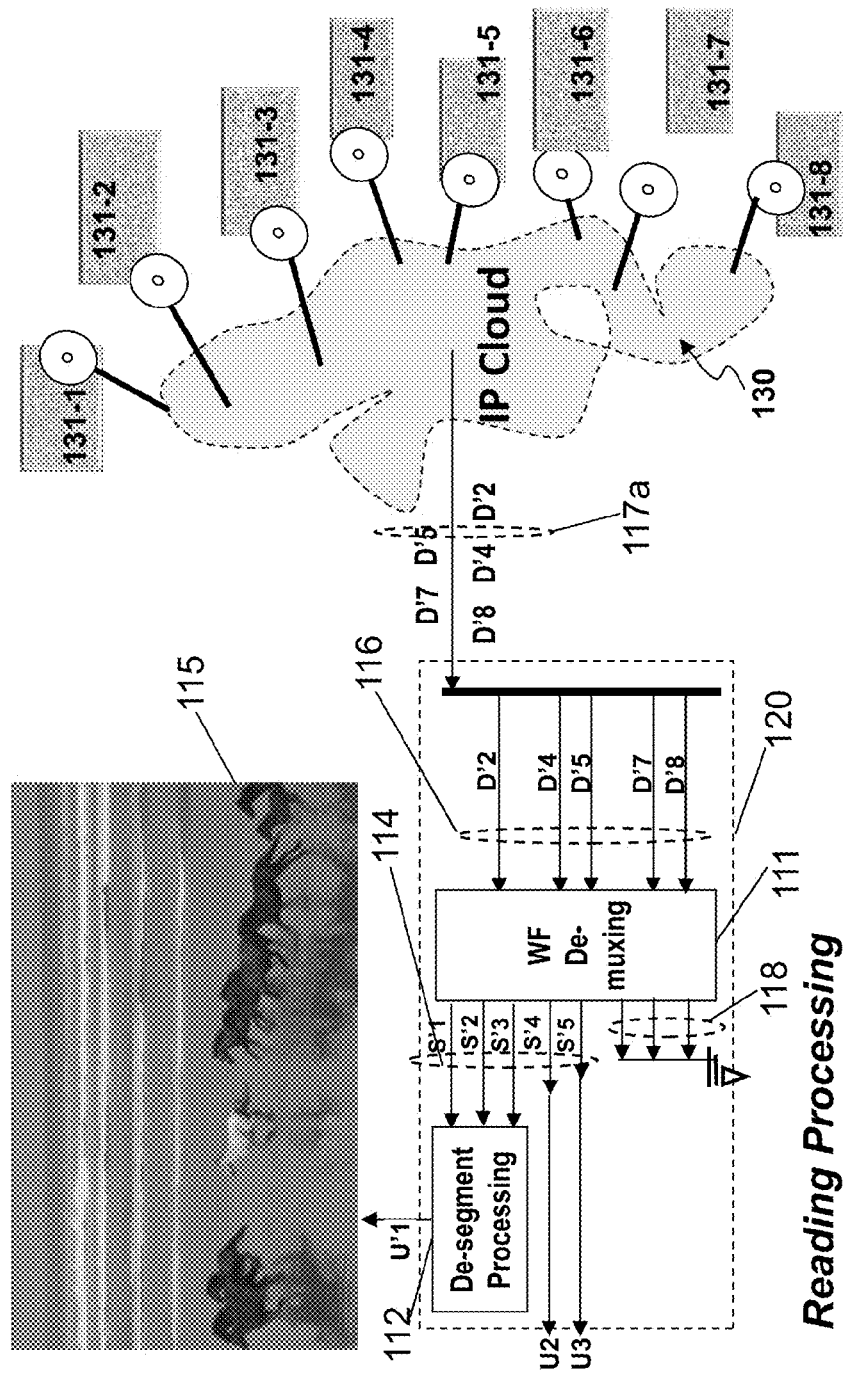
FIG. 2B depicts a block diagram on retrieval processing from distributed data storage on cloud for 3 independent users U1, U2, and U3 with non identical data sizes stored in multiple stored data sets via Wavefront de-muxing techniques, when some of the stored data sets are not available.

Similar to FIG. 1A, FIG. 2B depicting a reading process, the WF demultiplexing techniques may be used to retrieve 5 sets of data 114, i.e. S'1, S'2, S'3, S'4 and S'5, from five data sets of D'2, D'4, D'5, D'7 and D'8 derived from five of the eight physically separated data storage sites 131-1 through 131-8 connected through IP Cloud. The first three data sets, i.e. S'1, S'2, and S'3, are to be de-segmented or combined into a large data set 115, i.e. U'1, substantially equivalent to the input data set U1 in FIG. 2A, by a de-segmentation processor 112. Referring to FIG. 2B, it shows the retrieval processing of the 5 sets of data 114, i.e. S'1-S'5 substantially equivalent to the input data sets S1-55 respectively in FIG. 2A, when only 5 stored data sets, i.e. D'2, D'4, D'5, D'7 and D'8 substantially equivalent to the data sets D2, 4, D5 , D7 and D8 respectively in FIG. 2A, are accessible from five of the eight storage sites 130-1 through 131-8. Each of the outputs or retrieved data sets 114, i.e. S'1-S'5, may be a linear combination of the inputs 116, i.e. D'2, D'4 , D'5, D'7 and D', each weighted by a corresponding weighting parameter. Each of the outputs or retrieved data sets 114, i.e. S'1-S'5, contains information associated with all of the inputs 116, i.e. D'2, D'4, D'5, D'7 and D'8. The retrieval process further includes the grouping of the first 3 retrieved data sets, i.e. S'1, S'2, and S'3, into a large data set 115, i.e. U'1, via a de-segmentation processor 112, which is accessible to a user authorized by another user storing the data set U1 through the segmenting process 102 and WF muxing 101. The retrieved data sets, i.e. S'4 and S'5, substantially equivalent to the input data sets S4 and S5 respectively in FIG. 2A, are delivered to users U'2 and U'3 authorized by users U2 and U3 in FIG. 2A, respectively. Elements in FIG. 2B having the same reference number as those in FIGS. 1 and 1A may refer to those illustrated in FIGS. 1 and 1A.

Figure 2C:
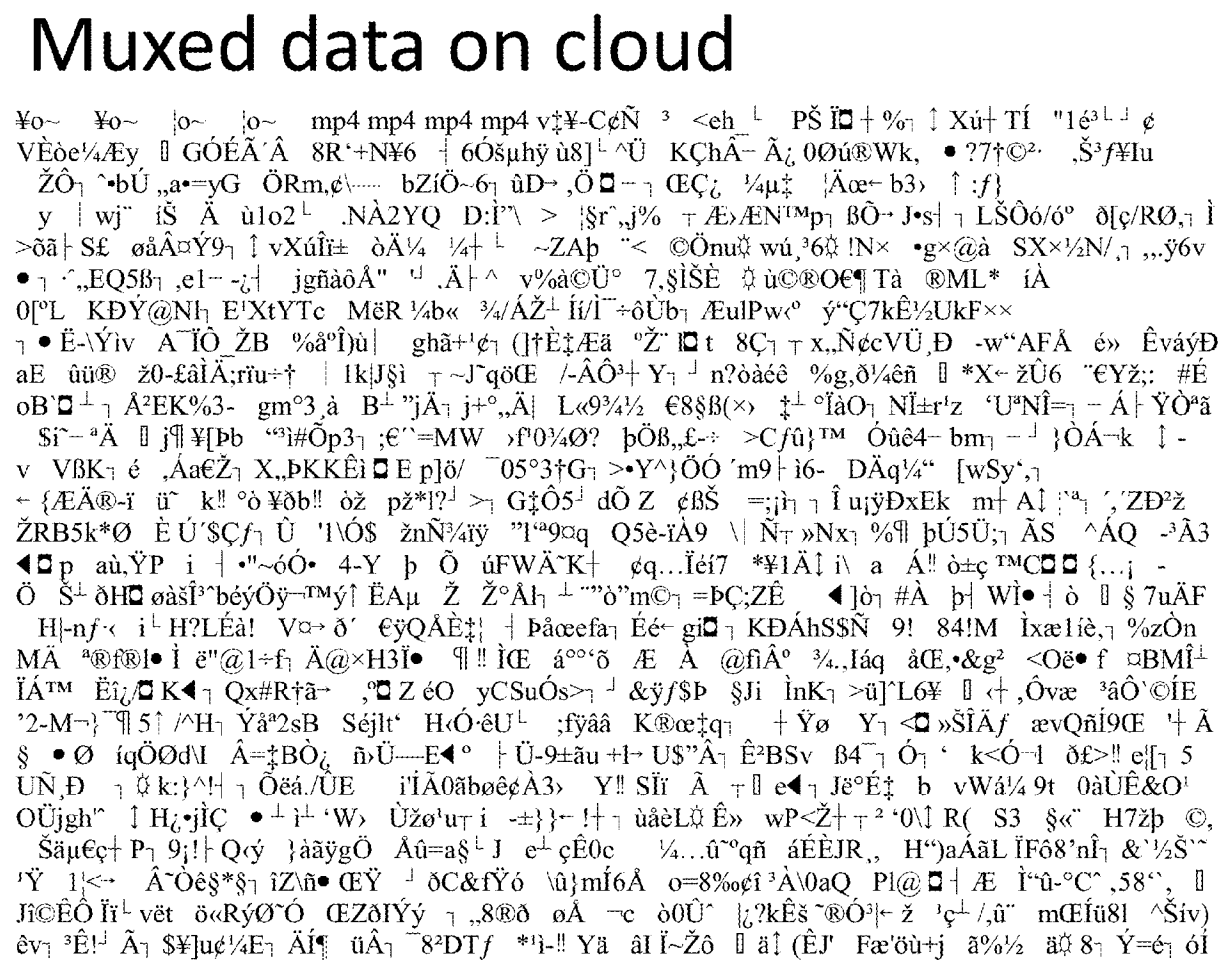

FIG. 2C depicts a small leading portion of one of 8 stored WF muxed data sets D1-D8 on cloud of a "wild life" video clip opened by Notepad. Except a few blocks of the first line, the file is incomprehensible.

Embodiment 2

Figure 3:
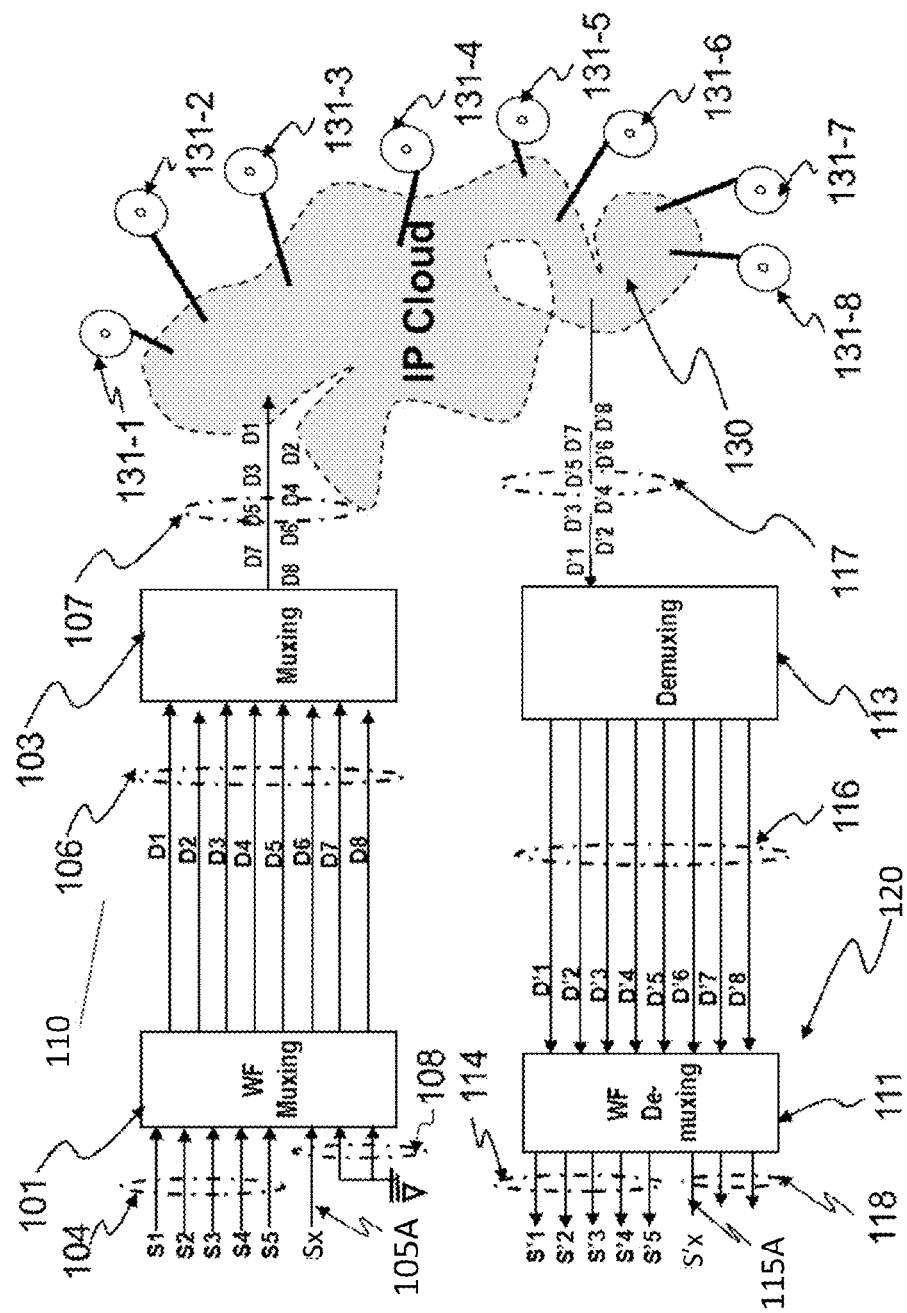
FIG. 3 depicts a block diagram on distributed data storage for 5 independent data sets with nearly identical data size via Wavefront muxing techniques with authentication, associated retrieval processing when some of the stored data sets are not available. It may be used for Data integrity monitoring.

FIG. 3 depicts an operation concept of using the above WF multiplexing techniques for storing 5 sets of data 104, i.e. S1, S2, S3, S4 and S5, as well as a diagnostic/authentication data set 105A, i.e. Sx, in the 8 data storage sites 131-1 through 131-8 physically separated but connected through IP Cloud. Referring to FIG. 3, it also shows the retrieval processing of the 5 data sets 114, i.e. S'1, S'2, S'3, S'4 and S'5, and the diagnostic and authentication set S'x 115A from the 8 storage site 131-1 through 131-8. It is assumed the 5 data sets 104, i.e. S1, S2, S3, S4 and S5, and the diagnostic/authentication data set 105A, i.e. Sx, feature nearly identical data sizes. Each of the outputs or data sets 106, i.e. D1-D8, may be a linear combination of the inputs 104 and 108, i.e. including S1-S5 and Sx, each weighted by a corresponding weighting parameter. Each of the outputs 106, i.e. D1-D8, contains information associated with all of the inputs 104 and 108, i.e. including S1-S5 and Sx. The data storage sites 131-1 through 131-8 may store the output data sets 106, i.e. D1-D8, respectively. Elements in FIG. 3 having the same reference number as those in FIGS. 1 and 1A may refer to those illustrated in FIGS. 1 and 1A.

Referring to FIG. 3, there are three segments: (1) a pre-storage processing 110, (2) cloud storage 130 and (3) post retrieval processing 120. The data storage sites 131-1 through 131-8 in the cloud storage 130 feature nearly equal data storage space. The data storage/retrieval processing 100 comprises of the pre-storage processing 110 and the post retrieval processing 120.

Referring to FIG. 3, the main difference between the embodiment 2 and the embodiment 1 is the presences of diagnostic/authentication data set 105A, which may be fixed data sets, periodically configurable data sets, or dynamic data sets. In this example, we will use a fixed diagnostic/authentication data set to illustrate the unique features of the architectures and their operations. The diagnostic/authentication data set 105A shall be known data sets to users or/and data storage administrators. The diagnostic/authentication data set 105A may be digital files of famous paintings, good quality pictures, or multi-media data.

Pre-Storage Processing:

Referring to FIG. 3, in the pre-storage processing 110, a 8-to-8 WF muxer 101 is used to convert 5 sets of data 104, i.e. S1, S2, S3, S4 and S5, and 1 set of diagnostic/authentication data 108, i.e. Sx, into 8 sets of outputs 106, i.e. D1, D2, D3, D4, D5, D6, D7 and D8, where $$D1 = S1+S2+S3+S4+S5+Sx \quad (8\text{-}1)$$

$$D2 = S1-S2+S3-S4+S5-Sx \quad (8\text{-}2)$$

$$D3 = S1+S2-S3-S4+S5+Sx \quad (8\text{-}3)$$

$$D4 = S1-S2-S3+S4+S5-Sx \quad (8\text{-}4)$$

$$D5 = S1+S2+S3+S4-S5-Sx \quad (8\text{-}5)$$

$$D6 = S1-S2+S3-S4-S5+Sx \quad (8\text{-}6)$$

$$D7 = S1+S2-S3-S4-S5-Sx \quad (8\text{-}7)$$

$$D8 = S1-S2-S3+S4-S5+Sx \quad (8\text{-}8)$$

A 8-to-8 Hadamard matrix in which all elements are "1" or "−1" only has been chosen as the 8-to-8 WF muxer. Equations (1-1) to (1-8) can be written in a matrix form as $$D = HM*Sa \quad (8\text{-}9)$$

$$\text{where: } D = [D1, D2, D3, D4, D5, D6, D7, D8]^T \quad (8\text{-}9a)$$

$$Sa = [S1, S2, S3, S4, S5, Sx, 0, 0]^T, \quad (8\text{-}9b)$$

and the 8-to-8 Hadamard matrix is expressed in equation (2-2).

Referring to FIG. 3, the input ports of a WF muxer 101 are referred to as slices, and its output ports are wavefront components (wfcs). In this example, the five input data sets 104, i.e. S1-S5, are connected to the input ports, i.e. slice1-slice5, of the WF muxer 101 respectively. The input port, i.e. slice6, of the WF muxer 101 is assigned to the input data set 108, i.e. Sx, and the input ports, i.e. slices7 and slice8, of the WF muxer 101 are grounded, i.e. assigned to two respective redundant data sets. The 8 output data sets 106, i.e. D1-D8, are connected to the output ports, i.e. wfc1-wfc8, respectively.

When the WF muxer 101 is only connected by a unity input data set, e.g. S4=[1] through the input port of slice 4, the corresponding outputs of the WF muxer are written as $$D1 = S1+S2+S3+S4+S5+Sx = [1] \quad (9\text{-}1)$$

$$D2 = S1-S2+S3-S4+S5-Sx = [-1] \quad (9\text{-}2)$$

$$D3 = S1+S2-S3-S4+S5+Sx = [-1] \quad (9\text{-}3)$$

$$D4 = S1-S2-S3+S4+S5-Sx = [1] \quad (9\text{-}4)$$

$$D5 = S1+S2+S3+S4-S5+Sx = [1] \quad (9\text{-}5)$$

$$D6 = S1-S2+S3-S4-S5-Sx = [-1] \quad (9\text{-}6)$$

$$D7 = S1+S2-S3-S4-S5-Sx = [-1] \quad (9\text{-}7)$$

$$D8 = S1-S2-S3+S4-S5+Sx = [1] \quad (9\text{-}8)$$

Referring to FIG. 3, the 8 output data sets D1-D8 can be represented as an output data matrix, D. The elements of the output matrix D, under the condition, become identical to the 8 elements of the $4^{th}$ column in the HM. The vector representing the matrix is referred to as the $4^{th}$ wavefront vector (WFV), or WFV4. Similarly, the wavefront vector is associated with the $k^{th}$ input port, i.e. slice k is referred to as $k^{th}$ WFV or WFVk. A WF vector specifies a unique distribution of a set of input data among the 8-output ports or among 8 aggregated output data sets, i.e. D1, D2, D3, D4, D5, D6, D7 and D8. In general an 8-to-8 WF muxer, such as the WF muxer 101, features 8 orthogonal WFV's. Let define a coefficient wjk of a WF transformation performed by the WF muxer 101 to be the one in the position of $j^{th}$ row and $k^{th}$ column of a WF muxer. A WF vector of the WF muxer 101 featuring a distribution among the 8 outputs, the 8 WF component (wfc) ports, is defined as an 8-dimensional vector. They are mutually orthogonal. The first 5 WFVs of the WF muxer 101 are:

$$WFV1 = [w1, w21, w31, w41, w51, w61, w71, w81]^T \quad (10.1)$$

$$WFV2 = [w12, w22, w32, w42, w52, w62, w72, w82]^T \quad (10.2)$$

$$WFV3 = [w13, w23, w33, w43, w53, w63, w73, w83]^T \quad (10.3)$$

$$WFV4 = [w14, w24, w34, w44, w54, w64, w74, w84]^T \quad (10.4)$$

$$WFV5 = [w15, w25, w35, w45, w55, w65, w75, w85]^T \quad (10.5)$$

The input data sets 104, i.e. S1, S2, S3, S4, and S5, are connected to the first five input ports, i.e. slice1-slice5, of the WF muxer 101 so as to be "attached" to 5 WF vectors, i.e. WFV1-WFV5. The diagnostic/authentication data set Sx, is attached to the $6^{th}$ WFV, or WFV6, where:

$$WFV6 = [w16, w26, w36, w46, w56, w66, w76, w86]^T \quad (10.6)$$

There are 2 remaining WFVs, i.e. WFV7 and WFV8, which are not "activated" in this case. The associated input ports, i.e. slices 7 and 8, are grounded, i.e. assigned to two respective redundant data sets. By doing these, on the other hand, it can be viewed that two additional data sets, i.e. the last two of the input data set 108, with elements of "zeros" are riding on the two WF vectors. These two "null" data sets comprise empty elements.

All components of the 8 orthogonal WFVs are completely independent of input and output data sets, but are related to the sequence of the input and output ports of the WF muxer 101. The 8 outputs or output data set 106, i.e. D1, D2, D3, D4, D5, D6, D7 and D8, at the 8 output ports, i.e. wfc1-wfc8, of the WF muxer 101 feature 8 different linear combinations of the 5 input data sets 104, i.e. S1-S5, and one diagnostic data set Sx, or feature 8 aggregated data sets. Each aggregated data set is a weighted sum of the 5 input data sets 104, i.e. S1-S5, plus one diagnostic data set Sx. These inputs S1-S5 and Sx are completely independent; one may be a power point presentation, another may be a multimedia data file, the third may be a word document, and so on. As an example, the diagnostic data set 109 may be a digital picture file of a Chinese painting of "running houses" by a famous artist of Mr. Hsu Pei-hung. As a result, the 8 aggregated data sets 106, i.e. D1-D8, feature results of structured arithmetic operations (weighting, or multiplying, and summing) on 5 independent data sets 104, i.e. S1-S5, plus the digital data file, i.e. S6, of a painting with the title of "running horses". The outputs 106 of the WF muxer 101 shall appear 8 separated data sets, i.e. D1-D8, with various random numbers, to be stored on the storage sites 131-1 through 131-8 respectively.

Referring to FIG. 3, the muxing processor 103, such as time, frequency or code domain multiplexer, will allow the 8 pre-processed data sets 106, i.e. the output data sets D1-D8 from the WF muxer 101 in parallel, to be muxed based on time, frequency or code and then delivered to 8 respective local folders, at a transmitting site, synchronized automatically in series with 8 respective data storage or mirror sites 131-1 through 131-8 in IP Cloud storage 130 through a single pipe, or communication output port 107 via Internet. Furthermore, multiple links linking to the eight data sets stored in the eight respective data storage or mirror sites 131-1 through 131-8 may be passed to one or more of the data storage or mirror sites 131-1 through 131-8 and/or stored in the transmitting site. Some of the data sets D1-D8 may be stored locally at the transmitting site. One of the operational concepts of this configuration is to reserve a fixed number, i.e. 8, of data storage sites 131 for storing 8 output data sets D1-D8 each containing information related to the 5 input data sets 104, i.e. S1-S5. Every individual storage site 131-1 through 131-8 shall feature a memory size with a few percent, e.g. less than 15%, more than any one of the data sets 104, i.e. S1-S5, and more than the diagnostic/authentication data set Sx. All 8 sets of distributed memories, i.e. storage sites 131-1 through 131-8, will be used for storing the eight output data sets D1-D8 respectively, independent of whether one set of data (S1 only) or 5 sets of data (S1, S2, S3, S4, S5) are stored across the 8 assigned storage memory sets 131-1 through 131-8 distributed in separated sites.

For example, referring to FIG. 3, when only a first data set, S1, is stored, each of the 8 memory sites 131-1 through 131-8 stores a sum of the first data set (S1) weighted by a parameter in the wavefront vector WFV1 plus the diagnostic/authentication data (Sx) weighted by a parameter in the wavefront vector WFV6. The weightings, i.e. parameters, for the first data set (S1) in the 8 memory sites 131-1 through 131-8 are expressed as an 8-dimensional vector or a vector with 8 components. This vector is referred to as the first wavefront vector (1st WF vector) or WFV1. Similarly, the weightings, i.e. parameters, for the diagnostic/authentication data set Sx in the 8 memory sites 131-1 through 131-8 are expressed as another 8-dimensional vector or another vector with 8 components. This vector is referred to as the $6^{th}$ wavefront vector ($6^{th}$ WF vector) or WFV6.

Furthermore, WFV1 and WFV6 are mutually orthogonal. It is important to make the following observations: (1) each of the 5 input data sets 104, i.e. S1-S5, is muxed by the WF muxer 101 into eight output data sets D1-D8 stored in the eight data memory sets 131-1 through 131-8 respectively; and (2) each of the 8 memory sites 131-1 through 131-8 stores storage formats of a weighted sum of the input data sets S1-S5.

Cloud Storage 130:

As shown in FIG. 3, the five independent data sets 104, i.e. S1, S2, S3, S4 and S5, and the diagnostic/authentication data set Sx are muxed by the WF muxer 101 into the output data sets D1-D8 that may be stored in the 8 storage sites 131-1 through 131-8 respectively in IP Cloud 130 in forms of 8 respective linear combinations, each of which is a linear combination of the same five data sets 104, i.e. S1-S5, each multiplied by a weighting parameter in a corresponding one of the WF vectors WFV1-WFV5, plus the diagnostic/authentication data set Sx multiplied by a weighting parameter in the WF vector WFV6. Each of the storage sites 131-1 through 131-8 stores an assigned one of the 8 processed data sets 106, i.e. D1, D2, D3, D4, D5, D6, D7 and D8. The storage sites 131-1 through 131-8 store the output data sets D1-D8, i.e. the eight respective linear combinations, respectively.

Post Retrieval Processing 120:

Referring to FIG. 3, the post retrieval processing 120 may include a demuxing processing 113, such as time, frequency or code domain demultiplexer, that will recover parallel data sets 116, i.e. D'1-D'8, if not contaminated, substantially equivalent to the data sets D1-D8 respectively, based on time, frequency or code from the data sets, stored in 8 separated local folders, i.e. memory sets in a local memory device at a receiving site, synchronized automatically in series with the 8 respective storage or mirror sites 131-1 through 131-8 in IP Cloud storage 130 via Internet optionally in accordance with the links passed from one or more of the storage or mirror sites 131-1 through 131-8 or transmitting site to the receiving site. The 8 stored data sets are allowed to be retrieved through the single pipe, or communication output port 117 from various data storage sites 131-1 through 131-8 in IP Cloud storage 130.

In the post-retrieval processing 120, a 8-to-8 WF demuxer 111 is used to convert 8 sets of stored data 116, i.e. D1, D2, D3, D4, D5, D6, D7 and D8, into 5 sets of outputs 114, i.e. S'1, S'2, S'3, S'4 and S'5, and one set of diagnostic/authentication data (S'x) 119, where:

$$S'1 = (D1+D2+D3+D4+D5+D6+D7+D8)/8 \qquad (11\text{-}1)$$

$$S'2 = (D1-D2+D3-D4+D5-D6+D7-D8)/8 \qquad (11\text{-}2)$$

$$S'3 = (D1+D2-D3-D4+D5+D6-D7-D8)/8 \qquad (11\text{-}3)$$

$$S'4 = (D1+D2+D3+D4+D5+D6+D7+D8)/8 \qquad (11\text{-}4)$$

$$S'5 = (D1+D2+D3+D4-D5-D6-D7-D8)/8 \qquad (11\text{-}5)$$

$$S'x = (D1-D2+D3-D4-D5+D6-D7+D8)/8 \qquad (11\text{-}6)$$

$$S'7=(D'1+D'2-D'3-D'4-D'5-D'6+D'7+D'8)/8 \quad (11\text{-}7)$$

$$S'8=(D'1+D'2+D'3+D'4+D'5+D'6+D'7+D'8)/8 \quad (11\text{-}8)$$

A 8-to-8 Hadamard matrix with scaling factor of 1/8 has been chosen as the 8-to-8 WF demuxer 111. The matrix elements of the 8-to-8 Hadamard matrix features "1" or "−1" as depicted in the equation (2-2). Equations (11-1) to (11-8) may also be written in a matrix form as $$S'=HM*D' \quad (11\text{-}9)$$

Where: $D=[D'1,D'2,D'3,D'4,D'5,D'6,D'7,D'8]^T \quad (11\text{-}10)$ $$S'=[S'1,S'2,S'3,S'4,S'5,S'x,0,0]^T, \quad (11\text{-}11)$$

and the 8-to-8 Hadamard matrix is expressed in equation (2-2).

Referring to FIG. 3, the input ports of the WF demuxer 111 are referred to as wavefront components (wfcs), i.e. wfc1', wfc2', wfc3', wfc4', wfc5', wfc6', wfc7' and wfc8', and its output ports are slices, i.e. slice1', slice2', slice3', slice4', slice5', slice6', slice7' and slice8'. In this example, the 8 input data sets 116, i.e. D'1-D'8, are connected to its input ports wfc1'-wfc8' of the WF demuxer 111, respectively. The five retrieved data sets 114, i.e. S'1-S'5, are connected to its output ports, i.e. slice1' through slice5', respectively. The retrieved data sets 118, i.e. S'x, is connected to its output port, i.e. slice 6. Each of the outputs or retrieved data sets 114 and 118, i.e. S'1-S'5 and S'x, may be a linear combination of the inputs 116, i.e. D'1-D'8, each weighted by a corresponding weighting parameter. Each of the outputs or retrieved data sets 114 and 118, i.e. S'1-S'5 and S'x, contains information associated with all of the inputs 116, i.e. D'1-D'8.

Referring to FIG. 3, the retrieved data set S'x will be used for diagnostic to be compared with the known data set Sx. If the two data sets S'x and Sx are identical, it could mean no "leakages" come from the other 5 data sets, i.e. S1-S5, and the stored data sets D1-D8 may be determined not to be contaminated. As a result, the retrieved data sets 114, i.e. S'1, S'2, S'3, S'4 and S'5, will be identified with high confidence as the data sets 104, i.e. S1, S2, S3, S4, and S5, respectively. On the other hand, if the two data sets S'x and Sx are not identical, it could mean there are "leakages" from the other 5 data sets, i.e. S1-S5, it is highly likely that one or more of the stored data sets D1-D8 may be contaminated either in one or more of the storage sites 131-1 through 131-8 in the Cloud storage 130 or during transportation for the data sets D1-D8 from the WF muxer 101 to the Cloud storage 130 or for the data sets D'1-D'8 from the Cloud storage 130 to the WF demuxer 111. Further processing may be required to restore the stored data. With only 5 unknown data sets, i.e. S'1-S'5, 8 linear combinations, i.e. D'1-D"8, of the 5 unknown data sets, i.e. S'1-S'5, and the known diagnostic/authentication data set, i.e. S'x, it is possible to identify and correct 3 contaminated ones from the 8 stored data sets 117, i.e. D'1-D"8, via the 8 different but known linear combinations, i.e. D'1-D"8. The extra data sets shall be used for better survivability, better reliability, and better authentications.

Referring to FIG. 3, when the last two of the retrieved data sets 118, i.e. S'7, and S'8, feature data sets with zeros or negligibly small numbers, representing empty data sets, it could indicate that the retrieved data sets 114, i.e. S'1-S'5, are not been contaminated in the storage sites 131-1 through 131-8 in the Cloud storage 130 or during transportation for the data sets D1-D8 from the WF muxer 101 to the Cloud storage 130 or for the data sets D'1-D'8 from the Cloud storage 130 to the WF demuxer 111. As a result, the retrieved data sets 114, i.e. S'1, S'2, S'3, S'4 and S'5, shall be identified with confidence as the input data sets 104, i.e. S1, S2, S3, S4, and S5, respectively. These two ports slice7' and slice8' have the nearly identical functions as the port slice6' coupled to the data set S'6, except these two ports slice7' and slice8' do not require any knowledge of diagnostic/authentication data sets, and can be reserved for storage operators/administrators who may not have needs to know about the stored data sets 104 and 114, i.e. S1-S5 and S'1-S'5, and/or the diagnostic/authentication data sets, i.e. Sx and S'x, to determine if the retrieved data sets S'1-S'5 are contaminated in the storage sites 131-1 through 131-8 in the Cloud storage 130 or during transportation for the data sets D1-D8 from the WF muxer 101 to the Cloud storage 130 or for the data sets D'1-D'8 from the Cloud storage 130 to the WF demuxer 111.

Referring to FIG. 3, the 8 separated database (storage) sites 131-1 through 131-8 may be allocated for the storage of the respective eight data sets D1-D8 muxed by the WF muxer 101 from the 5 sets of data sets, i.e. S1-S5. Even when only one of the 5 data sets 104, i.e. S4, are to be muxed by the WF muxer 101 into the eight data sets D1-D8 to be stored in the distributed storage sites 131-1 through 131-8, the stored data sets D1-D8 in the 8 respective storage sites 131-1 through 131-8 would be 8 linear combinations, each of which may be a linear combination of the input data set S4 multiplied by a weighting parameter in WFV4 and the diagnostic data set Sx multiplied by another weighting parameter in WFV6, e.g. digital data of the painting of "running horses" as an example. It would be feasible to make the stored data sets D1-D8 hard to be detected by emphasizing or multiplying the weighting parameters in WFV6 for the diagnostic data set Sx, i.e. the digital data of the painting of "running horses", by a scalar or emphasizing factor, such as greater than 2, 5, 10 or even 100, so as to become 2, 5, 10 or even 100 times "stronger than those in WFV4" or 10 to 20 dB, before the diagnostic data set Sx weighted by the 8 emphasized weighting parameters in WFV6 are combined with the data sets S4 weighted by the 8 weighting parameters in WFV4 for the 8 respective linear combinations, i.e. D1-D8. This is a camouflaged process. Each of the weighting parameters in WFV6 may have an absolute number greater than that of any one of the weighting parameters in WFV4 by 2 times, 5 times, 10 times or even 100 times, for example. Accordingly, the 8 resulting data sets, i.e. D1-D8, would appear mainly with 8 nearly identical digital data paintings of running houses with weak data sets of S4 "floating" on all 8 digital house paintings. Because of the orthogonal data distributions among the data storage sites 131-1 through 131-8, the retrieving process 120 may separate the (weaker) stored real data, i.e. S'4, from the camouflaged digital data of Chinese horse painting (strong signals), i.e. S'x, based on the data sets D'1-D'8. Elements in FIG. 3 having the same reference number as those in FIGS. 1 and 1A may refer to those illustrated in FIGS. 1 and 1A.

Figure 3A:
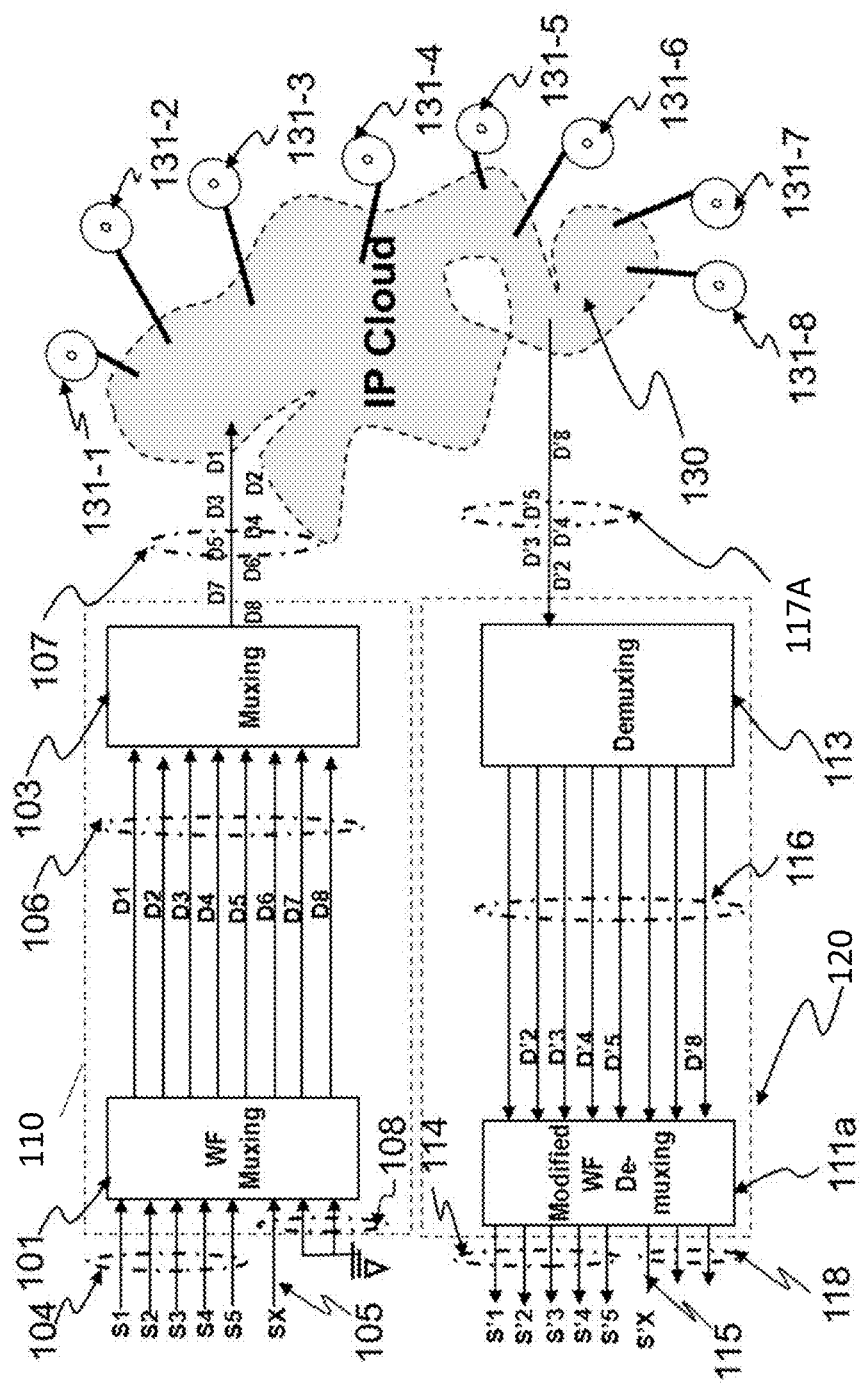
FIG. 3A depicts of how to retrieve the stored data in a scenario that only 5 of the 8 stored data sets D'1-D'8 are available from the storage sites 131-1 through 131-8.

FIG. 3A depicts of how to retrieve the stored data in a scenario that only 5 of the 8 stored data sets D'1-D'8 are available from the storage sites 131-1 through 131-8. As indicated in this example, the storage sites 131-1, 131-6 and 131-7 for the stored data sets D'1, D'6 and D'7 are not accessible. Only the data sets D'2, D'3, D'4, D'5 and D'8 are accessible from the storage sites 131-2, 131-3, 131-4, 131-5 and 131-8 and retrievable via Internet, such as the retrieval path. There are many different combinations of taking 5 sets of data 117 from the 8 data sets D'1-D'8 in the 8 respective data storage sites 131-1 through 131-8. In this case, there are 56 possible combinations of availabilities. The modified WF muxer 111a shall be designed to handle all possible combinations. The unavailability of the stored data sets, i.e. D'1, D'6 and D'7 in this case, may be caused by physical damages of the sites, electronic upsets on the data contents, sabotaged by hackers, and/or by other causes. Elements in FIG. 3A having the same reference number as those in FIGS. 2A, 2B and 3 may refer to those illustrated in FIGS. 2A, 2B and 3.

Alternatively, referring to FIG. 3, the WF multiplexing 101 techniques may be used to multiplex the 5 sets of data 104, i.e. S1, S2, S3, S4 and S5, and the diagnostic/authentication data set Sx into the eight output data sets D1-D8 to be transmitted via Internet and then to be stored respectively in the 8 physically separated data storage sites 131-1 through 131-8 in the IP Cloud 130. The first three data sets, i.e. S1, S2, and S3, are generated by segmenting a large data set U1, as seen in FIG. 2A, by a segmentation processor 102. After the 5 sets of data 114, i.e. S'1-S'5, are retrieved by the WF demuxer 111 from all of the data sets D'1-D'8 transmitted from the 8 storage sites 131-1 through 131-8, the first 3 retrieved data sets, i.e. S'1, S'2, and S'3, may be grouped into a large data set U'1, as seen in FIG. 2B, via a de-segmentation processor 112.

Alternatively, referring to FIG. 3A, the WF muxing techniques 101 may be used to multiplex the 5 sets of data 104, i.e. S1, S2, S3, S4 and S5, and the diagnostic/authentication data set Sx into the eight output data sets D1-D8 to be transmitted via Internet and then to be stored respectively in the 8 physically separated data storage sites 131-1 through 131-8 in the IP Cloud 130. The first three data sets, i.e. S1, S2, and S3, are generated by segmenting a large data set U1, as seen in FIG. 2A, by a segmentation processor 102. After the 5 sets of data 114, i.e. S'1-S'5, are retrieved by the WF demuxer 111 from only five, e.g. D'2, D'3, D'4, D'5 and D'8, of the data sets D'1 -D'8 stored in the 8 storage sites 131-1 through 131-8 when only 5 stored data sets 117a, e.g. D'2, D'3, D'4, D'5 and D'8, are accessible. After the 5 sets of data 114, i.e. S'1-S'5, are retrieved by the WF demuxer 111a from the five data sets, e.g. D'2, D'3, D'4, D'5 and D'8, transmitted from the 5 respective storage sites 131-2, 131-3, 131-4, 131-5 and 131-8, the first 3 retrieved data sets, i.e. S'1, S'2, and S'3, may be grouped into a large data set U'1, as seen in FIG. 2B, via a de-segmentation processor 112.

The following two embodiments are related to data structures using wavefront multiplexing for video streaming via multiple mirroring sites. With the explosive growth of video applications over the Internet, many approaches have been proposed to stream video effectively over packet switched best-effort networks. In present invention, we propose a data structure based on wavefront multiplexing (WF muxing) for simultaneous video streaming from multiple senders to a single receiver in order to achieve higher throughput, and to increase tolerance to packet loss and delay due to network congestion. Our data structures will work protocols with rate allocation scheme and packet partition algorithm. The rate allocation scheme, run at the receiver, determines the sending rates for individual sender by taking into account available network bandwidth, channel characteristics, in such a way as to minimize the probability of packet loss. The packet partition algorithm, run at the senders based on a set of parameters estimated by the receiver, ensures that a group of packets with built-in redundancies are sent by various senders concurrently, and at the same time, minimizes the startup delay.

Wavefront multiplexing/demultiplexing (WF muxing/demuxing) process features an algorithm for satellite communications where transmissions demand a high degree of power combining, security, reliability, and optimization. The WF muxing/demuxing, embodying architectures utilizing multi-dimensional transmissions, have found applications in fields beyond the satellite communication domain. One such application is data storage on cloud where privacy and redundancy are important for data transports and storage.

Acoustic Signal Analogy for Wavefront Muxing/Demuxing

Figure 4A:
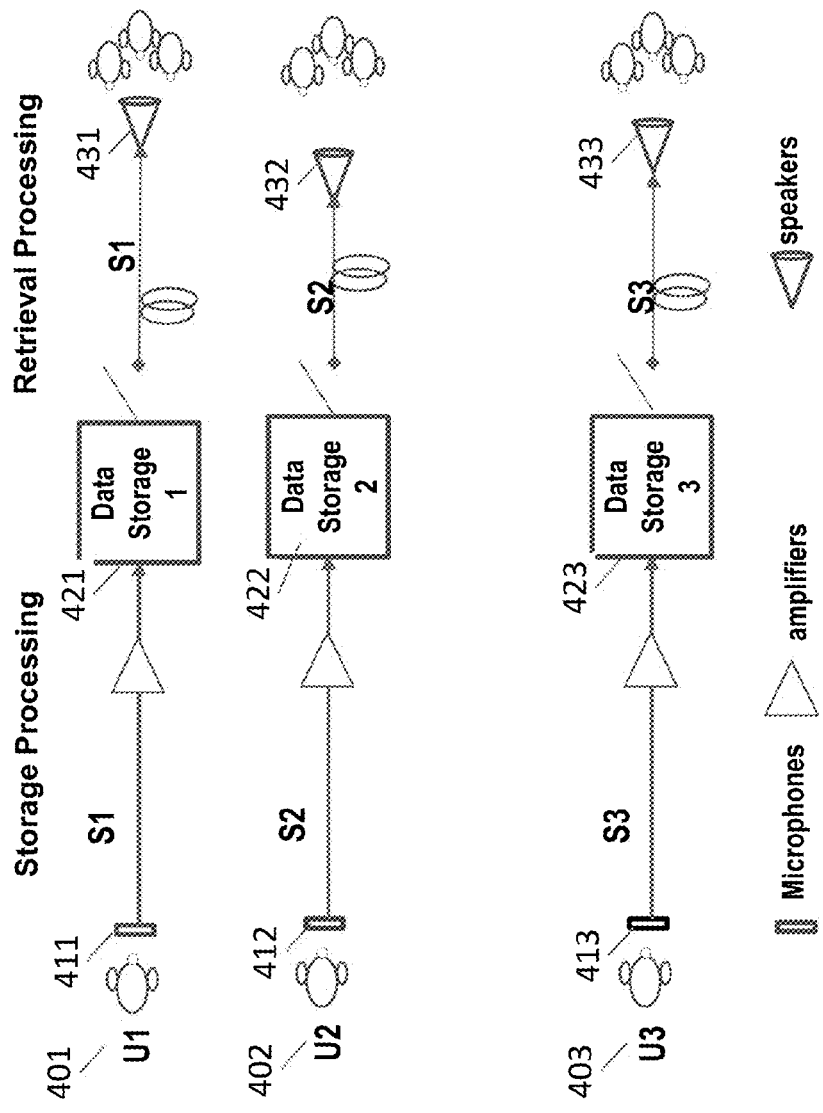
FIG. 4A illustrates data storage via an analog of acoustic signal processing; a conventional techniques of storing 3 independent voice streams via 3 independent microphones and three digitized data sets.

Referring to FIG. 4A, when there are three singers 401, 402, and 403, singing different songs, each of them will have his/her songs recorded separately and his/her own audio data stored individually, as shown in FIG. 4A. The conventional way of recording a song is to place a microphone 411, 412 or 413 very close to a vocalist's mouth, record her/his singing and then store the digital audio data S 1, S2, or S3 on a storage device 421, 422, or 423. Consequently, each storage site only features recorded acoustic data from one of the three vocalists 401, 402 and 403. When various audience groups want to listen to songs from the three different vocalists, the recorded audio data will be retrieved from different storage site and played accordingly by various speakers 431, 432, and 433.

Figure 4B:
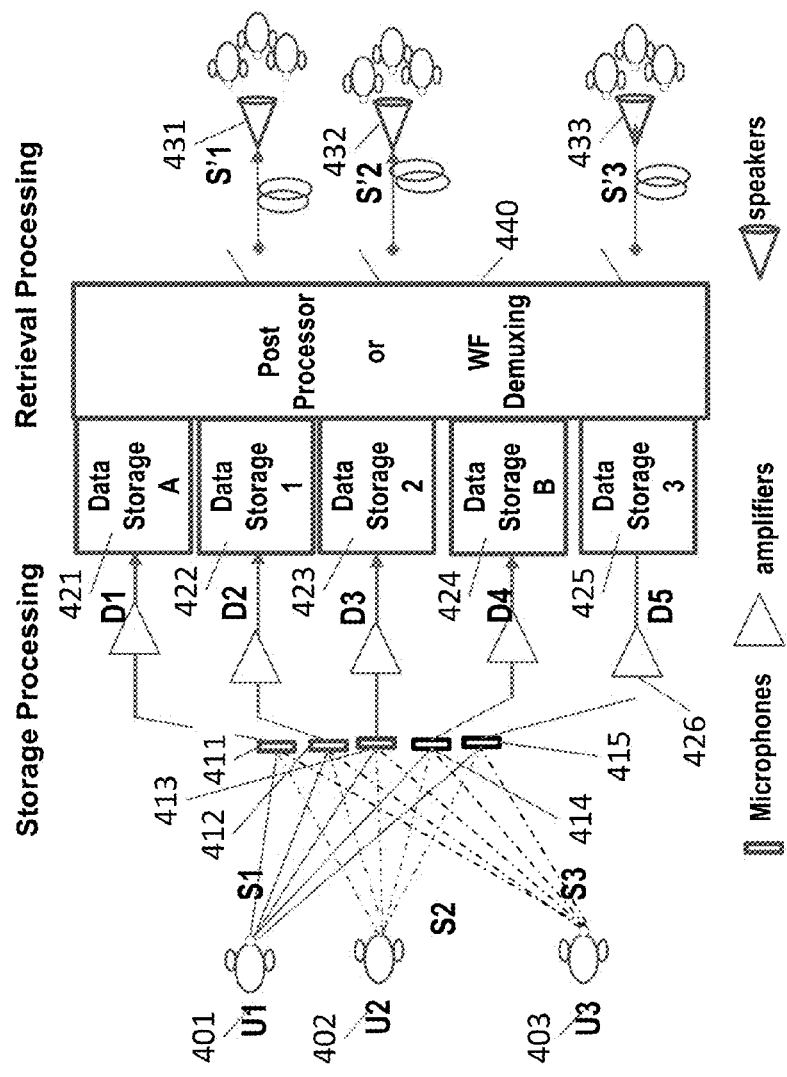
FIG. 4B illustrates data storage via an analog of acoustic signal processing; a WF muxed techniques of storing 3 independent voice streams via 5 independent microphones and three digitized data sets.

With WF muxing techniques, the methods of recording and storing would be different. Again there are three vocalists, 401, 402, and 403, singing three different songs concurrently, as depicted in FIG. 4B. Then, we would use five different microphones 411, 412, 413, 414, and 415, each of which links to a corresponding one of storage devices 421, 422, 423, 424 and 425, to receive the audio data sets S1-S3, spatially aggregated, from the three singers 401, 402 and 403, i.e. sound sources. The aggregated audio data sets may sound simply as "noise". The three vocalists 401, 402 and 403, in this example, stand in a first line with about one meter between 401 and 402, and about two meters between 402 and 403. Alternatively, a distance between mouths of neighboring two of the singers 401, 402 and 403 may range from 30 cm to 50 m or from 50 cm to 10 m. The five microphones 411-415, facing the vocalists, are placed in a second line, which is about three meters away from the first line. Alternatively, a distance between the first and second lines may range from 50 cm to 50 m or from 2 m to 20 m. The spacing between adjacent microphones is approximately ⅒ of a meter. A distance between centers of neighboring two of the microphones 411-415 may range from 5 cm to 10 m or from 10 cm to 1 m. When recording concurrently, each of the microphones 411-415 picks up or receives voices from all three vocalists 401, 402 and 403.

Referring to FIG. 4B, because each neighboring two of the five microphones 411-415 may be placed in a different space or distance from other neighboring two of the five microphones 411-415 and each neighboring two of the three vocalists 401, 402 and 403 may be positioned in a different space or distance from other neighboring two of the three vocalists 401, 402 and 403, an audio stream S1, S2 or S3 from each of the singers 401, 402 and 403 transmits to the five microphones 411-415 with particular time delays. A "wavefront" or WF is thus formed by acoustic wave propagation with the time delays in a particular geometry (i.e., in this instance, a position of one of the vocalists 401-403 relative to that of each of the five microphones 411-415, and relative to that of the other of the vocalists 401-403). Consequently, with respect to one of the vocalists 401-403, the five microphones 411-415 "spatially" sample and record a unique wavefront of acoustic waves S1, S2 or S3 propagated from said one of the vocalists 401-403. The three unique acoustic wavefronts S1-S3 originated distinctively from the vocalists 401, 402 and 403 are aggregated by audio propagation in free space, spatially sampled by the five microphones 411-415 into five sampled data sets D1-D5 to be stored in five respective storage sites or devices 421-425. The acoustic data sets S1-S3 are spatially aggregated to be recorded via the 5 microphones 411-415 spatially sampling and recording wavefronts of the aggregation of the acoustic data sets S1-S3 concurrently.

The above aggregation process may be considered as "wavefront multiplexing or WFM", and the aggregated acoustic data sets D1-D5 may be considered as WF "muxed" audio data.

The memory size required for storing a single vocal stream from a vocalist may be identical to that for the aggregated acoustic data sets D1-D5, each of which is a linear combination of the acoustic waves from the three vocalists 401, 402 and 403. Also, as mentioned before, if a person listens to one of the aggregated audio data sets D1-D5, the person may hear an audio "noise" composed of the three incoherent acoustic waves concurrently generated from the three vocalists 401, 402 and 403.

Figure 4C:
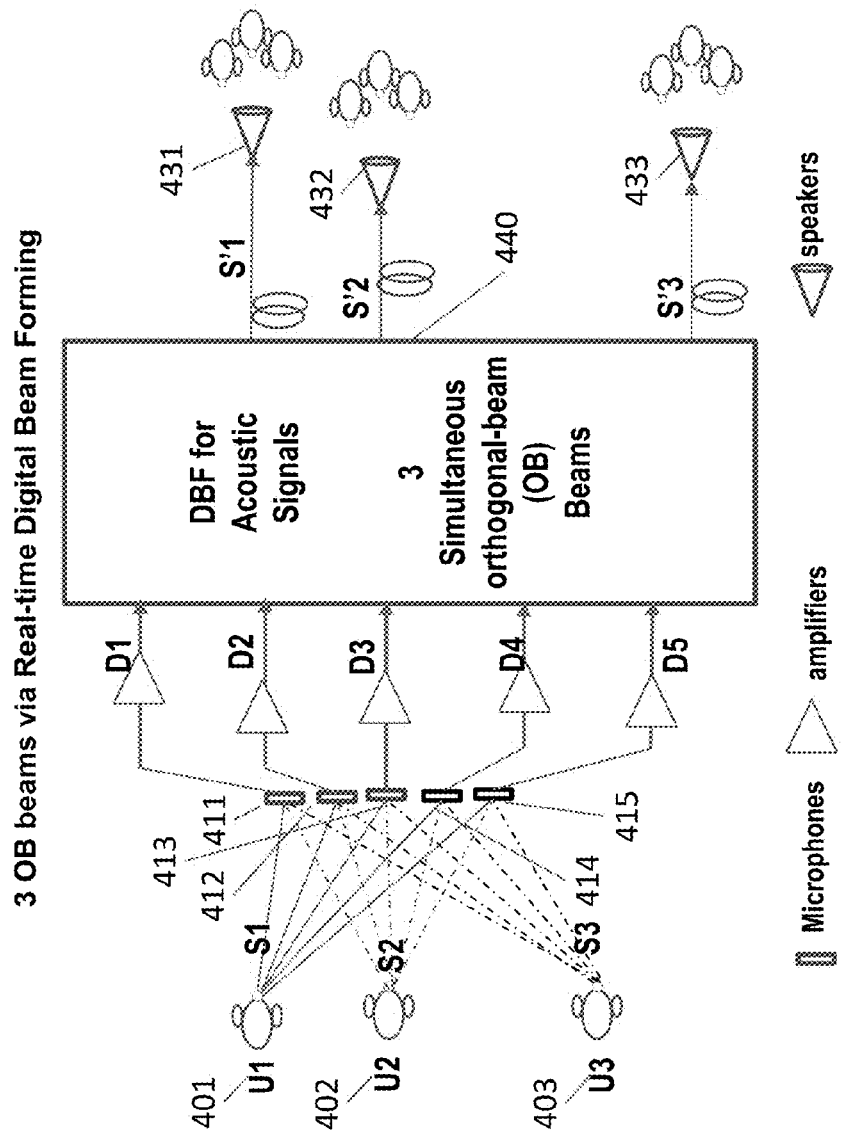
FIG. 4C illustrates data outputs via an analog of acoustic signal processing; a WF demuxed processing shall function as 3 acoustic orthogonal-beam (OB) beam-forming-network (BFN) for the acoustic array with 5 microphones. Each OB beam output is an output of reception patent with a directional gain peak of the 5 element array steered to one of the vocalists, and concurrently 2 independent nulls formed in the directions of the other vocalists.

Referring to FIG. 4B, when various audience groups want to listen to songs from the three individual vocalists 401, 402 and 403, three audio data sets S'1-S'3 may be retrieved by a postprocessor 440 from all of the five aggregated acoustic data sets D1-D5 stored in the 5 respective storage sites 421, 422, 423, 424 and 425, and then may be played accordingly by three speakers 431, 432 and 433 respectively. The postprocessor 440 will use information of various time delays of the acoustic data sets S1-S3 from 3 vocalists 401, 402 and 403 to 5 different microphones 411, 412, 413, 414 and 415 to unscramble songs, i.e. the acoustic data sets S1-S3, from the 3 individual vocalists 401-403. It is a reversing process of WF muxing (WFM), and each of the three singers' audio streams or data sets S'1-S'3, substantially equivalent to the acoustic data sets S1-S3 respectively, may be individually retrieved and reconstituted from the aggregated data sets D1-D5 stored in respective storage sites 421-425 via an inversed wavefront transformation referred to as "wavefront demultiplexing or WFM demux". The wavefront demuxer 440 may generate outputs or acoustic data sets S'1-S'3, each of which may be a linear combination of the inputs of the wavefront demuxer 440, i.e. aggregated data sets D1-D5, each weighted by a corresponding weighting parameter, which may be a complex number. Each of the outputs or acoustic data sets S'1-S'3 contains information associated with all of the inputs of the wavefront demuxer 440, i.e. aggregated data sets D1-D5. Furthermore, before stored in the respective storage sites 421-421, the acoustic aggregated data sets D1-D5 are may be amplified by five amplifiers 426. Functionally, they are no more than a beam forming processing for orthogonal beams (OB) as depicted in FIG. 4C. Post processing functions may be provided by a multi-beam beam former, i.e. WF demuxer 440, accompanying with the 5 microphones 411-415 arranged in an acoustic array, generating three orthogonal beams S'1-S'3 concurrently.

Figure 4D:
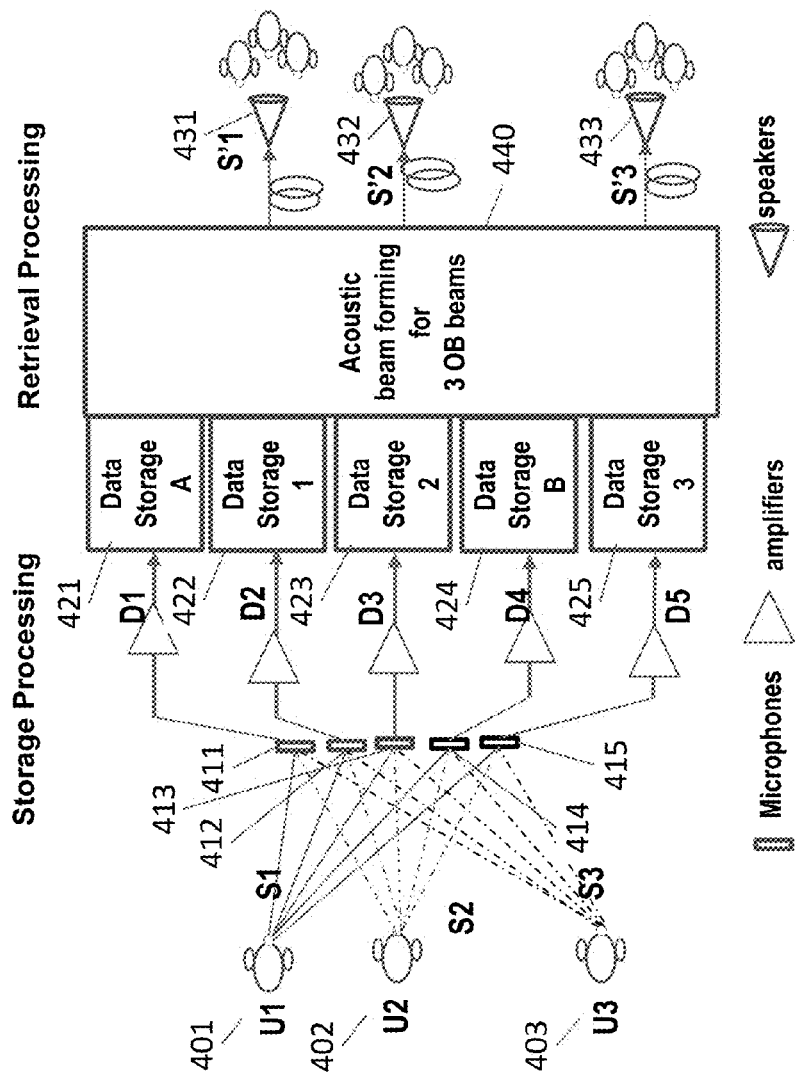
FIG. 4D illustrates data retrieval via an analog of acoustic signal processing; three stream of acoustic signals are WF muxed into 5 linear combinations of the three acoustic signals. These muxed signals are then stored individually on cloud. Only 3 of the 5 stored data are need to recover any one or all three of the original acoustic signal streams.

In this example, referring to FIGS. 4B-4D, the three vocalists 401-403 are almost in a far field of the acoustic array with 5 microphones 411-415 distributed over a linear dimension about 0.5 m. Far fields of the acoustic array for an acoustic wave at 1 KHz are about 3 m away from the second line where the 5 microphones 411-415 are arranged. The vocalists 401-403 are 3 meters in front of the acoustic array.

Figure 4E:
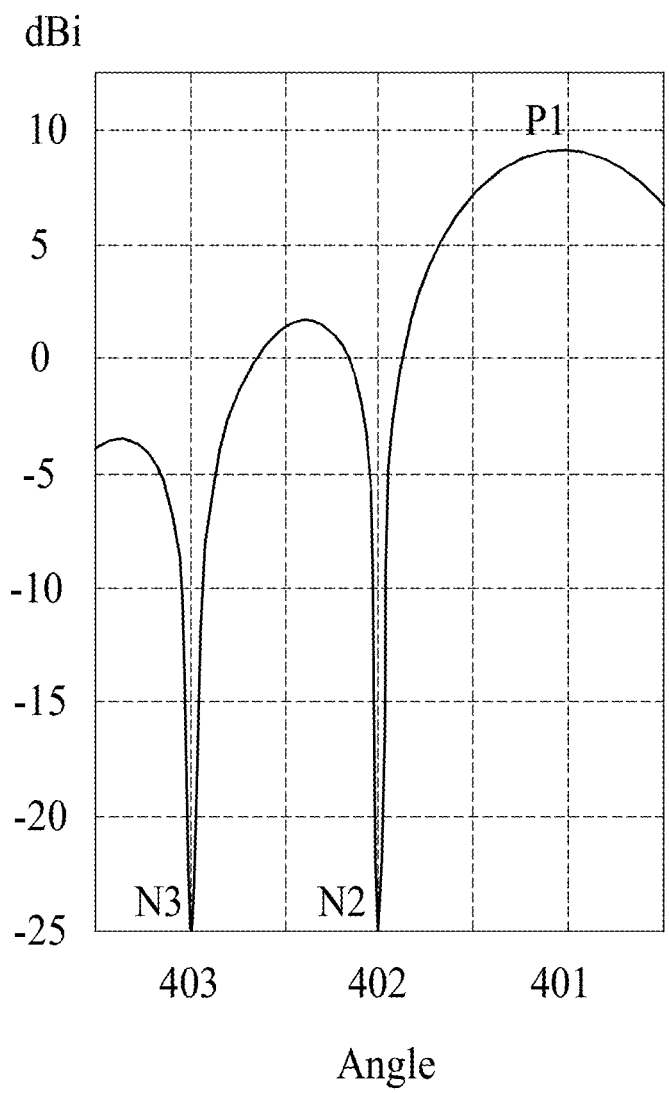
FIGS. 4E-4G shows orthogonal beams in accordance with the present invention.

Referring to FIGS. 4B-4D, orthogonal beams (OB) are a group of beams pointing to various directions with unique features that a peak of one beam is always at nulls of all other orthogonal beams. For example, the orthogonal beam S'1 has a beam peak at nulls of the orthogonal beams S'2 and S'3. The receiving linear acoustic array with 5 microphones 411-415 is used to form three OB beams S'1-S'3 concurrently via a digital beam forming (DBF) processing performed by the WF demuxer 440. FIG. 4E shows a first orthogonal beam S'1 in accordance with the present invention. For real time operation, the first orthogonal beam S'1 features an acoustic pattern with a beam peak at a gain of about 9 dBi pointed to the singer 401, a first null at a gain of about −25 dBi pointed to the singer 402 and a second null at a gain of about −25 dBi pointed to the singer 403. As a result, the first orthogonal beam S'1 shall enhance the expression of the acoustic data set S1 since the acoustic data sets S2 and S3 are nulled out by the DBF processing performed by the WF demuxer 440. The first orthogonal beam S'1 at an output of the WF demuxer 440 may enhance gain in the direction of the performer 401 by about 7 dB enhancement on a signal-to-noise ratio (SNR) and concurrently suppress gain in the directions of the performers 402 and 403 by more than between 20 and 40 dB relative to the gain in the direction of the performer 401. Accordingly, there is an isolation or difference of greater than 30 dB in the beam S'1 between the enhanced acoustic data set from the performer 401 and the suppressed undesired acoustic data set from one of the other two performers 402 and 403. The audio data set S'1 may be played via the first speaker 431 receiving the first orthogonal beam S'1.

Figure 4F:
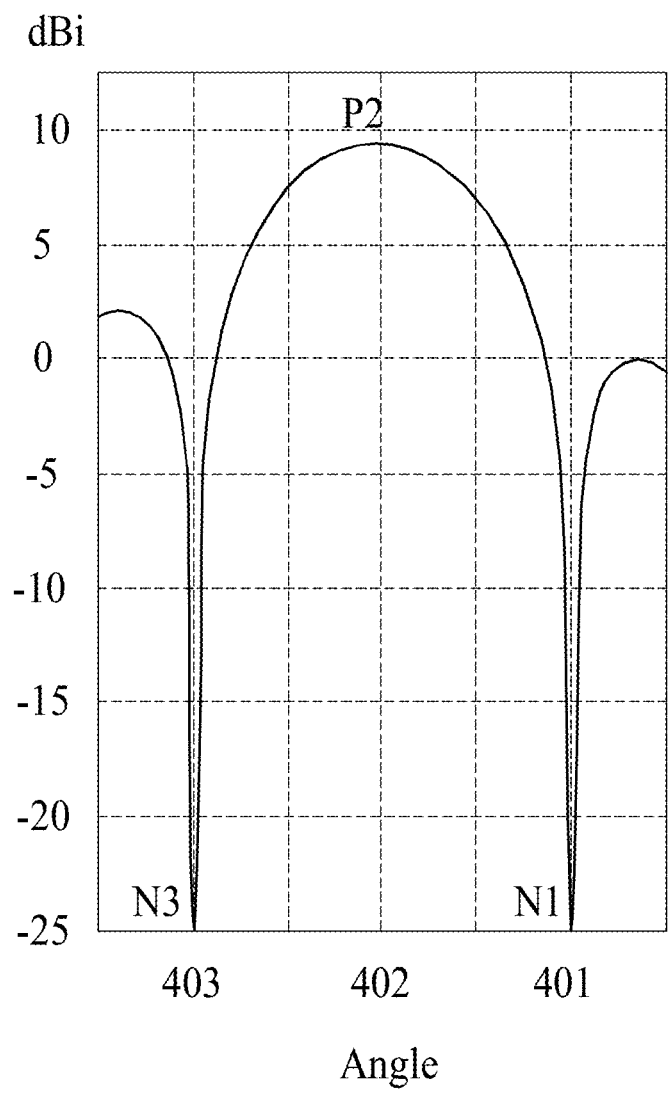

FIG. 4F shows a second orthogonal beam S'2 in accordance with the present invention. Referring to FIG. 4F, the second orthogonal beam S'2 features an acoustic pattern with a beam peak P2 at a gain of about 9 dBi pointed to the singer 402, a first null N1 at a gain of about −25 dBi pointed to the singer 401 and a second null N3 at a gain of about −25 dBi pointed to the singer 403. As a result, the second orthogonal beam S'2 shall enhance the expression of the acoustic data set S2 since the acoustic data sets S1 and S3 are nulled out by the DBF processing performed by the WF demuxer 440. The second orthogonal beam S'2 at an output of the WF demuxer 440 may enhance gain in the direction of the performer 402 by about 7 dB enhancement on a signal-to-noise ratio (SNR) and concurrently suppress gain in the directions of the performers 401 and 403 by more than between 20 and 40 dB relative to the gain in the direction of the performer 402. Accordingly, there is an isolation or difference of greater than 30 dB in the beam S'2 between the enhanced acoustic data set from the performer 402 and the suppressed undesired acoustic data set from one of the other two performers 401 and 403. The audio data set S'2 may be played via the second speaker 432 receiving the second orthogonal beam S'2.

Figure 4G:
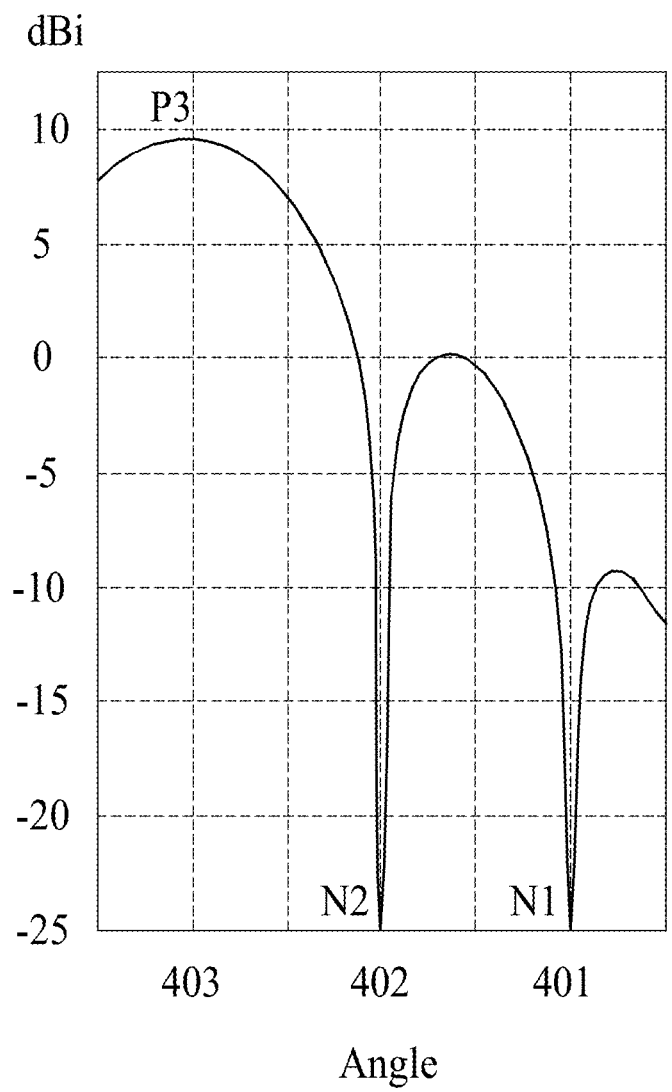

FIG. 4G shows a third orthogonal beam S'3 in accordance with the present invention. Referring to FIG. 4G, The third orthogonal beam S'3 features an acoustic pattern with a beam peak P3 at a gain of about 9 dBi pointed to the singer 403, a first null N1 at a gain of about −25 dBi pointed to the singer 401 and a second null N2 at a gain of about −25 dBi pointed to the singer 402. As a result, the third orthogonal beam S'3 shall enhance the expression of the acoustic data set S3 since the acoustic data sets S1 and S2 are nulled out by the DBF processing performed by the WF demuxer 440. The third orthogonal beam S'3 at an output of the WF demuxer 440 may enhance gain in the direction of the performer 403 by about 7 dB enhancement on a signal-to-noise ratio (SNR) and concurrently suppress gain in the directions of the performers 401 and 402 by more than between 20 and 40 dB relative to the gain in the direction of the performer 403. Accordingly, there is an isolation or difference of greater than 30 dB in the beam S'3 between the enhanced acoustic data set from the performer 403 and the suppressed undesired acoustic data set from one of the other two performers 401 and 402. The audio data set S'3 may be played via the second speaker 433 receiving the second orthogonal beam S'3.

For the analogy of data storage depicted in FIG. 4D, the wavefronts from the three performers 401-403 are aggregated in the free space to be received by the microphones 411-415. The microphones 411-415 may generate the five aggregated acoustic data sets D1-D5 to be stored respectively in the five storage sites 421, 422, 423, 424 and 425. Alternatively, the wavefront multiplexed acoustic data sets D1-D5 may be stored in five respective local folders, at a transmitting site, synchronized automatically in series with the five storage or mirror sites 421-425 in IP cloud, which may be provided by different cloud storage providers respectively, via Internet. Furthermore, multiple links linking to the five acoustic data sets D1-D5 stored in the five respective data storage or mirror sites 421-425 may be passed to one or more of the storage or mirror sites 421-425 and/or stored in the transmitting site. The wavefront multiplexed acoustic data sets D1-D5 may be transmitted to the WF demuxer 440 to form the three orthogonal beams S'1-S'3, as illustrated in FIGS. 4C-4G. Alternatively, the WF demuxer 440 may receive the acoustic data sets D1-D5 from separated local folders, i.e. memory sets in a local memory device at a receiving site, synchronized automatically in series with the 5 respective storage or mirror sites 421-425 in IP Cloud storage via Internet optionally in accordance with the links passed from one or more of the storage or mirror sites 421-425 or transmitting site to the receiving site.

It is important to note that the three retrieved audio streams S'1, S'2 and S'3 derive from a common set of the five stored WF muxed data sets D 1-D5. Conceivably, a common set of these 5 WF muxed data D1-D5 may be WF demuxed into three retrieved audio streams S'1, S'2 and S'3 to be efficiently multicast to three groups of audiences independently but concurrently with some delivering redundancies via Internet or IP cloud.

Redundancies built in the acoustic receiving array, which means the number of the microphones, e.g. the 5 microphones 411-415 in this embodiment, is greater than that of the performers, e.g. the 3 singers 401-403 in this embodiment, provide many advantages including graceful degradations. In this particular instance, the acoustic data set S'1-S'3 from each singer's own independent audio stream can be retrieved and reconstituted from any three of the five stored aggregated audio data sets D1-D5 stored in the 5 storage sites 421, 422, 423, 424 and 425. The remaining two of the aggregated audio data sets D1-D5 thus serves as a redundancy (or backup) for the three acoustic data sets S1, S2 and S3.

It is important to notice that the redundancy in wavefront multiplexing is for the three acoustic data sets S1, S2 and S3. Redundancies are "shared" for the three acoustic data sets S1, S2 and S3. The redundant data, i.e. the remaining two of the aggregated audio data sets D1-D5, appears themselves as aggregated noises. As an example of calculating data survivability, the WF muxing technique to assure survivability of 99.9% over next month will require a memory service provider with 5× storages for 3× size of data with a 90% data survivability of a single storage (reliability of the storage devices) over the next month. On the other hand, a conventional brute force technique, RAID 1 (mirroring), to assure data survivability of 99.9% over next month will require the same memory service provider with 3× storages for X size of data with a 90% survivability of a single storage (reliability of the storage devices) over the next month. Brute force techniques (such as RAID 1) shall require 9× memories for 3× data to achieve the same survivability as those from a WF muxing technique which only needs 5× memories for 3× data.

The acoustic wave propagation phenomena in this example, in which various wavefronts are concurrently generated, can always be replicated in computers "mathematically". Only some selected geometries linking the vocalists 401 to 403 and microphones 411 to 415 may be easily formulated via orthogonal transformations such as Fourier transform, Hadamard transform, and etc. On the other hand, not all the orthogonal transformations generating various orthogonal wavefronts for distributed data storages can be analogized to a simple geometry linking vocalists and microphones by acoustic wave propagations.

Referring to FIGS. 4C and 4D, it is also true that to form orthogonal beams may not need beam former representable by orthogonal matrixes. As illustrated in this example in which the acoustic array shall form three OB beams S'1-S'3 with 5 receiving elements 411-415, the beam forming mechanisms performed by the WF demuxer 440 shall be characterized, in general by a 3*5 matrix for multiplying the aggregated acoustic data set of $[D1, D2, D3, D4, D5]^T$. Many subsets of 3*3 matrixes degenerated from the 3*5 matrix are not orthogonal matrixes. Their inverse matrixes are not themselves.

From array antenna points of view, the first OB beam S'1 is formed by 5 receiving elements 411-415, which feature 5 degrees of freedom but only constrained by 3 directions, i.e. a beam peak P1 in the direction of the performer 401, a first beam null N2 in the direction of the performer 402, and a second null N3 in the direction of the performer 403, as seen in FIG. 4E. Similarly, the second and the third OB beams S'2 and S'3 are respectively generated by the same 5 receiving elements 411-415 (5 degrees of freedom) and two different sets of 3 directional constraints, as seen in FIGS. 4F and 4G. These beam form networks are characterized by 3 simultaneous but independent linear equations with 5 variables.

Orthogonal matrixes are sufficient conditions for forming orthogonal beams. They are overly constrained requirements. In this invention application, we use square matrixes, i.e. Hadamard matrix, with full ranks for WF muxing and demuxing performed by the WF muxer 101 and WF demuxer 111, 111a or 440 as illustrated in FIGS. 1-4D; these matrixes may be orthogonal, and may not be orthogonal. However, orthogonal matrixes offer some unique features which may be advantageous for a certain applications.

FIGS. 5A, 5B, 5C, 5D and 5E illustrate data privacy for storage and transport on cloud. In imaging processing simulations, we use "pixel intensity" of images as means for linear combinations, presenting how to generate WF muxed data from multiple original image data sets to be stored on cloud, and how to reconstitute multiple original data from stored datasets on cloud. The headers and trailers of the digital image files are not included in simulations.

Two image processing software functions in Matlab are utilized, 'imread' and 'imwrite'. The function 'imread' imports images from the original graphical files. The function 'imwrite' converts the wavefront multiplexed and recovered images to graphics. Pixel dimensions among the input images are "equalized" so that they feature same pixel dimensions. In addition, double precision arithmetic is implemented to avoid overflow and underflow on numerically positive image data for both WF muxing/demuxing process. As a result, the WF muxed data is not minimized in size.

Figure 5A:
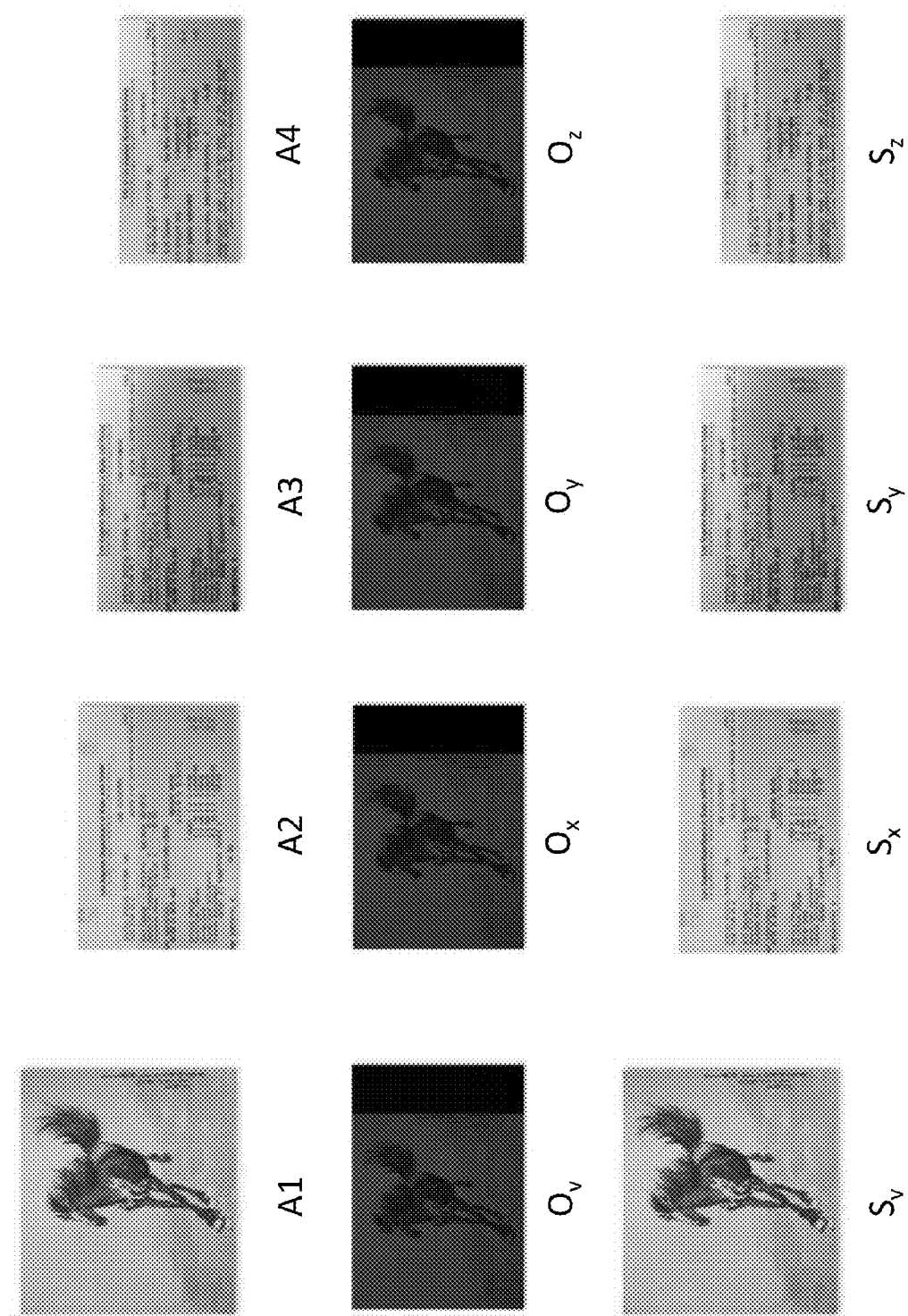
FIG. 5A illustrates image data storage and transport via wavefront muxing by an orthogonal matrix without redundancy, retrieval via a corresponding wavefront demuxing matrix. The muxing/demuxing transformations are performed pixel-by-pixel.

FIG. 5A depicts secured storage and transport of utility bills on smart grid via WF muxing/demuxing or orthogonal transformations. FIG. 5A depicts the original inputs in the first row, stored images in wavefront muxed formats in the second row, and reconstituted and recovered images in the third row, respectively.

First row shows 4 original images. Second and third rows depict, respectively, 4 Wavefront muxed image, and 4 recovered images.

The four pictures on the top row of FIG. 5A are the four input images; an image of a classic painting, a "Running Horse", by a famous Chinese painter Mr. Xu Beihong in 1930's, and 3 utility bills. They are represented in Portable Network Graphics (PNG) format. Their pixel sizes in a rectangular lattice format are summarized in the first three rows of Table 1, ranging from 1280 to 1565 in one dimension and 621 to 890 in the other dimension. The data sets A1, A2, A3, and A4 may be fully equalized in pixel dimensions into 4 respective data sets A1e, A2e, A3e, and A4e in a lattice format of 1595*890 for pixels with respective intensities, wherein the equalized images A1e-A4e may have the number of rows, equal to or greater than the largest number of rows among the original images A1-A4, and the number of column, equal to the largest number of columns among the original images A1-A4.

Referring FIG. 5A, the WF muxing/demuxing transformations on pixel levels are pixel-by-pixel operations. One formulation for the concurrent pixel level operations on these 4 images including the 4 pictures is to select a pixel, e.g. in the $110^{th}$ column and the $23^{rd}$ raw, from a lattice position, (xi, yj), of the four pixel matrixes of the four equalized images, i.e. A1e, A2e, A3e, and A4e. The intensities of the selected 4 input pixels, are represented as $\|A\|$.

TABLE 1 comparisons of image dimensions and sizes

| | Originals in PNG files | | | |
|---|---|---|---|---|
| | A1.png | A2.png | A3.png | A4.png |
| Dimensions | 1280 × 890 | 1565 × 810 | 1504 × 687 | 1595 × 621 |
| Size | 1.20 MB | 1.52 MB | 1.34 MB | 1.38 MB |
| | WF Muxed PNG files | | | |
| | Ov.png | Ox.png | Oy.png | Oz.png |
| Dimensions | 1595 × 890 | 1595 × 890 | 1595 × 890 | 1595 × 890 |
| Size | 4.78 MB | 4.78 MB | 4.78 MB | 4.78 MB |
| | Recovered PNG files | | | |
| | Sv.png | Sx.png | Sy.png | Sz.png |
| Dimensions | 1280 × 890 | 1565 × 810 | 1504 × 687 | 1595 × 621 |
| Size | 1.20 MB | 1.52 MB | 1.34 MB | 1.38 MB |

Referring to FIG. 5A, a "writing" processing features two steps: the first step is a pixel-by-pixel operation converting intensities of pixels on a specified lattice (xi, yj) location of the four pictures, i.e. A1e-A4e, in $\|A\|$ into 4 aggregated intensities of 4 WF muxed pixels and place 4 aggregated intensities of the 4 WF muxed pixels at the specified lattice location (xi, yj) in the four respective WF muxed files Ov, Ox, Oy and Oz in $\|O\|$, via the following transformation:

$$\|O\| = \|WMux\|\|A\| \tag{11a}$$

$$\text{where: } \|O\| = \begin{bmatrix} Ov \\ Ox \\ Oy \\ Oz \end{bmatrix} \tag{11a-1}$$

$$\|WMux\| = \begin{bmatrix} +1 & +1 & +1 & +1 \\ +1 & -1 & +1 & -1 \\ +1 & +1 & -1 & -1 \\ +1 & -1 & -1 & +1 \end{bmatrix} \tag{11a-2}$$

$$\|A\| = \begin{bmatrix} A1e \\ A2e \\ A3e \\ A4e \end{bmatrix} \tag{11a-3}$$

Referring to FIG. 5A, "intensities" of individual pixels, in the lattice of the same row and column, of the 4 WF muxed files, i.e. Ov, Ox, Oy and Oz, are 4 respective linear combinations, each of which is a linear combination of intensities of individual pixels, in the lattice of the same row and column, of the 4 equalized files, i.e. A1e, A2e, A3e and A4e, $\|A\|$, multiplied by four respective weighting parameters in $\|WMux\|$. Four weighting parameters for multiplying one of the data sets A1e-A4e, such as the data set A1e with an image of a horse, may have an identical absolute value greater than another identical absolute value of four other weighting parameters for multiplying another one of the data sets A1e-A4e, such as the data set A2e, A3e or A4e, by a scalar or emphasizing factor such as greater than two, five, ten or even one hundred. For example, "intensities" of individual pixels, in the lattice of the $41^{th}$ row and $51^{th}$ column, of the 4 WF muxed files, i.e. Ov, Ox, Oy and Oz, are 4 respective linear combinations, each of which is a linear combination of intensities of individual pixels, in the lattice of the $41^{th}$ row and $51^{th}$ column, of the 4 equalized files, i.e. A1e, A2e, A3e and A4e, in $\|A\|$, multiplied by four respective weighting parameters in $\|WMux\|$. The selected 4*4 matrix, $\|WMux\|$, is a Hadamard matrix with a rank of 4.

Referring to FIG. 5A, the second step involves transporting the 4 WF muxed files individually to different data storages on smart grid or to 4 respective local folders, at a transmitting site, synchronized automatically in series with 4 storage or mirror sites in IP cloud, which may be provided by different cloud storage providers respectively, via Internet. Furthermore, multiple links linking to the four data sets stored in the four respective data storage or mirror sites may be passed to one or more of the respective storage or mirror sites and/or stored in the transmitting site. Some of the WF muxed data sets, i.e. Ov, Ox, Oy and Oz, may be also stored locally at the transmitting site. The 4 pictures in the second raw in FIG. 5A are the images of the 4 WF muxed files, i.e. Ov, Ox, Oy and Oz, displayed through a conventional png image display. Their sizes are summarized in second three rows in Table 1. It appears that these WF muxed images exhibit features of "horse" with appearances of low brightness, there are no traces of other 3 images at all.

Referring to FIG. 5A, the images on the third row are restructured images via a reading process. A "reading" processing also features two steps. The first step involves retrieving all 4 WF muxed files individually from various data storage on smart grid or from 4 separated local folders, i.e. memory sets in a local memory device at a receiving site, synchronized automatically in series with the 4 respective storage or mirror sites in IP Cloud storage via Internet optionally in accordance with the links passed from the respective storage or mirror sites or transmitting site to the receiving site. The second step involves via a wavefront demultiplexing transformation, converting the 4 WF muxed files, i.e. Ov, Ox, Oy and Oz, in ‖O‖ into four recovered or reconstituted equalized files Sve, Sxe, Sye and Sze in ‖S‖ substantially equivalent to the four equalized pictures A1e-Ae4 respectively if the WF muxed files, i.e. Ou, Ov, Ox, Oy and Oz, are not contaminated. The four recovered or reconstituted equalized image files Sve, Sxe, Sye and Sze may then be converted via a de-equalizing process into four recovered or reconstituted image files Sv, Sx, Sy and Sz substantially equivalent to the four original pictures A1-A4 respectively. Assuming all four files Ov, Ox, Oy and Oz are available, the WF demuxing transformation (WF demuxing) shall follow: ‖S‖=‖WDmx‖‖O‖. Furthermore, ‖WDmx‖‖WMux‖=‖I‖. More explicitly, "intensities" of individual pixels, in the lattice of the same row and column, of the 4 reconstituted images in Sve, Sxe, Sye and Sze in ‖S‖ are 4 respective linear combinations, each of which is a linear combination of intensities of individual pixels, in the lattice of the same row and column, of the four WF muxed files, i.e. Ov, Ox, Oy and Oz, in ‖O‖, multiplied by four respective weighting parameters in ‖WDmx‖. Five weighting parameters, multiplying the WF muxed files, i.e. Ov, Ox, Oy and Oz, in ‖O‖, for obtaining the emphasized one of the data sets Sve, Sxe, Sye and Sze, such as the data set Sve with an image of a horse, may have an identical absolute value less than another identical absolute value of four weighting parameters, multiplying the WF muxed files, i.e. Ov, Ox, Oy and Oz, in ‖O‖, for obtaining another one of the data sets Sve, Sxe, Sye and Sze, such as the data set Sxe, Sye or Sze, by a scalar or contracting factor such as greater than two, five, ten or even one hundred. The contracting factor may be equal to a reciprocal of the emphasizing factor. For example, "intensities" of individual pixels, in the lattice of the $41^{th}$ row and $51^{th}$ column, of the 4 reconstituted or recovered images in Sve, Sxe, Sye and Sze in ‖S‖ are 4 respective linear combinations, each of which is a linear combination of intensities of individual pixels, in the lattice of the $41^{th}$ row and $51^{th}$ column, of the four WF muxed files, i.e. Ov, Ox, Oy and Oz, in ‖O‖, multiplied by four respective weighting parameters in ‖WDmx‖.

In order to assure that the A1 image of the Chinese horse painting to be more dominant features in the 4 multiplexed outputs as camouflaged, we have emphasized the pixel intensities of A1 via:

$$\begin{bmatrix} O1 \\ O2 \\ O3 \\ O4 \end{bmatrix} = \begin{bmatrix} +1 & +1 & +1 & +1 \\ +1 & -1 & +1 & -1 \\ +1 & +1 & -1 & -1 \\ +1 & -1 & -1 & +1 \end{bmatrix} \begin{bmatrix} M*A1e \\ A2e \\ A3e \\ A4e \end{bmatrix} \quad (11b)$$

where M>1. Usually M is set to be greater than 10. Depending on the selection of a camouflaging image, the emphasizing factor, M, may applied to any of the input images in ‖A‖. Furthermore, equation (11b) may also be written equivalently as:

$$\begin{bmatrix} O1 \\ O2 \\ O3 \\ O4 \end{bmatrix} = \begin{bmatrix} +M & +1 & +1 & +1 \\ +M & -1 & +1 & -1 \\ +M & +1 & -1 & -1 \\ +M & -1 & -1 & +1 \end{bmatrix} \begin{bmatrix} A1e \\ A2e \\ A3e \\ A4e \end{bmatrix} \quad (11b-1)$$

Figure 5B:
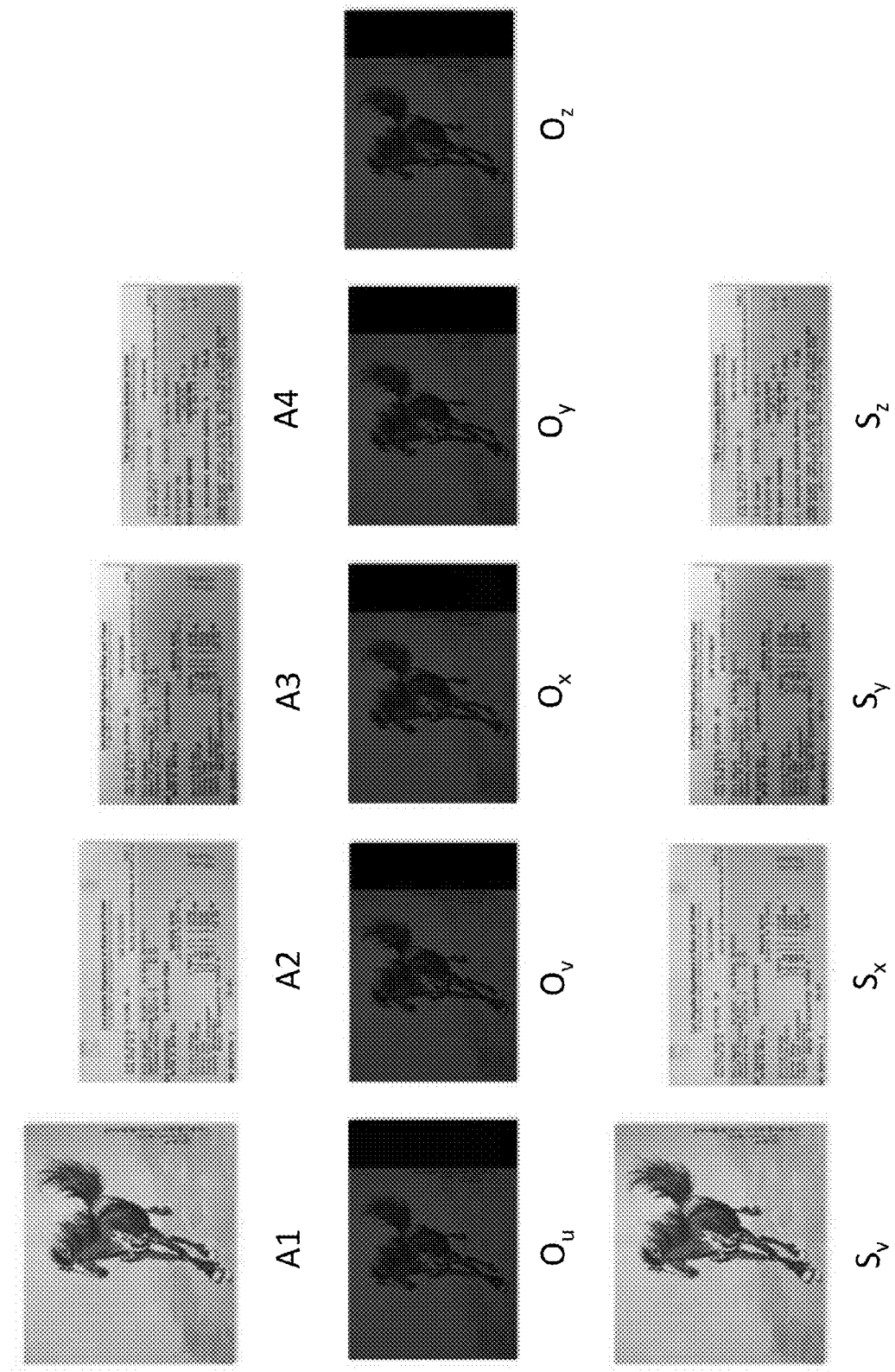
FIG. 5B illustrates image data storage and transport via wavefront muxing by orthogonal matrix with redundancy, retrieval via a corresponding wavefront demuxing matrix. The muxing/demuxing transformations are performed pixel-by-pixel.

FIG. 5B depicts WF muxed image processing with a 5-for-4 redundancy in stored images and image transport. The first row and the third row, respectively, depict the same 4 sets of images as those in FIG. 5A. On the other hand, there are 5 image displays with a setting of "low brightness" of the "horse" painting in the middle row. The WF muxing/demuxing transformations are pixel-by-pixel operations. One formulation for the concurrent pixel level operations on these 5 images including selecting intensities of pixels at an identical lattice position, (xi, yj), e.g. the $110^{th}$ column and the $23^{rd}$ raw, from the five pixel matrixes of the equalized data sets, A1e, A2e, A3e, A4e, and A5e, wherein the equalized images A1e-A4e may have the number of rows, equal to or greater than the largest number of rows among the original images A1-A4, and the number of column, equal to the largest number of columns among the original images A1-A4. The equalized image A5e is a matrix of pixels with the same dimensions of 1590*890, but each of the pixels in the equalized image A5e has an intensity value of "0". The intensities of the selected 5 input pixels are represented by ‖A'‖.

Referring to FIG. 5B, a "writing" processing features two steps. The first step is to convert intensities of pixels on a specified lattice (xi, yj) location from the four pictures, i.e. A1e-A4e, and the picture A5e with pixels of "zero" intensity in ‖A'‖ via the following wavefront multiplexing transformation into 5 aggregated intensities of 5 WF muxed pixels, and then place the 5 aggregated intensities of the 5 WF muxed pixels at the specified lattice location (xi, yj) in the five respective MF muxed files Ou, Ov, Ox, Oy and Oz in ‖O‖.

$$\|O\| = \|WMux\|\|A'\| \quad (12)$$

$$\text{Where: } \|O\| = \begin{bmatrix} Ou \\ Ov \\ Ox \\ Oy \\ Oz \end{bmatrix} \quad (12a)$$

$$\|WMux\| = \begin{bmatrix} +1 & +1 & +1 & +1 \\ +1 & -1 & +1 & -1 \\ +1 & +1 & -1 & -1 \\ +1 & -1 & -1 & +1 \\ +1 & +1 & +1 & -1 \end{bmatrix} \quad (12b)$$

$$\|A'\| = \begin{bmatrix} A1e \\ A2e \\ A3e \\ A4e \\ A5e \end{bmatrix} \quad (12c)$$

Referring to FIG. 5B, the "intensities" of individual pixels, in the lattice of the same row and column, of the 5 WF muxed files, i.e. Ou, Ov, Ox, Oy and Oz, are 5 respective linear combinations, each of which is a linear combination of intensities of individual pixels in the same row and column of the lattice of the 5 equalized files, i.e. A1e, A2e, A3e, A4e and A5e, ‖A‖, multiplied by five respective weighting parameters in ‖WMux‖. Five weighting parameters for multiplying one of the data sets A1e-A5e, such as the data set A1e with an image of a horse, may have an identical absolute value greater than another identical absolute value of five other weighting parameters for multiplying another one of the data sets A1e-A5e, such as the data set A2e, A3e or A4e, by a scalar or emphasizing factor such as greater than two, five, ten or even one hundred. For example, "intensities" of individual pixels, in the lattice of the $41^{th}$ row and $51^{th}$ column, of the 5 WF muxed files, i.e. Ou. Ov, Ox, Oy and Oz, are 5 respective linear combinations, each of which is a linear combination of intensities of individual pixels, in the lattice of the $41^{th}$ row and $51^{th}$ column, of the 5 equalized files, i.e. A1e, A2e, A3e, A4e and A5e, in ||A||, multiplied by five respective weighting parameters in ||WMux||.

The second step involves transporting the 5 WF muxed files, i.e. Ou. Ov, Ox, Oy and Oz, individually to 5 respective data storage sites on cloud or to 5 respective local folders, at a transmitting site, synchronized automatically in series with 5 respective data storage or mirror sites in IP cloud, provided by different cloud storage providers respectively, via Internet. Furthermore, multiple links linking to the five data sets stored in the five respective data storage or mirror sites may be passed to the respective storage or mirror sites and/or stored in the transmitting site. Some of the 5 WF muxed data sets, i.e. Ou. Ov, Ox, Oy and Oz, may be also stored locally at the transmitting site. The 5 pictures on the second raw are corresponding images of the 5 WF muxed files, i.e. Ou. Ov, Ox, Oy and Oz in ||O||, displayed through a conventional png image display.

Referring to FIG. 5B, the images on the third row are restructured images via a reading process. A "reading" processing also features two steps. The first step involves retrieving any four or all of the 5 WF muxed files, i.e. Ou, Ov, Ox, Oy and Oz, derived from 5 separated local folders, i.e. memory sets in a local memory device at a receiving site, synchronized automatically in series with the 5 respective storage or mirror sites in IP Cloud storage via Internet optionally in accordance with the links passed from the respective storage or mirror sites or transmitting site to the receiving site. The second step involves via a wavefront demultiplexing transformation, converting any four or all of the WF muxed files, i.e. Ou, Ov, Ox, Oy and Oz, in ||O|| into four recovered or reconstituted equalized image files Sve, Sxe, Sye and Sze in ||S|| substantially equivalent to the four equalized pictures A1e-Ae 4 respectively if the WF muxed files, i.e. Ou, Ov, Ox, Oy and Oz, are not contaminated. The four recovered or reconstituted equalized image files Sve, Sxe, Sye and Sze may then be converted via a de-equalizing process into four recovered or reconstituted image files Sv, Sx, Sy and Sz ||S|| substantially equivalent to the four original pictures A1-A4 respectively. Assuming four of the five files Ou, Ov, Ox, Oy and Oz are available, the WF demuxing transformation (WF demuxing) shall follow: ||S||=||WDmx||||O||. Furthermore, ||WDmx||||WMux||=||I||. More explicitly, "intensities" of individual pixels, in the lattice of the same row and column, of the 4 reconstituted images in Sve, Sxe, Sye and Sze in ||S|| are 4 respective linear combinations, each of which is a linear combination of intensities of individual pixels in the same row and column of the lattice of the available four of the WF muxed files, i.e. Ou, Ov, Ox, Oy and Oz, in ||O||, multiplied by four respective weighting parameters in ||WDmx||. Four weighting parameters, multiplying the available four of the WF muxed files, i.e. Ou, Ov, Ox, Oy and Oz, in ||O||, for obtaining the emphasized one of the data sets Sve, Sxe, Sye and Sze, such as the data set Sve with an image of a horse, may have an identical absolute value less than another identical absolute value of four weighting parameters, multiplying the available four of the WF muxed files, i.e. Ou, Ov, Ox, Oy and Oz, in ||O||, for obtaining another one of the data sets Sve, Sxe, Sye and Sze, such as the data set Sxe, Sye or Sze, by a scalar or contracting factor such as less than one second, one fifth, one tenth or even one hundredth. The contracting factor may be equal to a reciprocal of the emphasizing factor. For example, "intensities" of individual pixels, in the lattice of the $41^{th}$ row and $51^{th}$ column, of the 4 reconstituted images in Sve, Sxe, Sye and Sze in ||S|| are 4 respective linear combinations, each of which is a linear combination of intensities of individual pixels, in the lattice of the $41^{th}$ row and $51^{th}$ column, of the available four of the WF muxed files, i.e. any 4 of Ou, Ov, Ox, Oy and Oz, in ||O||, multiplied by four respective weighting parameters in ||WDmx||.

Figure 5C:
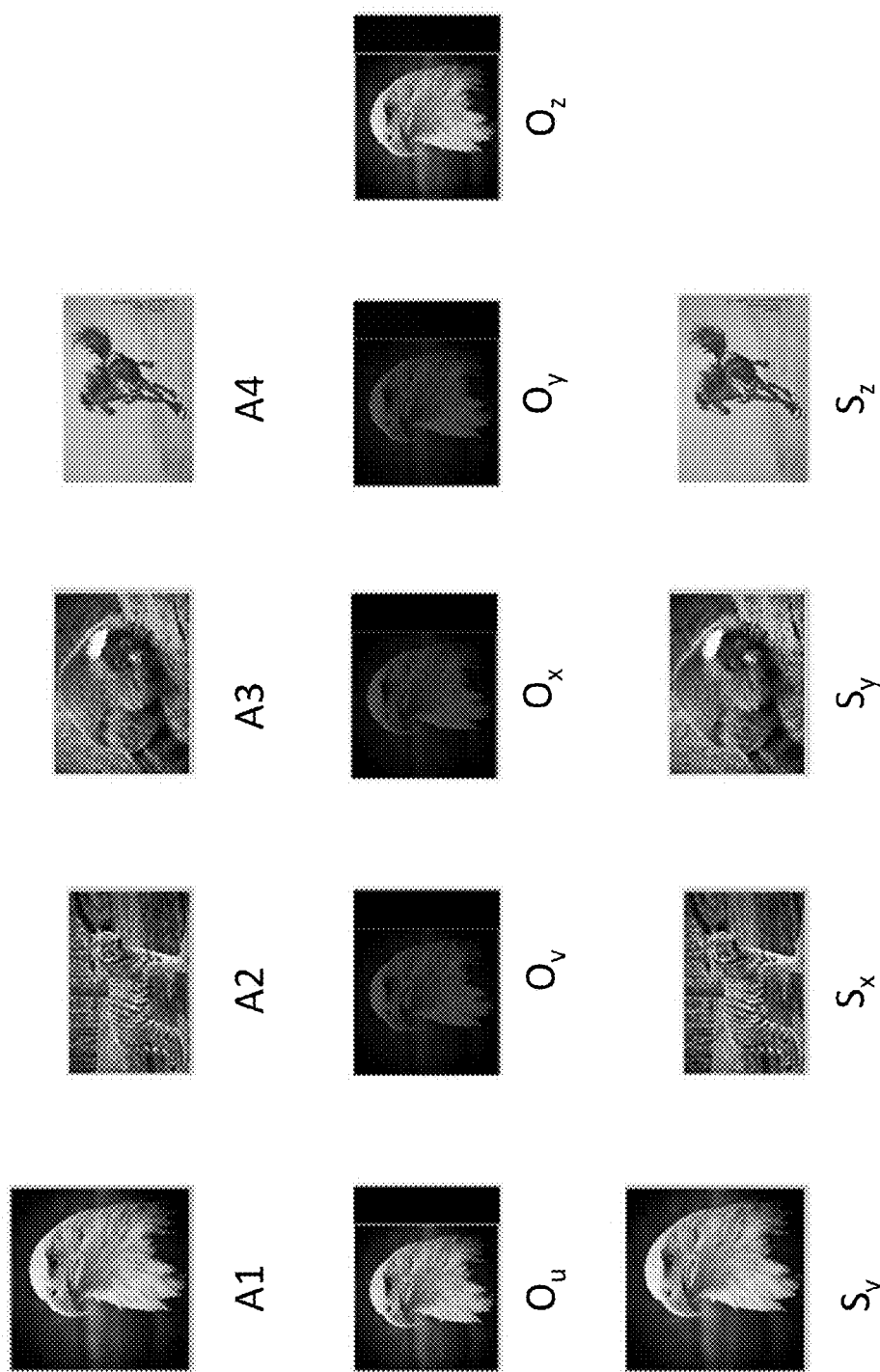
FIG. 5C illustrates image data storage and transport via wavefront muxing by a non-orthogonal matrix without redundancy, retrieval via a corresponding wavefront demuxing matrix. The muxing/demuxing transformations are performed pixel-by-pixel.

FIG. 5C illustrates another example of WF muxing/demuxing as pre-processing and post processing for a data storage application on cloud, presenting image storage/retrievals via 4-to-5 wavefront muxing on distributed cloud storages. The WF muxing/demuxing are via non orthogonal matrixes. It depicts the original inputs in the first row of FIG. 5C, stored images in wavefront muxed formats in the second row of FIG. 5C, and reconstituted and recovered images in the third row of FIG. 5C. The four pictures on the top row are four input images; 3 photos token recently at Bronx Zoo in city of New York, and the $4^{th}$ one is an image of a classic painting, "a running horse", by a famous Chinese painter Mr. Xu Beihong in 1930's. The first, the second and the third photos depict, respectively, a picture of an "Eagle" indicated as A1.png, a picture of a "Tiger" indicated as A2.png, and a picture of a "white head animal" indicated as A3.png. The "horse" is depicted as A4.png. They are all in PNG formats. Their pixel sizes in a rectangular lattice format are summarized in Table 2, ranging from 1024 to 1280 in one dimension and 683 to 1006 in the other dimension. The data sets A1, A2, A3, and A4 may be fully equalized in pixel dimensions into 4 respective data sets A1e, A2e, A3e, and A4e in a lattice format of 1280*1006 for pixels with respective intensities, wherein the equalized images A1e-A4e may have the number of rows, equal to or greater than the largest number of rows among the original images A1-A4, and the number of column, equal to the largest number of columns among the original images A1-A4. The equalized images A5e is a special matrix of pixels with the same dimensions of 1280*1006, but each of the pixels in the equalized image A5e has an intensity value of "0".

TABLE 2 original image dimensions and memory

| | Original PNG files | | | |
|---|---|---|---|---|
| | A1.png | A2.png | A3.png | A4.png |
| Dimensions | 1024 × 1006 | 1024 × 683 | 1024 × 768 | 1280 × 890 |
| Size | 1.06 MB | 1.19 MB | 1.51 MB | 1.20 MB |
| | Muxed PNG files | | | |
| | Ou.png | Ov.png | Ox.png | Oy.png |
| Dimensions | 1280 × 1006 | 1280 × 1006 | 1280 × 1006 | 1280 × 1006 |
| Size | 4.18 MB | 3.41 MB | 3.22 MB | 4.14 MB |
| | Recovered PNG files | | | |
| | Sv.png | Sx.png | Sy.png | Sz.png |
| Dimensions | 1024 × 1006 | 1024 × 683 | 1024 × 768 | 1280 × 890 |
| Size | 1.06 MB | 1.19 MB | 1.51 MB | 1.20 MB |

The WF muxing/demuxing transformations on pixel levels are pixel-by-pixel operations. One formulation for the concurrent pixel level operations on these 5 images including the 4 pictures is to select a pixel, e.g. in the $110^{th}$ column and the $23^{rd}$ raw, from a lattice position, (xi, yj), of the five pixel matrixes of the four equalized images, i.e. A1e, A2e, A3e, A4e, and A5e. The intensities of the selected 5 input pixels are represented as $\|A'\|$.

A "writing" processing features two steps: the first step is a pixel-by-pixel operation converting intensities of pixels on a specified lattice (xi, yj) location of the five equalized pictures, i.e. A1e, A2e, A3e, A4e and A5e into 5 aggregated intensities of 5 wavefront multiplexed (WF muxed) pixels and then place the 5 aggregated intensities of 5 WF muxed pixels at the specified lattice location (xi, yj) in the five respective MF muxed files Ou, Ov, Ox, Oy and Oz in $\|O\|$, via the following wavefront multiplexing transformation.

$$\|O\| = \|WMux\|\|A'\| \tag{12-1}$$

$$\text{Where: } \|O\| = \begin{bmatrix} Ou \\ Ov \\ Ox \\ Oy \\ Oz \end{bmatrix} \tag{12-1a}$$

$$\|WMux\| = \begin{bmatrix} 3 & 1 & 1 & 1 & 3 \\ 1 & -1 & 1 & -1 & 0 \\ 1 & 1 & -1 & -1 & 0 \\ 1 & -1 & 1 & 3 & 2 \\ 3 & 3 & -1 & 3 & 4 \end{bmatrix} \tag{12-1b}$$

Referring to FIG. 5C, "intensities" of individual pixels, in the lattice of the same row and column, of the 5 WF muxed files, i.e. Ou, Ov, Ox, Oy and Oz, are 5 respective linear combinations, each of which is a linear combination of intensities of individual pixels, in the lattice of the same row and column, of the 5 equalized files, i.e. A1e, A2e, A3e, A4e and A5e, in $\|A'\|$, multiplied by five respective weighting parameters in $\|WMux1\|$. Five weighting parameters for multiplying one of the data sets A1e-A5e, such as the data set A1e with an image of an eagle, may have an identical absolute value greater than another identical absolute value of five other weighting parameters for multiplying another one of the data sets A1e-A5e, such as the data set A2e, A3e or A4e, by a scalar or emphasizing factor such as greater than two, five, ten or even one hundred. For example, "intensities" of individual pixels, in the lattice of the $41^{th}$ row and $51^{th}$ column, of the 5 WF muxed files, i.e. Ou, Ov, Ox, Oy and Oz, are 5 respective linear combinations, each of which is a linear combination of intensities of individual pixels, in the lattice of the $41^{th}$ row and $51^{th}$ column, of the 5 equalized files, i.e. A1e, A2e, A3e, A4e and A5e, in $\|A'\|$, multiplied by five respective weighting parameters in $\|WMux\|$. Any 4 from the 5 equations, i.e. Ou, Ov, Ox, Oy and Oz, are independent. The selected 5*5 matrix, i.e. $\|WMux\|$, features a minimum matrix rank of 4.

Referring to FIG. 5C, the second step involves transporting the 5 WF muxed files, i.e. Ou, Ov, Ox, Oy and Oz, individually to 5 respective local folders, at a transmitting site, which shall be synchronized automatically in series with 5 respective data storage or mirror sites in IP cloud via Internet, wherein the 5 data storage or mirror sites may be provided by different cloud storage providers respectively. Furthermore, multiple links linking to the five data sets stored in the five respective data storage or mirror sites may be passed to the respective storage or mirror sites and/or stored in the transmitting site. Some of the WF muxed data sets, i.e. Ou, Ov, Ox, Oy and Oz, may be stored locally at the transmitting site. The 5 pictures on the second raw are the corresponding images of the 5 WF muxed files, i.e. Ou, Ov, Ox, Oy and Oz in $\|O\|$, displayed through a conventional png image display. Referring to FIG. 5C, it appears that these images exhibit features of camouflaged effects on the WF muxed data for storage; the original images have been "weighted" differently, and in this case the image of "Eagle" is emphasized. As a result, the "Eagle" image taken at Bronx Zoo appears on all 5 WF muxed data sets Ou, Ov, Ox, Oy and Oz in the second row with appearances of various intensity or brightness settings. There are no traces of other three images at all.

The third row in FIG. 5C depicts 4 restructured images from any 4 of the 5 WF muxed data sets Ou, Ov, Ox, Oy and Oz via a reading process. A "reading" processing also features two steps. The first step involves retrieving any 4 of the 5 WF muxed files, i.e. Ou, Ov, Ox, Oy and Oz, derived from 5 separated local folders, i.e. memory sets in a local memory device at a receiving site, synchronized automatically in series with the 5 respective storage or mirror sites in IP Cloud storage via Internet optionally in accordance with the links passed from the respective storage or mirror sites or transmitting site to the receiving site. The second step involves converting any four or all of the WF muxed files, i.e. Ou, Ov, Ox, Oy and Oz, in $\|O\|$ into four recovered or reconstituted equalized image files Sve, Sxe, Sye and Sze in $\|S\|$ via a wavefront demultiplexing transformation. The recovered or reconstituted equalized image files Sve, Sxe, Sye and Sze may be substantially equivalent to the four equalized pictures A1e-Ae4 respectively if the WF muxed files, i.e. Ou, Ov, Ox, Oy and Oz, are not contaminated. Assuming the available four files are Ov, Ox, Oy and Oz represented by $\|O1\|$, the WF demuxing transformation (WF demuxing) shall become:

$$\|S\| = \|WDmx1\|\|O1\| \tag{12-2}$$

$$\text{where: } \|S\| = \begin{bmatrix} Sve \\ Sxe \\ Sye \\ Sze \end{bmatrix} \tag{12-2a}$$

$$\|WDmx1\| = \begin{bmatrix} 1/4 & 1/2 & 1/4 & 0 \\ 1/4 & -1 & -3/4 & 1/2 \\ 3/4 & -3/2 & -3/4 & -1/2 \\ -1/4 & 0 & 1/4 & 0 \end{bmatrix} \tag{12-2b}$$

$$\|O1\| = \begin{bmatrix} Ov \\ Ox \\ Oy \\ Oz \end{bmatrix} \tag{12-2c}$$

Furthermore, $\|WDmx1\|\|WMux1\|=\|I\|$ (12-3)

$\|WMux1\|$ is a subset of $\|WMux\|$ where:

$$\|WMux1\| = \begin{bmatrix} 1 & -1 & 1 & -1 \\ 1 & 1 & -1 & -1 \\ 1 & -1 & 1 & 3 \\ 3 & 3 & -1 & 3 \end{bmatrix} \tag{12-3a}$$

Referring to FIG. 5C, "intensities" of individual pixels, in the lattice of the same row and column, of the 4 recovered or reconstituted equalized images, i.e. Sve, Sxe, Sye and Sze, in ||S||, are 4 respective linear combinations, each of which is a linear combination of intensities of individual pixels, in the lattice of the same row and column, of the available four WF muxed files, i.e. Ov, Ox, Oy and Oz, in ||O1||, multiplied by four respective weighting parameters in ||WDmx1||. Four weighting parameters, multiplying the available four WF muxed files, i.e. Ov, Ox, Oy and Oz, in ||O1||, for obtaining the emphasized one of the data sets Sve, Sxe, Sye and Sze, such as the data set Sve with an image of an eagle, may have an identical absolute value less than another identical absolute value of four weighting parameters, multiplying the available four WF muxed files, i.e. Ov, Ox, Oy and Oz, in ||O1||, for obtaining another one of the data sets Sve, Sxe, Sye and Sze, such as the data set Sxe, Sye or Sze, by a scalar or contracting factor such as less than one second, one fifth, one tenth or even one hundredth. The contracting factor may be equal to a reciprocal of the emphasizing factor. The four recovered or reconstituted equalized image files Sve, Sxe, Sye and Sze may then be converted via a de-equalizing process into four recovered or reconstituted image files Sv, Sx, Sy and Sz substantially equivalent to the four original pictures A1-A4 respectively. For example, "intensities" of individual pixels, in the lattice of the $41^{th}$ row and $51^{th}$ column, of the 5 reconstituted images in Sve, Sxe, Sye and Sze in ||S|| are 4 respective linear combinations, each of which is a linear combination of intensities of individual pixels, in the lattice of the $41^{th}$ row and $51^{th}$ column, of the available four WF muxed files, i.e. Ov, Ox, Oy and Oz, in ||O1||||O||, multiplied by four respective weighting parameters in ||WDmx1||.

It is clear that the four restructured images Sv, Sx, Sy and Sz in ||S|| are identical to the 4 original pictures A1, A2, A3 and A4 in ||A||. As to creating data under Camouflaged appearance on cloud storage via WF muxing processing, we present another example depicted in FIG. 5D. Original 4 images, i.e. A1, A2, A3 and A4, are identical to those in FIG. 5C. However, they are WF muxed by a different transformation (a 4-to-4 matrix), and there are no reserved redundancies on cloud. The 4 recovered image outputs, i.e. Sv, Sx, Sy and Sz, in the third row in FIG. 5D are also identical to the original 4 images, i.e. A1, A2, A3 and A4, respectively.

Figure 5D:
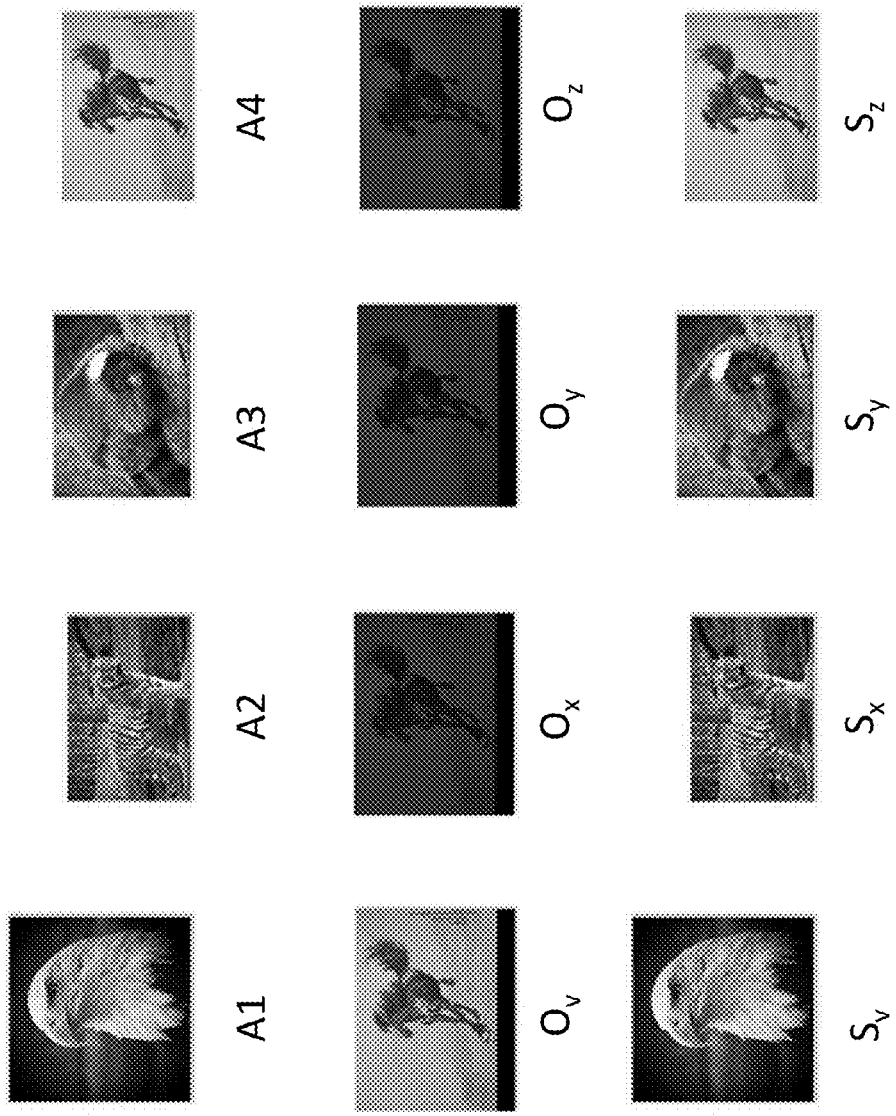
FIG. 5D illustrates image data storage and transport via wavefront muxing by a non-orthogonal matrix with redundancy, retrieval via a corresponding wavefront demuxing matrix. The muxing/demuxing transformations are performed pixel-by-pixel.

The differences between FIG. 5C and FIG. 5D are the images in the second row in these figures; the WF muxed images to be stored on cloud. They appear very different; 5 WF muxed files Ou, Ov, Ox, Oy and Oz are in the second row in FIGS. 5C and 4 muxed files Ov, Ox, Oy and Oz are in the second row in FIG. 5D. To create various camouflaged effects on the WF muxed data for storage; the original images have been "weighted" differently for the "horse" painting, i.e. A4e, in FIG. 5D. As a result, the image of "horse" painted by Xu Baihong appears on all 4 WF muxed data, i.e. Ov, Ox, Oy and Oz, with appearances of various intensity settings.

It is clear that the sizes of the original data sets A1-A4 are identical to those of the recovered or reconstituted data sets Sv, Sx, Sy and Sz. The WF muxed data sets Ov, Ox, Oy and Oz each feature a size about 2 to 3 times larger than those of the original images A1-A4 or recovered images Sv, Sx, Sy and Sz. It is because (1) more pixels are added to equalize all 4 images A1-A4 into 4 equalized ones A1e-A4e featuring identical pixel dimensions, and (2) double precision operations are implemented for WF muxing/demuxing transformations to avoid overflow and underflow.

In another scenario when a first reader has a digital data file, i.e. Sze, of the "horse" painted by Mr. Xu (i.e. the Sz image), the first reader only needs to access 3 of the 4 data files on cloud to recover the remaining three images, i.e. Sve, Sxe and Sye. It is important to notice that every redundancy in wavefront multiplexing is for all three images as far as the first reader is concerned. On the other hand, a second reader who does not have the digital "horse" initially must download all four data files on cloud in order to recover any or all of the 4 images.

For a third scenario in a different application for a data integrity monitoring service, the "horse" may be used as a known diagnostic image, i.e. A4e. The stored data features integrity that may be monitored by comparing the recovered diagnostic image data, i.e. Sze, to the known diagnostic image, i.e. A4e, of "horse" or by comparing the recovered diagnostic image data, i.e. Sz, to the known diagnostic image, i.e. A4, of "horse", without accessing the rest of recovered equalized images of Sve, Sxe, and Sye or recovered images of Sv, Sx, and Sy at all. If any one of the 4 data sets Ov, Ox, Oy and Oz stored in the memory or memory sites in the IP cloud is compromised or altered, there could be differences between the equalized image data set A4e, i.e. "house" painting, and the recovered or reconstituted equalized image set Sze, i.e. "house" painting, by comparing the data sets A4e and Sze or there could be differences between the image data set A4, i.e. "house" painting, and the recovered or reconstituted image set Sz, i.e. "house" painting, by comparing the data sets A4 and Sz. Thereby, one could detect alternations in any of the 4 WF muxed data files Ov, Ox, Oy and Oz stored in the IP cloud. The compromised data may have been altered by intruders, or changed by defensive mechanisms triggered by intruders. Once the stored data sets, i.e. WF muxed data set Ov, Ox, Oy and Oz, are determined to be compromised, the 4 stored data sets Ov, Ox, Oy and Oz are labeled accordingly, and the owners of the data sets will be notified accordingly. The operators of data storages do not have access to any of the data sets A1, A1e, A2, A2e, A3, A3e, Sv, Sve, Sx, Sxe, Sy and Sye. They only use the diagnostic data files Sze or Sz and A4 or A4e, i.e. the horse image in this example to monitor the integrity of the stored data sets Ov, Ox, Oy and Oz on the IP cloud, which confirms the integrity of recovered data sets Sv, Sx and Sy In addition, a fourth application will be "data integrity monitoring and auto-recovery service." Since the "house" painting data set Sz or Sze is known a priori, substantially equivalent to the data set A4 or A4e, there are only three unknown data sets, i.e. Sve, Sxe and Sye, but with 4 different linear combinations, i.e. Qv, Ox, Oy and Oz, for these three data sets Sve, Sxe and Sye. There are sufficient independent linear combinations to identify which one of the 4 stored data sets, i.e. Qv, Ox, Oy and Oz, has been compromised. The compromised data subset may be restored using the other 3 stored and uncompromised data sets and the known diagnostic file Sze, i.e. the horse painting in this example.

Figure 5E:
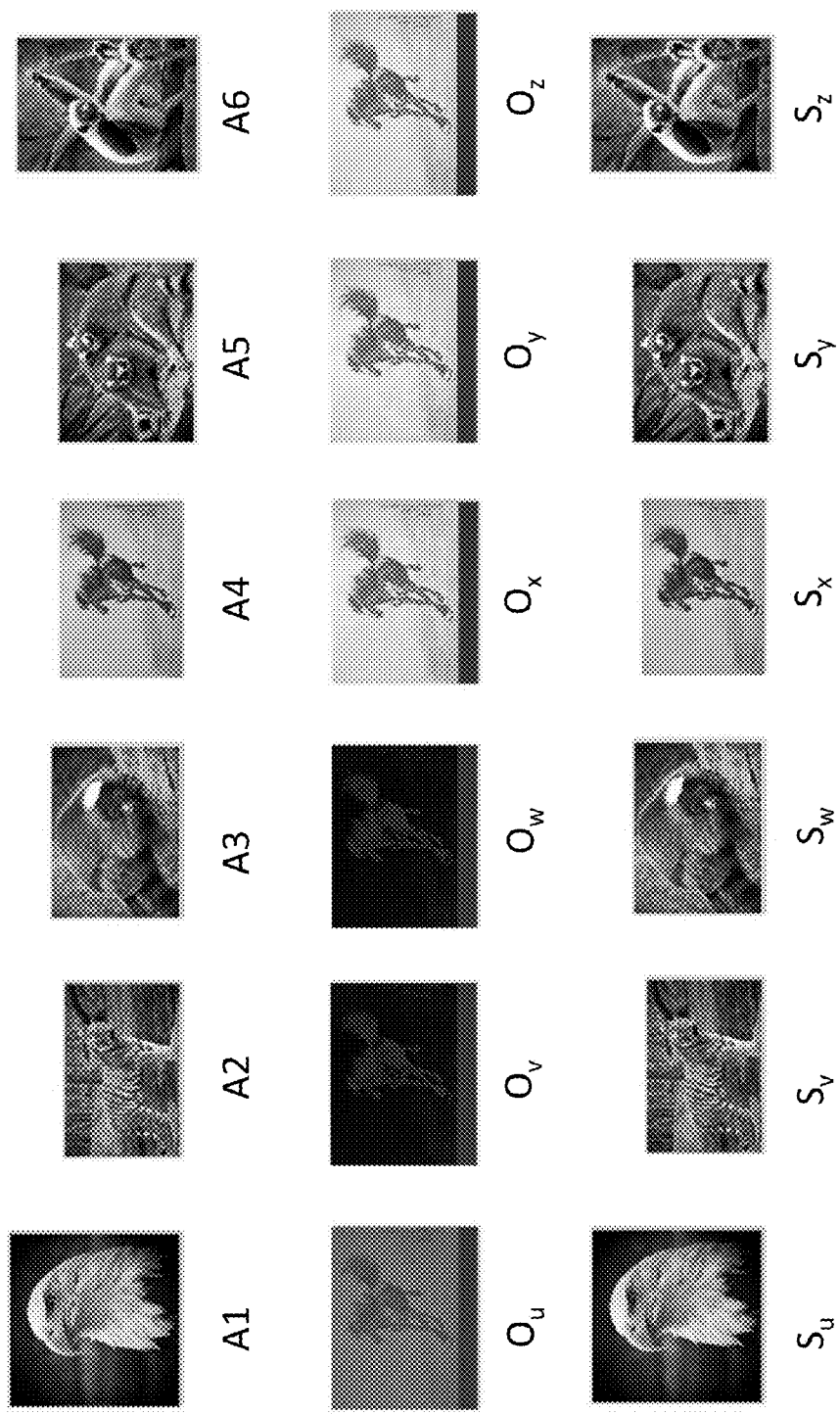
FIG. 5E illustrates image data storage and transport via wavefront muxing by a non-orthogonal matrix without redundancy, retrieval via a corresponding wavefront demuxing matrix. The muxing/demuxing transformations are performed pixel-by-pixel.

FIG. 5E illustrates an example of image data storage and transport via wavefront muxing by a non-orthogonal matrix without redundancy, and retrieval via a corresponding wavefront demuxing matrix. The muxing/demuxing transformations are performed pixel-by-pixel as mentioned above. The first row in FIG. 5E features 6 input image files A1-A6, including the "horse" painting, the second row in FIG. 5E are the results Ou, Ov, Ow, Ox, Oy and Oz, WF muxed pixel by pixel via six linear combinations of 6 equalized image files derived from the input image files A1-A6 respectively, and the third row in FIG. 5E depicts the 6 retrieved images via a corresponding WF demuxing transformation and de-equalizing process from the 6 stored data sets, i.e. Ou, Ov, Ow, Ox, Oy and Oz. It is noticed that the 6 pictures Ou, Ov, Ow, Ox, Oy and Oz in the second row appear as images of the "horse" painting with different brightness settings.

Examining by eyes the pictures Ov, Ox, Oy and Oz in the second row of FIG. 5A, the pictures Ou, Ov, Ox, Oy and Oz in the second row of FIG. 5B, and the pictures Ou, Ov, Ox, Oy and Oz in the second row of FIG. 5E, they all appear as images of the painting of "a running horse"; independent from (1) numbers of inputs/outputs (I/O's) on WF muxing/demuxing transformations, (2) which specific WF muxing transformation may be utilized, (3) whether the WF muxing transformations are with or without redundancy features, (4) how the redundancies of the WF muxing transformations are generated, and (5) all other accompanied images sharing the same data storage or mirror sites. As a result, it becomes very difficult to "invert" the functional transformation processes to reconstitute "desired" data sets (equalized image files), which may be de-equalized into the image data sets, i.e. Sx, Sy and Sz, as shown in the third row of FIGS. 5A and 5B, which are imbedded in the set of stored or transported images of "a running horse" as shown in the second row of FIGS. 5A and 5B.

It might be possible that some of these WF muxed images of "a run house" in FIG. 5A, 5B, 5D, or 5E might be no more than the input data set, i.e. real images of the famous painting of "a running horse". These WF muxed images may belong to a steganography, which is a "cousin" of cryptography, used with codes. While cryptography provides privacy, steganography provides secrecy. Privacy is what you need when you use your credit card on the Internet—you don't want your number revealed to the public. For this, you use cryptography, and send a coded pile of gibberish that only the web site can decipher. Though your code may be unbreakable, any hacker can look and see a message you've sent. For true secrecy, you don't want anyone to know you're sending a message at all.

Embodiment 3

The techniques of video streaming via multiple mirroring sites via wavefront multiplexing depicted in FIGS. 6A, 6B, 6C and 6D consist of three segments; (1) a pre-storage processing 610, (2) Mirroring site in IP network 630, and (3) data streaming processing 620. The multiple mirror sites 631 feature nearly equal data storage space. An example of streaming a video with a 100 minute play time in real time is utilized in here to illustrate the operation concepts. Elements in FIGS. 6A, 6B, 6C and 6D having the same reference number as those in FIGS. 1, 1A, 2A, 2B, 3 and 3A may refer to those illustrated in FIGS. 1, 1A, 2A, 2B, 3 and 3A.

Figure 6A:
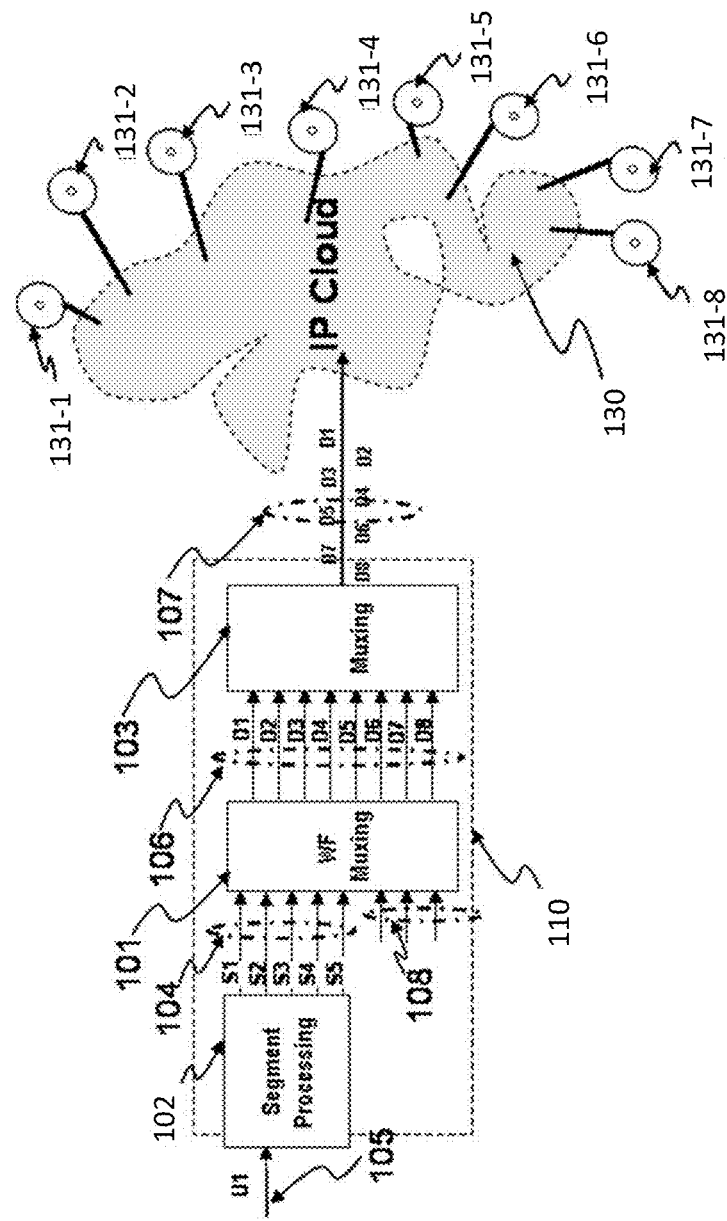
FIG. 6A depicts an example of image storage and transport on clouds with orthogonal WF muxing/demuxing transformations. Camouflaging is one of the advantages.
Figure 6B:
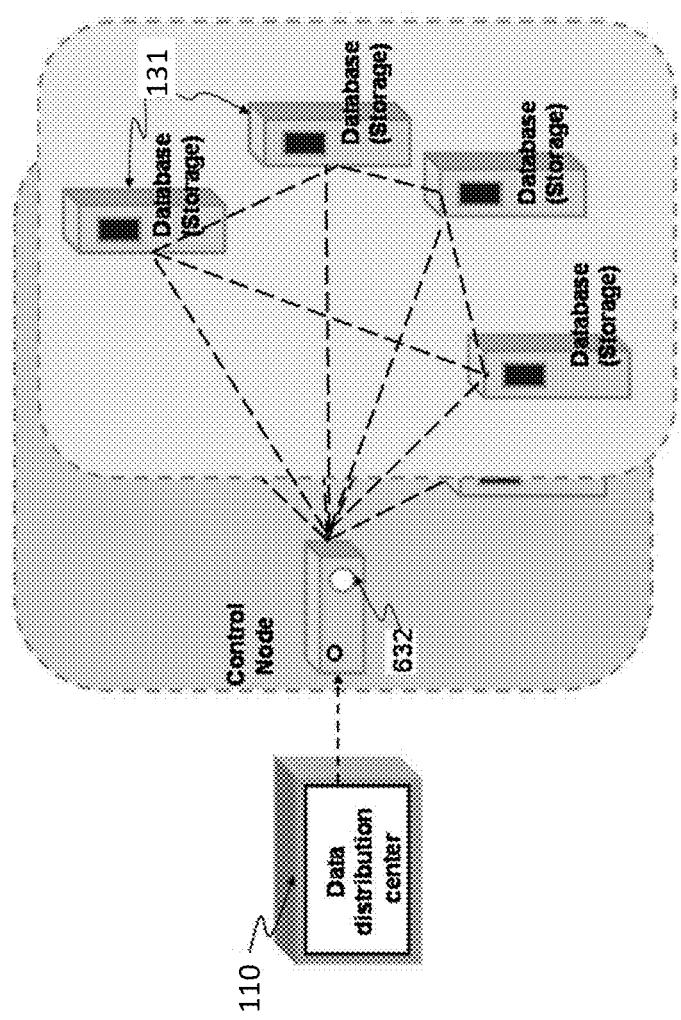
FIG. 6B depicts an example of image storage and transport on cloud with building redundancy via an orthogonal WF muxing transformation. Camouflaging is one of the advantages.

FIG. 6A depicts a data preprocessing and storage portions of an operation concept of using WF multiplexing 101 techniques for video streaming via multiple mirroring sites. FIG. 6B is a top level functional diagram for storing the WM muxed video substreams. Referring to FIGS. 6A and 6B, the video stream 105 with a 100-minute playing time may be "segmented" by a segment processor 102 into 6000 video blocks in time, i.e. each video block having playing time of a second. One block of video shall have about 1 Megabytes (MB) or less of data. In a time frame of 5 seconds, the segment processor 102 takes 5 video blocks arranged in series in the data stream U1, i.e. 105, at a time and converts them into 5 parallel blocks 104, i.e. S1, S2, S3, S4 and S5. The segment processor 102 may take 1200 time frames, each of which may include 5 sequential video blocks to be input into the WF muxer 104, and convert the 6000 video blocks in the 1200 time frames into 5 video substreams S1, S2, S3, S4 and S5, each of which carries 1200 video blocks output from the segment processor 102.

Referring to FIGS. 6A and 6B, in each time frame, the outputs S1, S2, S3, S4 and S5 of the segment processor 602 are connected to the first 5, i.e. slice1-slice5, of the 8 input slices of the 8-to-8 WF muxer 101. The 8 parallel outputs 106 of the WF muxers 101 are the structured data to be stored in 8 separated local folders, i.e. memory sets in a local memory device 632, synchronized automatically in series with 8 respective mirror sites or data storage sites 131-1 through 131-8 in the IP cloud 130, which may be provided by different cloud storage providers respectively via Internet for video streaming later. Furthermore, multiple links linking to the eight data sets stored in the eight respective data storage or mirror sites 131-1 through 131-8 may be passed to one or more of the data storage or mirror sites 131-1 through 131-8 and/or stored in the transmitting site. Some of the data sets D1-D8 may be stored locally at the transmitting site.

The 6000 input blocks S1-S5 of a video stream are converted into 8 WF muxed substreams 106, i.e. D1-D8. The segment processor 102 takes 1200 time frames 105, arranged in series, and converts the 6000 sequential video blocks U1 into 5 parallel video substreams 104, i.e. S1-S5, each of which contains 1200 output blocks. The 5 video substreams 104, i.e. S1-S5, are converted by the 8-to-8 WF muxer 101, one frame at a time, into 8 WF muxed video substreams 106, i.e. D1-D8, each of which contains 1200 WF muxed blocks in different time frames. Each of the WF muxed blocks D1-D8 may be a linear combination of the video blocks 104, i.e. S1-S5 in the same time frame, and diagnostic or "zero" blocks 108, each weighted by a corresponding weighting parameter. Each of the WF muxed blocks D1-D8 contains information associated with all of the parallel video blocks 104, i.e. S1-S5 in the same time frame, and diagnostic or "zero" blocks 108. Each of the diagnostic or "zero" blocks 108 may be coupled to a reference ground or carries a "zero" value, or may be assigned to a redundant data set. These WF muxed substreams are stored in 8 physically separated local folders, i.e. memory sets at a transmitting site, synchronized automatically in series with 8 respective mirror sites or data storage sites 131-1 through 131-8 in the IP cloud 130 via Internet optionally in accordance with the links passed from one or more of the storage or mirror sites 131-1 through 131-8 or transmitting site to the receiving site.

Figure 6C:
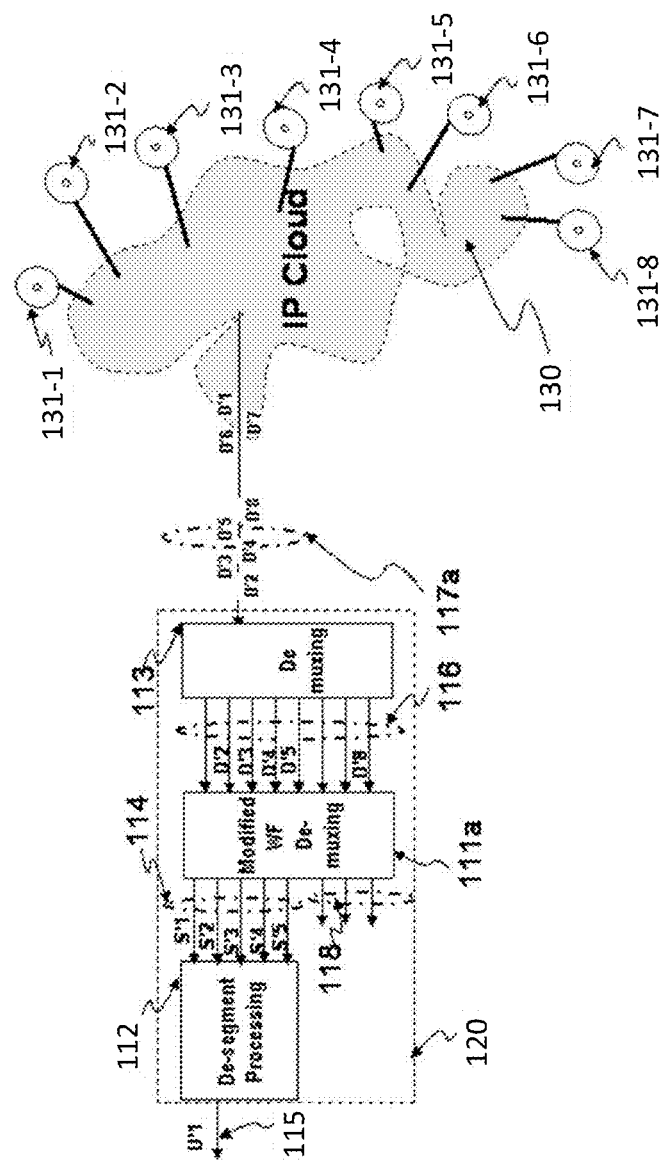
FIG. 6C shows the retrieval processing of the 5 sets of video substreams from user terminals.
Figure 6D:
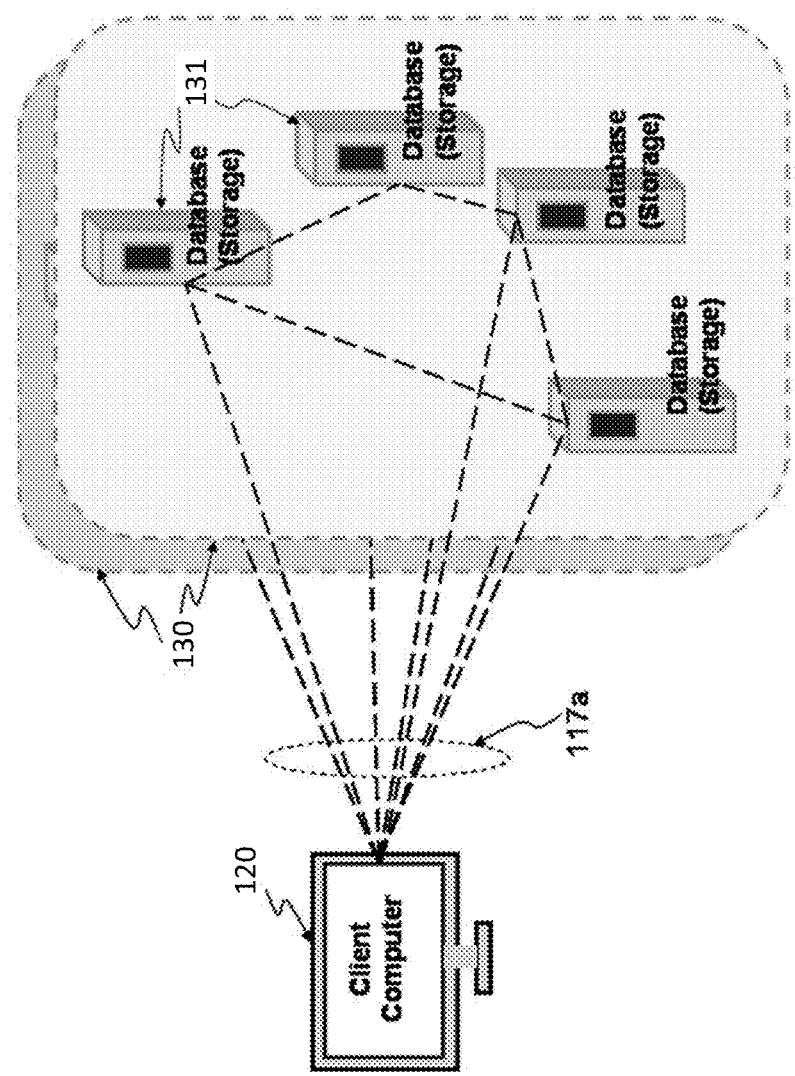
FIG. 6D is a top level functional diagram for retrieving multiple WM muxed video substreams and converting them into the desired video stream.

FIG. 6C shows the retrieval processing of the 5 sets of video substreams from user terminals. FIG. 6D is a top level functional diagram for retrieving multiple WM muxed video substreams and converting them into the desired video stream.

Pre-Storage Processing:

Referring to FIGS. 6A and 6B, in the pre-storage processing 110 a 8-to-8 WF muxer 101 is used to convert 5 sets of video substreams or video blocks 104, i.e. S1, S2, S3, S4 and S5 in the same time frame, into 8 outputs of WF muxed video substreams, i.e. D1, D2, D3, D4, D5, D6, D7 D8, where:

$$D1 = S1 + S2 + S3 + S4 + S5 \tag{13-1}$$

$$D2 = S1 - S2 + S3 - S4 + S5 \tag{13-2}$$

$$D3 = S1 + S2 - S3 - S4 + S5 \tag{13-3}$$

$$D4 = S1 - S2 - S3 + S4 + S5 \tag{13-4}$$

$$D5 = S1 + S2 + S3 + S4 - S5 \tag{13-5}$$

$$D6 = S1 - S2 + S3 - S4 - S5 \tag{13-6}$$

$$D7 = S1 + S2 - S3 - S4 - S5 \quad (13\text{-}7)$$

$$D8 = S1 - S2 - S3 + S4 - S5 \quad (13\text{-}8)$$

A 8-to-8 Hadamard matrix in which all elements are "1" or "4" only has been chosen as the 8-to-8 WF muxer. Equations (13-1) to (13-8) can be written in a matrix form as:

$$D = HM * S \quad (14)$$

$$\text{Where: } D = [D1, D2, D3, D4, D5, D6, D7, D8]^T \quad (14\text{-}1)$$

$$S = [S1, S2, S3, S4, S5, 0, 0, 0]^T, \quad (14\text{-}2)$$

and the 8-to-8 Hadamard matrix HM is expressed in equation (2-2).

The input ports of a WF muxer 101 are referred to as slices, and its output ports are wavefront components (wfc's). In this example, the five input data sets 104, i.e. S1, S2, S3, S4 and S5, are connected to the input ports, i.e. slice1, slice2, slice3, slice4 and slice5, of the WF muxer 101 respectively. The 8 output data sets 106, i.e. D1-D8, are connected to the output ports, i.e. wfc1-wfc8, of the WF muxer 101 respectively.

When the WF muxer is connected by a unity input data set only, e.g. S4=[1] through the input port of Slice 4, the corresponding outputs of the WF muxer are written as:

$$D1 = S1 + S2 + S3 + S4 + S5 = [1] \quad (15\text{-}1)$$

$$D2 = S1 - S2 + S3 - S4 + S5 = [-1] \quad (15\text{-}2)$$

$$D3 = S1 + S2 - S3 - S4 + S5 = [-1] \quad (15\text{-}3)$$

$$D4 = S1 - S2 - S3 + S4 + S5 = [1] \quad (15\text{-}4)$$

$$D5 = S1 + S2 + S3 + S4 - S5 = [1] \quad (15\text{-}5)$$

$$D6 = S1 - S2 + S3 - S4 - S5 = [-1] \quad (15\text{-}6)$$

$$D7 = S1 + S2 - S3 - S4 - S5 = [-1] \quad (15\text{-}7)$$

$$D8 = S1 - S2 - S3 + S4 - S5 = [1] \quad (15\text{-}8)$$

The 8 output data sets can be represented as an output data matrix, D. The elements of the output matrix D become identical to the 8 elements of the 4th column in the HM, under the condition. In this case, the wavefront vector of the output data sets representing the matrix D is referred to as the 4th wavefront vector (WFV), or WFV4. Similarly, the wavefront vector associated with the $k^{th}$ input port, slice k, is referred to as $k^{th}$ WFV or WFVk. A WF vector specifies the distribution of a set of input data among the 8 output ports wfc1-wfc8 or among 8 aggregated output data sets, i.e. D1, D2, D 3, D4, D5, D6, D7 and D8.

In general an 8-to-8 WF muxer, such as the WF muxer 101, features 8 orthogonal WFVs. A coefficient wjk of a WF transformation performed by the WF muxer 101 means the coefficient is at the $j^{th}$ row and $k^{th}$ column of the WF muxer 101. A WF vector of the WF muxer 101 featuring a distribution among the 8 outputs, i.e. D1-D8 at the 8 WF component ports wfc1-wfc8, is defined as an 8-dimensional (8-D) vector. They are mutually orthogonal.

The first 5 WFVs of the WF muxer 101 are:

$$WFV1 = [w11, w21, w31, w41, w51, w61, w71, w81]^T \quad (16.1)$$

$$WFV2 = [w12, w22, w32, w42, w52, w62, w72, w82]^T \quad (16.2)$$

$$WFV3 = [w13, w23, w33, w43, w53, w63, w73, w83]^T \quad (16.3)$$

$$WFV4 = [w14, w24, w34, w44, w54, w64, w74, w84]^T \quad (16.4)$$

$$WFV5 = [w15, w25, w35, w45, w55, w65, w75, w85]^T \quad (16.5)$$

The input data sets 104, i.e. S1, S2, S3, S4 and S5, are coupled to the first five input ports, i.e. slice1-slice5, of the WF muxer 101 so as to be "attached" to 5 WF vectors, i.e. WFV1-WFV5. There are 3 remaining WFVs: WFV6, WFV7, and WFV8, which are utilized for inputs with "zero signals" of the diagnostic blocks 108 in this case. All components of the 8 orthogonal WFVs are independent of input data sets 104 and output data sets 106, but are related to the sequence of the input ports, i.e. slice1-slice8, and the output ports, i.e. wfc1-wfc8.

The 8 outputs 106, i.e. D1-D8, at the 8 ports, i.e. wfc1-wfc8, of the WF muxer 101 feature 8 respective linear combinations of the 5 input video substreams 104, i.e. S1-S5, and 3 diagnostic streams 108 carrying "zero" values, or 8 aggregated or WF muxed video substreams. Each of the WF muxed video substreams D1-D8 is a weighted sum of the 5 input video substreams 104, i.e. S1-S5, as well as 3 "zero" signals streams 108, and the WF muxed video substreams D1-D8 are independent. As a result, each of the 8 aggregated or WF muxed video substreams D1-D8 features a result of structured arithmetic operations (weighting, or multiplying, and summing) on the 5 independent data sets S1-S5. The 8 aggregated or WF muxed video substreams D1-D8 appear as 8 respective data streams with random numbers.

Most commercial software tools run the arithmetic operations with limitations on word lengths of integers. The operations of addition and subtraction in the WF muxing transformation can go beyond the maximum word length of 8 bytes. Each video block of the video substreams 104, i.e. S1-S5, may have a size of about 1 MB that may be divided into about 143,000 words with 7-byte length. To perform arithmetic addition and subtraction on 8 blocks of the video substreams 104, i.e. S1-S5 in the same time frame, and diagnostic substreams 108, the first 7-byte word from the video stream data of S1 may be added to the first 7-byte word from the video stream data of S2. The sum is saved in the block D1 as the first word, which will be with a format of 8-byte word to assure of no overflow or underflow issues. There is a 8/7 ratio of the memory size of the WF muxed video substream D1, D2, D3, D4, D5, D6, D7 or D8 to that of segmented video substream S1, S2, S3 S4 or S5; more than 15% of additional memory size is required for the WF muxed video substream 106, i.e. D1, D2, D3, D4, D5, D6, D7 or D8, compared to the segmented video substream 104, i.e. S1, S2, S3 S4 or S5.

Alternatively, each video block of the video substreams 104, i.e. S1-S5, may have a size of about 1 MB that may be divided into about 143,000 words with 7-byte length. To perform arithmetic addition and subtraction on 8 blocks of the video substreams 104, i.e. S1-S5, and diagnostic substreams 108, first 7-byte words of the video data sets 104, i.e. S1-S5 in the same time frame, and the diagnostic data sets 108 may be weighted by respective weighting parameters and then may be added together into a sum represented as either one of the WF muxed blocks D1-D8, each of which may be in a format of 8-byte word to assure no overflow or underflow issues. There is a 8/7 ratio of the memory size of the WF muxed video substream D1, D2, D3, D4, D5, D6, D7 or D8 to that of segmented video substream S1, S2, S3 S4 or S5; more than 15% of additional memory size is required for the WF muxed video substream 106, i.e. D1, D2, D3, D4, D5, D6, D7 or D8, compared to the segmented video substream 104, i.e. S1, S2, S3 S4 or S5.

One may conceivably construct software routines or digital calculators to perform arithmetic operations of addition/subtraction word by word among video blocks S1-S5, each of which has about 10101 words with 99 byte word-length in each time frame, so as to generate a result in a format with a word length of 100 bytes. In this case, the additional memory size for each of the 8-to-8 WF muxed video substreams 106, i.e. D1-D8, is about 1% more than that of either of the segmented video substreams 104, i.e. S1-S5. The muxing processor 103, such as time, frequency or code domain multiplexer, allows the 8 pre-processed data sets, i.e. the output data sets D1-D8 from the WF muxer 101 in parallel, to be muxed based on time, frequency or code and then delivered in series through a single pipe, or communication output port 107 to various data mirror sites 131-1 through 131-8 in IP Cloud 130 via Internet.

Mirroring Sites in IP Network 130:

As shown in FIGS. 6A and 6B, the five independent video substream data sets 104, i.e. S1, S2, S3, S4 and S5, and three diagnostic or "zero" data sets 108 are muxed by the WF muxer 101 into 8 data sets D1-D8 to be stored in 8 local folders, i.e. memory sets, synchronized automatically in series with 8 respective data storage sites or data mirror sites, i.e. 131-1 through 131-8, in IP cloud 130, which may be provided by different cloud storage providers respectively, via Internet. The 8 data sets D1-D8 may be 8 different linear combinations of the five video substream data sets 104, i.e. S1-S5, and the three diagnostic or "zero" data sets 108. Each of the mirror sites 131-1 through 131-8 only stores an assigned one of the 8 MF muxed video substream data sets 106, i.e. D1-D8. The data storage sites 131-1 through 131-8 may store the data sets 106, i.e. D1-D8, respectively.

Post Retrieval Processing 120:

FIGS. 6C and 6D depicts the demuxing processor 113, such as time, frequency or code domain demultiplexer, that may recover parallel data sets 116, i.e. D'1-D'8, based on time, frequency or code from the data sets, stored in 8 separated local folders, i.e. memory sets in a local memory device at a receiving site, synchronized automatically in series with 8 storage or mirror sites 131-1, 131-2, 131-3, 131-4, 131-5, 131-6, 131-7 and 131-8 in IP Cloud storage 130 via Internet so as to enable users to use the WF demuxing transformation 111 to retrieve data sets S'1-S'5, substantially equivalent to the input data sets S1-S5 respectively if the stored data sets are not contaminated. The data sets 116, i.e. D'1-D'8, may be substantially equivalent to the data sets 106, i.e. D1-D8, respectively.

FIG. 6C depicts an operation concept of reconstructing the desired video streams S'1-S'5 from only 5 of the 8 WF muxed data sets stored in the mirror sites 131-1 through 131-8. As indicated in this example, the first 5 WF muxed data sets arriving the WF demuxer 111 are D'2, D'3, D'4, D'5, and D'8. The last three WF muxed sets arriving the WF demuxer 111 are D'1, D'6 and D'7 that may be omitted to be demuxed by the WF muxer 111. Only the first 5 of the 8 WF muxed video substream data sets arriving the WF demuxer 111 are used for retrieving or recovering the video data sets S'1-S'5 that may be combined into the desired video stream 115, i.e. U'1. the first 5 WF muxed video data sets, i.e. D'2, D'3, D'4, D'5 and D'8, arriving the WF demuxer 111 are illustrated where:

$$D'2 = S'1 S'2 + S'3 S'4 + S'5 \tag{17-1}$$

$$D'3 = S'1 + S'2 - S'3 S'4 + S'5 \tag{17-2}$$

$$D'4 = S'1 S'2 - S'3 + S'4 - S'5 \tag{17-3}$$

$$D'5 = S'1 + S'2 + S'3 + S'4 S'5 \tag{17-4}$$

$$D'8 = S'1 S'2 - S'3 + S'4 S'5 \tag{17-5}$$

Therefore, the recovered data sets, i.e. S'1, S'2, S'3, S'4, and S'5 can then be solved one time frame by one time frame by the modified wavefront demuxer 111 where:

$$S'1 = (D'2 + D'3 + D'5 + D'8)/4 \tag{17-6}$$

$$S'5 = (D'4 - D'8)/2 \tag{17-7}$$

$$S'3 = (D'2 + D'5)/2 S'1 \tag{17-8}$$

$$S'2 = (D'5 - D'8)/2 S'3 \tag{17-9}$$

$$S'4 = (D'3 - D'4)/2 + S'2 \tag{17-10}$$

The data sets 116, i.e. D'1-D'8, may be substantially equivalent to the output data sets, i.e. D1-D8, respectively if not contaminated. Thereby, the recovered data sets 114, i.e. S'1-S'5, if not contaminated, may be substantially equivalent to the data sets, i.e. S1-S5, respectively. There are many different combinations of taking 5 WF muxed sets 117 from 8 ones stored in the respective data mirroring sites 131-1 through 131-8. In this case, there are 56 possible combinations to be present. The WF demuxer 111 shall be designed to handle the all possible combinations. There are many different but equivalent methods/approaches of solving 5 simultaneous equations for 5 unknowns. Each of the retrieved data sets or video blocks 114, i.e. S'1-S'5 in the same time frame, may be a linear combination of the data sets 116, i.e. D'2, D'3, D'4, D'5 and D'8 in the same time frame, each weighted by a corresponding weighting parameter. Each of the retrieved data sets 114, i.e. S'1-S'5, in the same time frame contains information associated with the data sets 116, i.e. D'2, D'3, D'4, D'5 and D'8, in the same time frame.

The recovered 5 parallel video substream blocks 114, i.e. S'1-S'5 in the same time frame, may be combined into a large data set U'1, i.e. 115, including 5 sequential video blocks, i.e. S'1-S'5, via the de-segmentation processor 112.

Embodiment 4

Figure 7A:
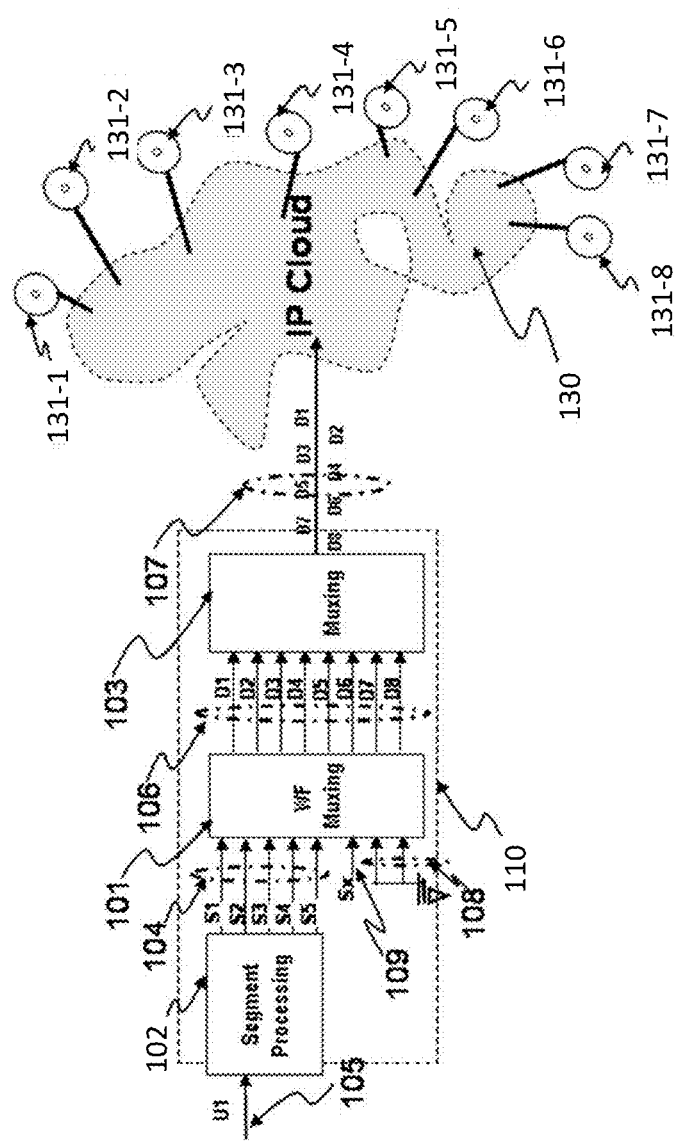
FIG. 7A depicts an example of image storage and transport on clouds with non-orthogonal WF muxing/demuxing transformations. Camouflaging is one of the advantages.
Figure 7B:
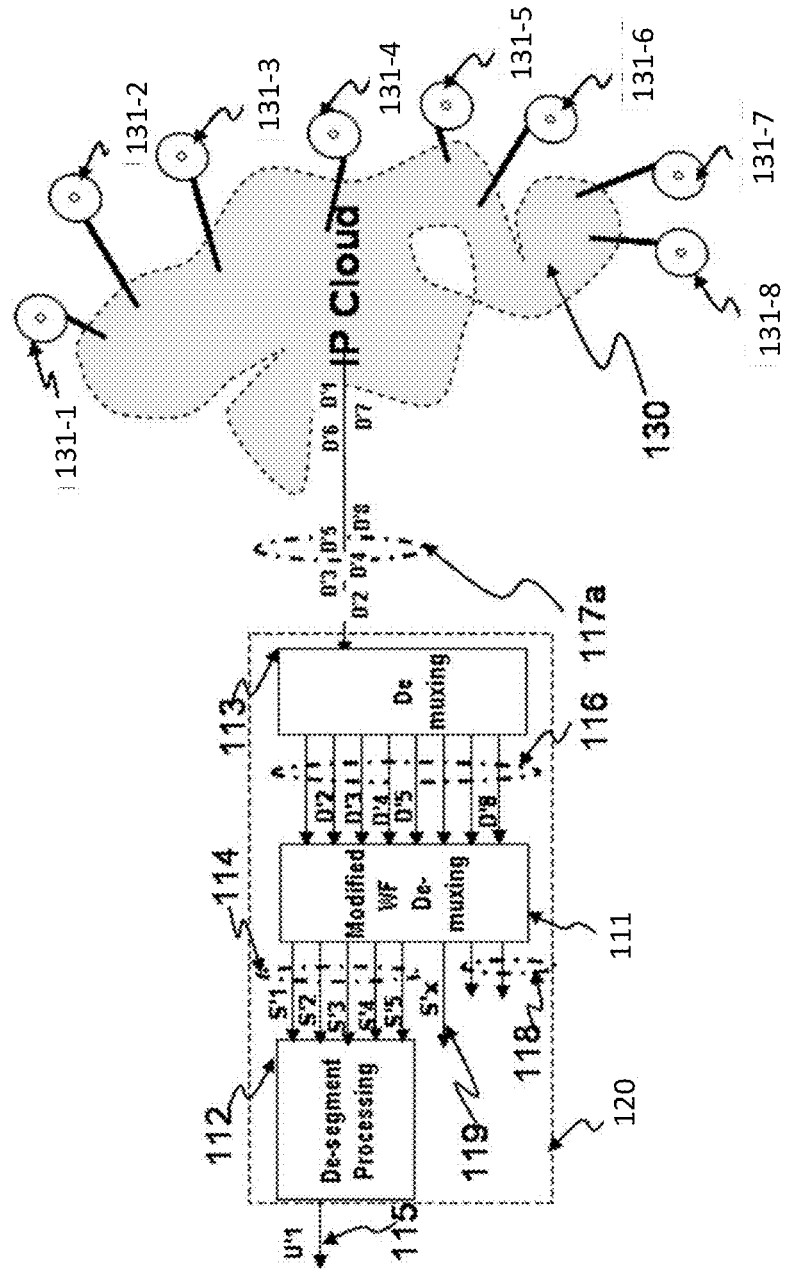
FIG. 7B depicts an example of image storage and transport on cloud with building redundancy via non-orthogonal WF muxing/demuxing transformations. Camouflaging is one of the advantages.

Another set of techniques of video streaming via multiple mirroring sites via wavefront multiplexing depicted in FIGS. 7A and 7B consist of three segments; (1) a pre-storage processing 110, (2) cloud storage 130, and (3) data streaming processing 120. The multiple mirror sites 131-1 through 131-8 feature nearly equal data storage space. The only difference of the embodiment 4 from embodiment 3 is the introductions of embedded digital data sets 109, i.e. Sx, as authentication/security key or as probing signals, which may be muxed with the video blocks S 1-S5 one time frame by one time frame by a WF muxer 101. An example of streaming a video with a 100 minute play time in real time is utilized in here to illustrate the operation concepts. Elements in FIGS. 7A and 7B having the same reference number as those in FIGS. 1, 1A, 2A, 2B, 3, 3A and 6A-6D may refer to those illustrated in FIGS. 1, 1A, 2A, 2B, 3, 3A and 6A-6D.

FIG. 7A depicts a data preprocessing and storage portions using WF multiplexing 101 techniques for video streaming via multiple mirroring sites. The video stream 105 with a 100-minute playing time is "segmented" by a segment processor 102 into 6000 video blocks in time, i.e. each video block having playing time of a second.

One block of video shall have about 1 Megabytes (MB) or less of data. In a time frame of 5 seconds, the segment processor 102 takes 5 video blocks arranged in series in the data stream U1, i.e. 105, at a time and converts them into 5 parallel blocks 104, i.e. S1, S2, S3, S4 and S5. The segment processor 102 may take 1200 time frames, each of which may include 5 sequential video blocks to be input into the WF muxer 104, and convert the 6000 video blocks in the 1200 time frames into 5 video substreams S1, S2, S3, S4 and S5, each of which carries 1200 video blocks output from the segment processor 102.

Referring to FIGS. 7A and 7B, in each time frame, the outputs S1, S2, S3, S4 and S5 of the segment processor 102 are connected to the first 5, i.e. slice1-slice5, of the 8 input slices of an 8-to-8 WF muxer 101. The $6^{th}$ input, slice 6, is connected to a known and diagnostic data stream 109, i.e. Sx. The 8 parallel outputs 106, i.e. D1-D8, of the WF muxers 101 are the structured data to be stored in 8 separated local folders, i.e. memory sets in a local memory device 632 at a transmitting site, synchronized automatically in series with 8 respective mirror sites or data storage sites 131-1 through 131-8 in the IP cloud 130, which may be provided by different cloud storage providers respectively, via Internet for video streaming later. Furthermore, multiple links linking to the eight data sets stored in the eight respective data storage or mirror sites 131-1 through 131-8 may be passed to one or more of the data storage or mirror sites 131-1 through 131-8 and/or stored in the transmitting site. Some of the data sets D1-D8 may be stored locally at the transmitting site.

The 6000 input blocks S1-S5 of a video stream are converted into 8 WF muxed substreams 106, i.e. D1-D8. The segment processor 102 takes 1200 time frames 105, arranged in series, and converts the 6000 sequential video blocks U1 into 5 parallel video substreams 104, i.e. S1-S5, each of which contains 1200 output blocks. The 5 video substreams 104, i.e. S1-S5, plus the known data stream 109, i.e. Sx, for the authentication/security keys or probing signals, and two additional "zero" signal streams 108 are converted one time frame by one time frame by the 8-to-8 WF muxer 101 into 8 WF muxed video substreams 106, i.e. D1-D8, each of which contains 1200 WF muxed blocks. Each of the WF muxed blocks D1-D8 may be a linear combination of the video blocks 104, i.e. S1-S5 in the same time frame, and diagnostic block 109, i.e. Sx, and two "zero" blocks 108, each weighted by a corresponding weighting parameter. Each of the WF muxed blocks D1-D8 contains information associated with all of the parallel video blocks 104, i.e. S1-S5 in the same time frame, diagnostic block 109, i.e. Sx, and "zero" blocks 108. Each of the "zero" blocks 108 may be coupled to a reference ground or carries a "zero" value, or may be assigned to a redundant data set. These WF muxed substreams are stored in 8 physically separated local folders, i.e. memory sets, synchronized automatically in series with 8 respective mirror sites or data storage sites 131-1 through 131-8 in the IP cloud 130 via Internet optionally in accordance with the links passed from one or more of the storage or mirror sites 131-1 through 131-8 or transmitting site to the receiving site.

FIG. 7B shows the retrieval processing of the 5 sets of video substreams from user terminals.

Pre-Storage Processing:

Referring to FIG. 7A, in the pre-storage processing, n a 8-to-8 WF muxer 101 is used to convert 5 sets of video substreams or video blocks 104, i.e. S1, S2, S3, S4 and S5 in the same time frame, into 8 outputs of WF muxed video substreams, i.e. D1, D2, D3, D4, D5, D6, D7 and D8, where:

$$D1=S1+S2+S3+S4+S5+Sx \qquad (18\text{-}1)$$

$$D2=S1-S2+S3-S4+S5.Sx \qquad (18\text{-}2)$$

$$D3=S1+S2-S3-S4+S5+Sx \qquad (18\text{-}3)$$

$$D4=S1-S2-S3+S4+S5.Sx \qquad (18\text{-}4)$$

$$D5=S1+S2+S3+S4-S5.Sx \qquad (18\text{-}5)$$

$$D6=S1-S2+S3-S4-S5+Sx \qquad (18\text{-}6)$$

$$D7=S1+S2-S3-S4-S5-Sx \qquad (18\text{-}7)$$

$$D8=S1-S2-S3+S4-S5+Sx. \qquad (18\text{-}8)$$

A 8-to-8 Hadamard matrix in which all elements are "1" or "−1" only has been chosen as the 8-to-8 WF muxer. Equations (18-1) to (18-8) can be written in a matrix form as $$D=HM^*S \qquad (18)$$

$$\text{Where:}D=[D1,D2,D3,D4,D5,D6,D7,D8]^T \qquad (18\text{-}9)$$

$$S=[S1,S2,S3,S4,S5,Sx,0,0]^T, \qquad (18\text{-}10)$$

and the 8-to-8 Hadamard matrix is expressed as in equation (2-2).

The input ports of a WF muxer 101 are referred to as slices, and its output ports are wavefront components (wfc's). In this example, the five input data sets 104, i.e. S1-S5, are connected to the input ports, i.e. slice1, slice2, slice3, slice4 and slice5, of the WF muxer 101 respectively. The diagnostic data set 109, i.e. Sx, is connected to the input port slice6 of the WF muxer 101. The 8 output data sets 106, i.e. D1-D8, are connected to the output ports, i.e. wfc1-wfc8, of the WF muxer 101 respectively.

A WF vector specifies the distribution of a set of input data among the 8 output ports wfc1-wfc8 or among 8 aggregated output data sets, i.e. D1, D2, D3, D4, D5, D6, D7 and D8. In general an 8-to-8 WF muxer, such as the WF muxer 101, features 8 orthogonal WFVs. A coefficient wjk of a WF muxer 101 is the element of the $j^{th}$ row and the $k^{th}$ column of the WF muxer 101.

A WF vector of the WF muxer 101 featuring a distribution, as illustrated in equations 10.1-10.6, among the 8 outputs, i.e. D1-D8, at the 8 WF component ports wfc1-wfc8, is defined as an 8-dimensional (8-D) vector. They are mutually orthogonal.

The input data sets 104, i.e. S1, S2, S3, S4 and S5, are coupled to the first five input ports, i.e. slice1-slice5, of the WF muxer 101 so as to be "attached" to the first 5 WF vectors, i.e. WFV1-WFV5. The diagnostic data set 109, i.e. Sx, may be coupled to the sixth input port, i.e. slice6, of the WF muxer 101 so as to be "attached" to the $6^{th}$ WF vector WFV6 where:

$$\text{WFV6}=[w16,w26,w36,w46,w56,w66,w76,w86]^T \qquad (19)$$

There are 2 remaining WFVs; WFV7, and WFV8, which are utilized for inputs with "zero signals" of the diagnostic blocks 108 in this case. All components of the 8 orthogonal WFVs are independent of input data sets 104 and output data sets 106, but are related to the sequence of the input ports, i.e. slice1-slice8, and the output ports, i.e. wfc1-wfc8.

The 8 outputs 106, i.e. D1-D8, at the 8 ports, i.e. wfc1-wfc8, of the WF muxer 101 feature 8 respective linear combinations of the 5 input video substreams 104, i.e. S1-S5, the diagnostic data or video stream 109, i.e. Sx, and 2 "zero" signals streams 108, or 8 aggregated or WF muxed video substreams. Each of the WF muxed video substreams D1-D8 is a weighted sum of the 5 input video substreams 104, i.e. S1-S5, the probing sequence 109, i.e. Sx, and 2 "zero" signals streams 108, which are independent. As a result, each of the 8 aggregated or WF muxed video substreams 106, i.e. D1-D8, at the output ports wfc1-wfc8 of the WF muxer 101, feature results of structured arithmetic operations (weighting, or multiplying, and summing) on the 5 independent data sets 104, i.e. S1-S5, one probing data sequence 109, i.e. Sx, and two "zeros" data sets 108. The 8 aggregated or WF muxed video substreams D1-D8 appear as 8 respective data streams with random numbers.

Most commercial software tools run the arithmetic operations with limitations on word lengths of integers. The operations of addition and subtraction in the WF muxing transformation can go beyond the maximum word length of 8 bytes. Each video block of the video substreams 104, i.e. S1-S5, may have a size of about 1 MB that may be divided into about 143,000 words with 7-byte length. To perform arithmetic addition and subtraction on 8 blocks of the input data sets including 5 video substreams 104, i.e. S1-S5 in the same time frame, the probing data set 109, i.e. Sx, and the "zero" data sets 108, the first 7-byte word from the video stream data of S1 may be added to the first 7-byte word from the video stream data of S2. The sum is saved in the block D1 as the first word, which will be with a format of 8-byte word to assure of no overflow or underflow issues. There is a 8/7 ratio of the memory size of the WF muxed video substream D1, D2, D3, D4, D5, D6, D7 or D8 to that of segmented video substream S1, S2, S3 S4 or S5; more than 15% of additional memory size is required for the WF muxed video substream 106, i.e. D1, D2, D3, D4, D5, D6, D7 or D8, compared to the segmented video substream 104, i.e. S1, S2, S3 S4 or S5.

Alternatively, each video block of the video substreams 104, i.e. S1-S5, may may have a size of about 1 MB that may be divided into about 143,000 words with 7-byte length. To perform arithmetic addition and subtraction on 8 blocks of the video substreams 104, i.e. S1-S5, the probing data set 109, i.e. Sx, and the "zero" data sets 108, each first 7-byte words of the video data sets 104, i.e. S1-S5 in the same time frame, the probing data set 109, i.e. Sx, and the "zero" data sets 108 may be weighted by respective weighting parameters and then may be added together into a sum represented as either one of the WF muxed blocks D1-D8, each of which may be in a format of 8-byte word to assure no overflow or underflow issues. There is a 8/7 ratio of the memory size of the WF muxed video substream D1, D2, D3, D4, D5, D6, D7 or D8 to that of segmented video substream S1, S2, S3 S4 or S5; more than 15% of additional memory size is required for the WF muxed video substream 106, i.e. D1, D2, D3, D4, D5, D6, D7 or D8, compared to the segmented video substream 104, i.e. S1, S2, S3 S4 or S5 D1-D8.

One may conceivably construct software routines or digital calculators to perform arithmetic operations of addition/subtraction word by word among video blocks S1-S5, each of which has about 10101 words with 99 byte word-length in each time frame, so as to generate a result in a format with a word length of 100 bytes. In this case, the additional memory size for each of the 8-to-8 WF muxed video substreams 106, i.e. D1-D8, is about 1% more than that of either of the segmented video substreams 104, i.e. S1-S5. The muxing processor 103, such as time, frequency or code domain multiplexer, allows the 8 pre-processed data sets, i.e. the output data sets D1-D8 from the WF muxer 101 in parallel, to be muxed based on time, frequency or code and then delivered in series through a single pipe, or communication output port 107 to various data mirror sites 131-1 through 131-8 in IP Cloud storage 130 via Internet.

Mirroring Sites in IP Network 130:

As shown in FIG. 7A, the five independent video substream data sets 104, i.e. S1, S2, S3, S4 and S5, a known probing data set 109, i.e. Sx, and two "zero" data sets 108 are muxed by the WF muxer 101 into 8 data sets D1-D8 to be stored in 8 local folders, i.e. memory sets, synchronized automatically in series with 8 respective data storage sites or data mirror sites, i.e. 131-1 through 131-8, in IP cloud 130, which may be provided by different cloud storage providers respectively, via Internet. The 8 data sets D1-D8 may be 8 different linear combinations of the five video substream data sets 104, i.e. S1-S5, the known probing data set 109, i.e. Sx, and the two "zero" data sets 108. Each of the mirror sites 131-1 through 131-8 only stores an assigned one of the 8 MF muxed video substream data sets 106, i.e. D1-D8, from the output ports, i.e. wfc1 through wfc8, of the WF muxer 101.

Post Retrieval Processing 620:

FIG. 7B depicts the demuxing processor 113, such as time, frequency or code domain demultiplexer, that may recover parallel data sets 116, i.e. D'1-D'8, based on time, frequency or code from the data sets, stored in 8 separated local folders, i.e. memory sets in a local memory device at a receiving site, synchronized automatically in series with 8 storage or mirror sites 131-1, 131-2, 131-3, 131-4, 131-5, 131-6, 131-7 and 131-8 in IP Cloud storage 130 via Internet so as to enable users to use the WF demuxing transformation 111 to retrieve data sets S'1-S'5, substantially equivalent to the input data sets S1-S5 respectively if the stored data sets are not contaminated. The data sets 116, i.e. D'1-D'8, may be substantially equivalent to the data sets 106, i.e. D1-D8, respectively.

FIG. 7B depicts an operation concept for reconstructing the desired video streams S'1-S'5 from only 5 of the 8 WF muxed data sets stored in the mirror sites 131-1 through 131-8. As indicated in this example, the first 5 WF muxed data sets arriving the WF demuxer 111 are D'2, D'3, D'4, D'5 and D'8. The last three WF muxed sets arriving the WF demuxer 111 are D'1, D'6 and D'7 that may be omitted to be demuxed by the WF muxer 111. Only the first 5 of the 8 WF muxed video substream data sets arriving the WF demuxer 111 are used for retrieving or recovering the video data sets S'1-S'5 that may be combined into the desired video stream 115, i.e. U'1. The first 5 WF muxed video substream data sets, i.e. D'2, D'3, D'4, D'5 and D'8, arriving the WF demuxer 111 are illustrated where:

$$D'2 = S'1 S'2 + S'3 - S'4 + S'5 - S'x \qquad (20\text{-}1)$$

$$D'3 = S'1 + S'2 - S'3 - S'4 + S'5 + S'x \qquad (20\text{-}2)$$

$$D'4 = S'1 - S'2 - S'3 + S'4 + S'5 - S'x \qquad (20\text{-}3)$$

$$D'5 = S'1 + S'2 + S'3 + S'4 - S'5 - S'x \qquad (20\text{-}4)$$

$$D'8 = S'1 - S'2 - S'3 + S'4 - S'5 + S'x \qquad (20\text{-}5)$$

Therefore, the recovered data sets, i.e. S'1, S'2, S'3, S'4, and S'5 can then be solved one time frame by one time frame by the modified wavefront demuxer 111 where:

$$S'1 = (D'2 + D'3 + D'5 + D'8)/4 \qquad (20\text{-}6)$$

$$S'5 = (D'4 - D'8)/2 \qquad (20\text{-}7)$$

$$S'3 = (D'2 + D'5)/2 S'1 + S'x \qquad (20\text{-}8)$$

$$S'2 = (D'5 - D'8)/2 S'3 + S'x \qquad (20\text{-}9)$$

$$S'4 = (D'3 - D'4)/2 + S'2 + S'x \qquad (20\text{-}10)$$

Where: S'x is the known probing data sets, which is equivalent to the data set 109, i.e. Sx.

The data sets 116, i.e. D'1-D'8, may be substantially equivalent to the output data sets, i.e. D1-D8, respectively if not contaminated. Thereby, the recovered data sets 114, i.e. S'1-S'5, if not contaminated, may be substantially equivalent to the data sets, i.e. S1-S5, respectively. There are many different combinations of taking 5 WF muxed sets 117 from 8 ones stored in the respective data mirroring sites 131-1 through 131-8. In this case, there are 56 possible combinations to be present. The modified WF demuxer 111 shall be designed to handle the all possible combinations. There are many different but equivalent methods/approaches of solving 5 simultaneous equations for 5 unknowns. Each of the retrieved data sets or video blocks 114, i.e. S'1-S'5 in the same time frame, may be a linear combination of the data sets 116, i.e. D'2, D'3, D'4, D'5 and D'8 in the same time frame, each weighted by a corresponding weighting parameter. Each of the retrieved data sets 114, i.e. S'1-S'5 in the same time frame, contains information associated with the data sets 116, i.e. D'2, D'3, D'4, D'5 and D'8 in the same time frame.

The recovered 5 parallel video substream blocks 114, i.e. S'1-S'5 in the same time frame, may be combined into a large data set U'1, i.e. 115, including 5 sequential video blocks, i.e. S'1-S'5, via the de-segmentation processor 112.

Figure 8A:
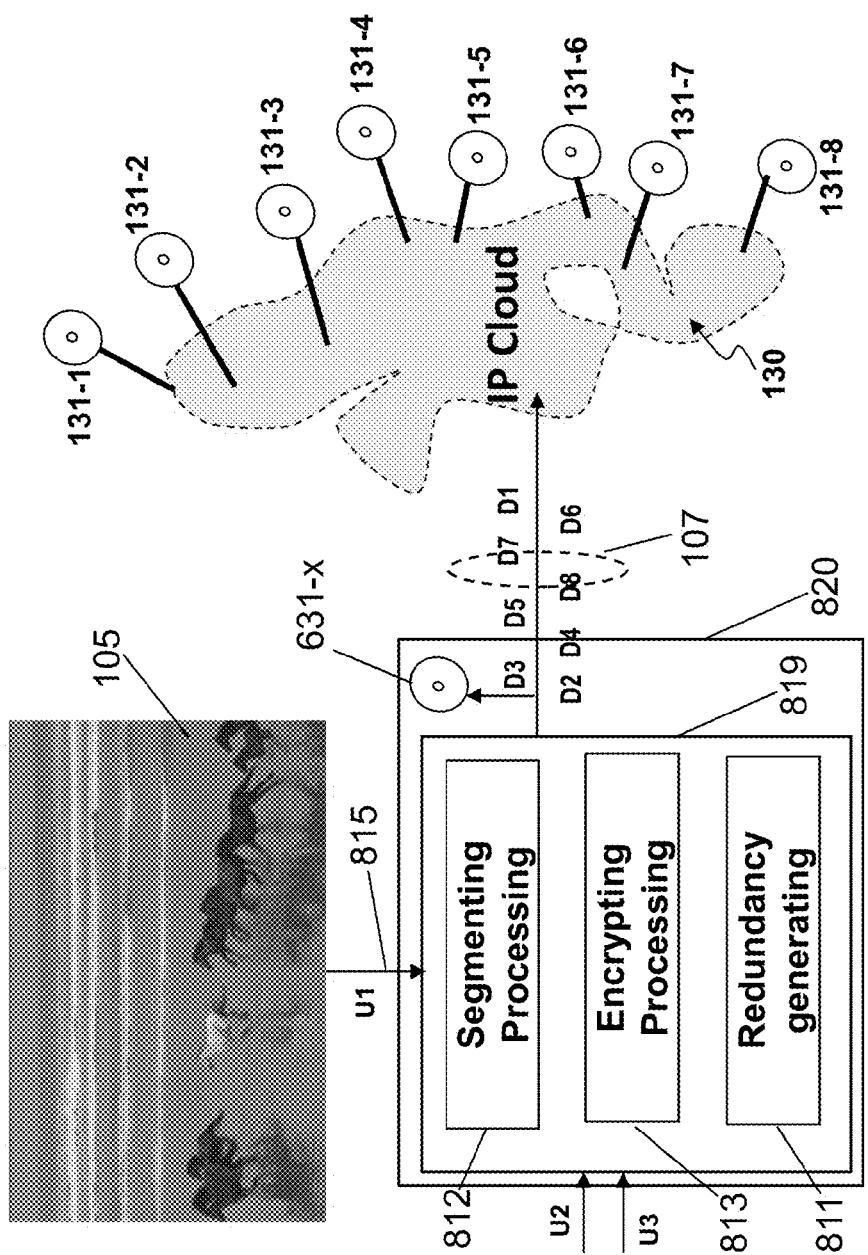
FIG. 8A depicts a function diagram of a preprocessing for distributed data storage on cloud for 1 user data set. These pre-processing functions include (1) segmentation, (2) encryptions, (3) redundancy for stored data, and (4) integrity monitoring on stored data.
Figure 8B:
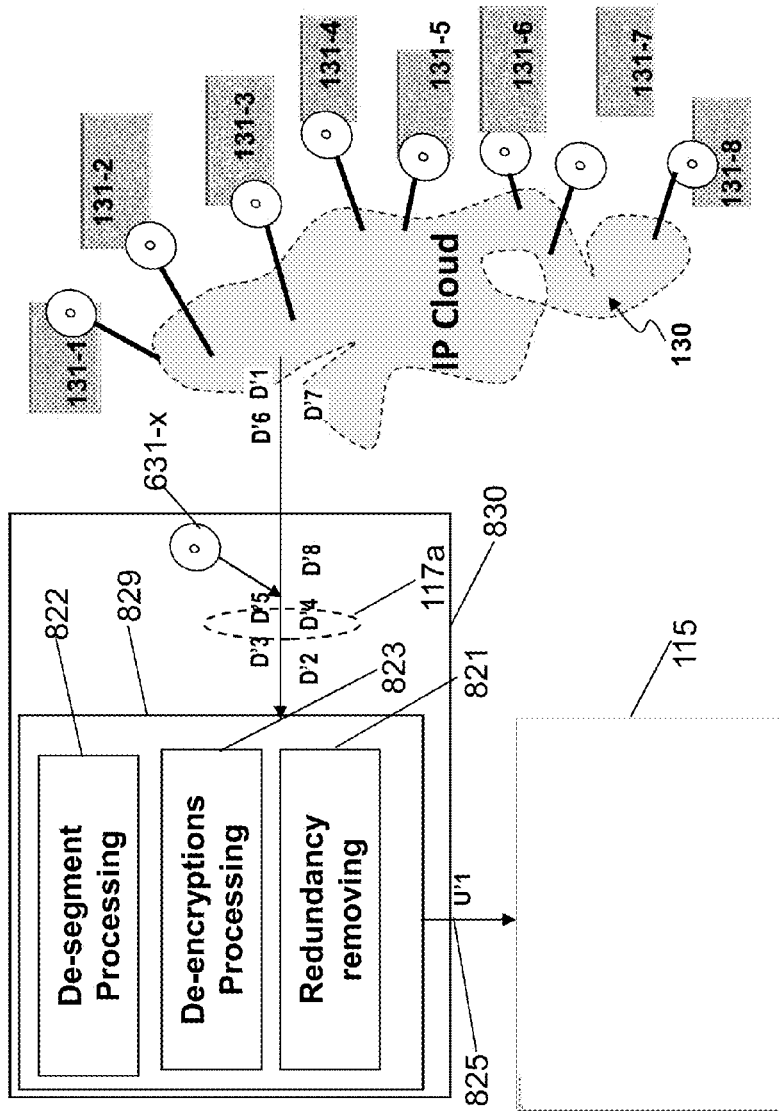
FIG. 8B depicts a function diagram of a post-processor on distributed data storage for 1 user data set. These post-processing functions include (1) data integrity verification, (2) removing redundancy, (3) decryptions, and (4) de-segmentation.

FIG. 8A and FIG. 8B depict multiple functions of the pre-storage processor 110 and the post-storage processor 120 for distributed data storages. In summary, referring to FIGS. 8A and 8B, in the pre-storage processor 110, there are three major functions: (1) segmenting 812, which may be performed by the above segmenting processor 102, (2) encrypting 813, which may be performed by the above WF muxer 101, and (3) redundancy generating 811, which may be performed for generating the above probing or diagnostic data set, i.e. Sx, and the "zero" data set. Besides the pre-storage processor 110, a pre-storage device 820 in a user device may further comprise local memories 631-x, as above mentioned as the local folders, which may be utilized as part of distributed storage.

In the post-storage processor 120, there are also three functions: (1) de-segmenting 822, which may be performed by the above de-segmenting processor 112, (2) de-encrypting 823, which may be performed by the above WF demuxer 111, and (3) redundancy removing 821, which may be performed for removing the above probing or diagnostic data set, i.e. Sx, and the "zero" data set. Besides the post-storage processor 120, a pre-storage device 830 in another user device may further comprise local memories 631-x, as above mentioned as the local folders, which may be utilized as part of distributed storage.

Figure 9B:
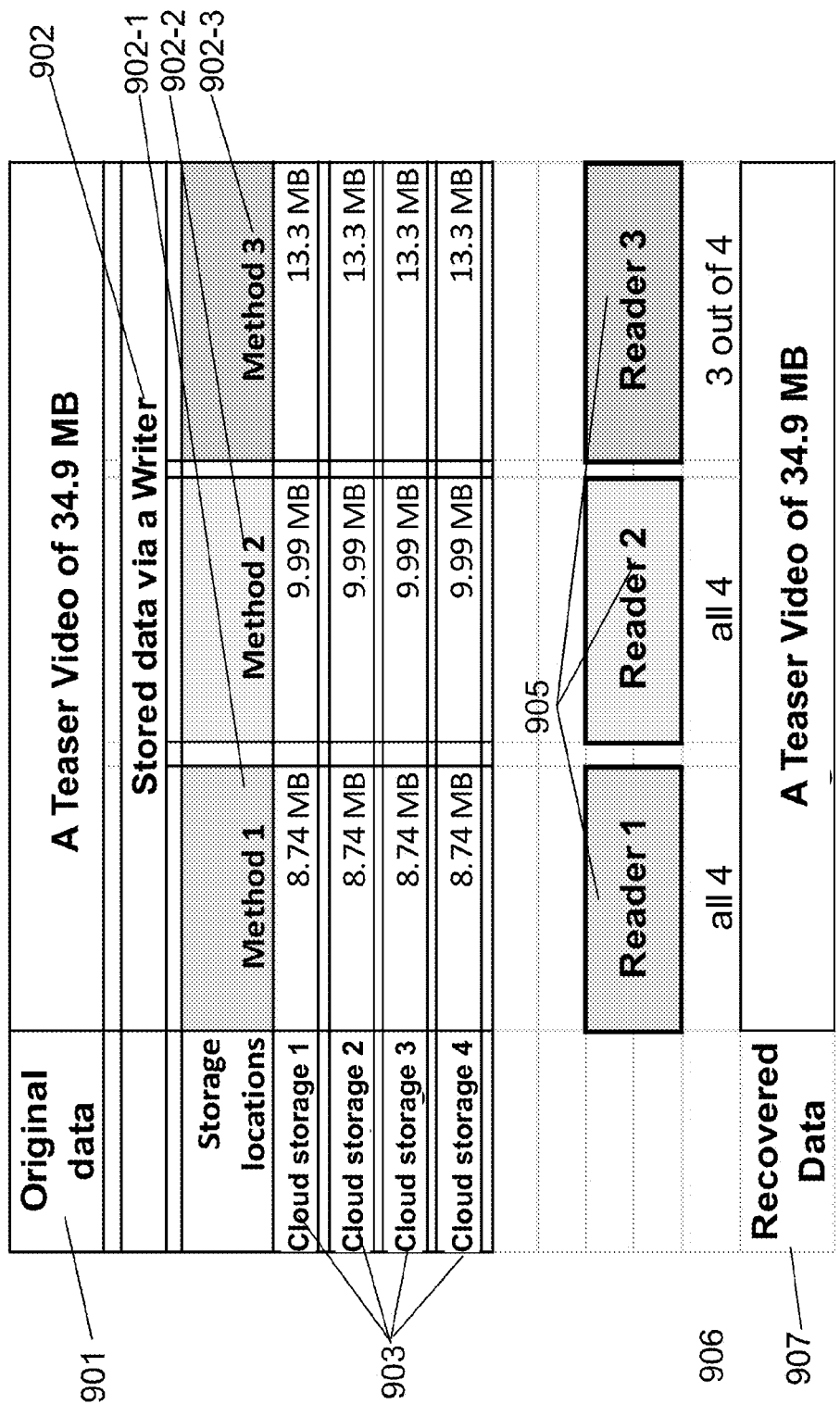
FIG. 9B compares the required storage sizes on cloud for the three storage methods for a video clip.

FIGS. 9A, 9B, and 9C depict three different examples of stored data or required memory sizes; each utilizing three different methods 902 on same data set 901 to achieve the goals of secured data storage. The three different methods 902 are (1) method 1 902-1 featuring a 1 to 4 segmentations only, (2) method 2 902-2 featuring a 1-to-4 segmentation and a 4-to-4 wavefront multiplexing, and (3) method 3 902-3 featuring a 1-to-3 segmentation with redundancy and a 4-to-4 Wavefront multiplexing. There are three corresponding readers 905 with key features 906 and output data or memory sizes 907. The three examples are for three very different inputs. Input for example 1 depicted in FIG. 9A features a file of 12 numerical numbers from 1 to 12. The 4 segmented subsets of the 12 numbers after preprocessed by a writer of method 1 902-1 are stored at 4 separated storage sites 903 on cloud. Each features 3 numerical numbers only; a first subset of [1, 5, 9] is placed in cloud storage 1, a second subset of [2, 6, 10] is placed in cloud storage 2, a third subset of [3, 7, 11] is placed in cloud storage 3, and a $4^{th}$ subset of [4, 8, 12] is placed in cloud storage 4. There are 12 numerical numbers at the inputs, and 12 stored on cloud for method 1. These 12 numbers are recoverable only by reader 1 of readers 905 as indicated in the output box 906 using all 4 stored data subsets 903.

Similarly, the 4 segmented subsets of the 12 digits after preprocessed by a writer of method 2 902-2 are stored at 4 separated storage sites 903 on cloud. Each also features three numerical numbers; a first subset placed in cloud storage 1 shall become [10, 26, 42], a second subset in cloud storage 2 shall be [−2, −2, −2], a third and a $4^{th}$ subsets in cloud storage 3 and 4 shall be [−4, −4, −4] and [0, 0, 0], respectively. There are 12 numerical numbers at the inputs, and 12 stored on cloud for method 2. These 12 numbers are recoverable only by reader 2 of readers 905 as indicated in the output box 906 using all 4 stored data subsets 903.

However, the 4 segmented subsets of the 12 numbers after preprocessed by a writer of method 3 902-3 are stored at 4 separated storage sites 903 on cloud. Each shall feature four (instead of three) numbers; a first subset placed in cloud storage 1 shall become [6, 15, 24, 33], a second subset in cloud storage 2 shall be [2, 5, 8, 11], a third and a $4^{th}$ subsets in cloud storage 3 and 4 shall be [0, 3, 6, 9] and [−4, −7, −10, −13], respectively. There are 12 numerical numbers total at the inputs, but there are 16 numbers total stored on cloud for method 3. These 12 original numbers are recoverable only by reader 3 of readers 905 as indicated in the output box 906, using any 3 of the 4 stored data subsets in 903.

FIG. 9B as a second example summarizes data storage sizes on an advertising video clip with a total length of 34.94 MB digital stream. Using method 1 902-1 for segmentation, each subsets stored on cloud storages 903 shall only feature a 8.735 MB digital substream. The original video is recoverable by a corresponding reader 1 of the readers 905 using all 4 subsets of stored data. The recovered video is identical to the original one. On the other hand via using method 2 902-2 for segmentation and WF muxing, each subsets stored on cloud storages 903 shall only feature a 9.99 MB digital substream. The 1.25 MB additional memory size increasing are the 12.5% (99.9-8.74)/99.9 arithmetic processing overhead as discussed earlier. The original video is recoverable by a corresponding reader 2 of the readers 905 using all 4 subsets of stored data. The recovered video shall be identical to the original one. When the video is preprocessed by method 3 902-3 featuring a 1-to-3 segmentation, a 4-for-3 redundancy, and a 4-to-4 WF muxing, there shall be 4 video subsets. Each subsets stored on cloud storages 903 shall only feature a 13.3. MB digital substream. The 3.3 MB and 1.25 MB additional memory size increasing are the 33.33% of 4-for-3 redundancy and the 12.5% (99.9-8.74)/99.9 arithmetic processing over-head as discussed earlier. The original video is recoverable by a corresponding reader 3 of the readers 905 using any 3 of the 4 subsets of stored data. The recovered video shall be identical to the original one.

FIG. 9C as a third example summarizes data storage sizes on storage of three independent videos each with a length slightly less than or equal to 11.7 MB digital stream. There is no segmentation processing at all. Thus method 1 and method two are not applicable. Using method 3 902-3 for a 4-for-3 redundancy and a 4-to-4 WF muxing, There shall be 4 subsets of preprocessed data; each subsets stored on cloud storages 903 shall only feature a 13.3 MB digital substream. The original video is recoverable by a corresponding reader 3 of the readers 905 using any 3 of the 4 subsets of stored data. The recovered video is identical to the original one. The three inputs feature 35.1 MB data streams and the stored data size is 4*13.3 MB or 53.2 MB. The additional memory comes from two sources: arithmetical processing overhead of 12.5% and a 4-for-3 redundancy of 33.3%.

The WF muxing and demuxing techniques enable concepts and associated methods of multicasting of independent multiple data sets to various independent groups via a common set of transporting data packages. The transporting data packages featuring redundancy are WF muxed data subsets from multiple data inputs designated to various targeted user groups. Various user groups with their own data strings are assigned to designated input ports of a common WF muxing processor at the sending end, and different customized receivers accessible only to various designated output ports of a corresponding common WF demuxing transformation. The WF muxing/demuxing transformations are remotely programmable and reconfigurable.

FIG. 9C summarizes the sizes of data packages of such an application, multicasting to 3 different user groups via a common set of 4 transporting packages; each shall receive independent data sets by collecting 3 of the 4 transporting packages. The three may be the leading (in time domain) three packages. Different users at various locations shall result with various sets of three packages. The remaining redundant one may be discarded or may be used for integrity checks, diagnostic, or other purposes which may not needed on every "frames" of multicasting. There shall be 24 different combinations of ranking 3 from 4 possible packages.

With regards to the above WF muxer, the WF muxer may alternatively perform a first non-orthogonal matrix on the inputs of the WF muxer. With regards to the above WF demuxer, the WF demuxer may alternatively perform a second non-orthogonal matrix, inverse to the first non-orthogonal matrix, on the inputs of the WF muxer.

The components, steps, features, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, benefits and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. Furthermore, unless stated otherwise, the numerical ranges provided are intended to be inclusive of the stated lower and upper values. Moreover, unless stated otherwise, all material selections and numerical values are representative of preferred embodiments and other ranges and/or materials may be used.

The scope of protection is limited solely by the claims, and such scope is intended and should be interpreted to be as broad as is consistent with the ordinary meaning of the language that is used in the claims when interpreted in light of this specification and the prosecution history that follows, and to encompass all structural and functional equivalents thereof.

What is claimed is:

1. A data storage method comprising:
    performing, by a device having a plurality of input ports, a wavefront multiplexing transformation on a plurality of first data sets representing input images having a camouflaging image and connected to the plurality of input ports, to generate a plurality of second data sets representing output images, wherein performing the wavefront multiplexing transformation comprises computing a weighted sum of the first data sets in a unique weighting distribution using an emphasizing factor greater than 2 applied to the camouflaging image such that the output images have appearance of the camouflaging image, and wherein the number of the second data sets is equal to the number of the first data sets; and
    storing one or more of the second data sets in one or more local folders synchronized with one or more separate storage devices in a network cloud via a network.

2. The data storage method of claim 1, wherein the emphasizing factor ranges from 3 to 100.

3. The data storage method of claim 1, wherein at least one of the first data sets comprises a known a priori data set.

4. The data storage method of claim 1, wherein at least one of the first data sets is a null data set.

5. The data storage method of claim 1, wherein performing the wavefront multiplexing transformation on the first data sets to generate the second data sets comprises performing an orthogonal matrix transform on the first data sets.

6. The data storage method of claim 1, wherein performing the wavefront multiplexing transformation on the first data sets to generate the second data sets comprises performing a Hadamard transform on the first data sets.

7. The data storage method of claim 1, wherein performing the wavefront multiplexing transformation on the first data sets to generate the second data sets comprises performing a Fourier transform on the first data sets.

8. The data storage method of claim 1, wherein performing the wavefront multiplexing transformation on the first data sets to generate the second data sets comprises performing a non-orthogonal full-rank matrix transform on the first data sets.

9. The data storage method of claim 1, wherein the first data sets comprise at least one redundant data set.

10. A data transport method comprising:
    retrieving a plurality of first data sets from one or more local folders that are synchronized with one or more separate storage devices in a network cloud via a network, the plurality of first data sets representing input images obtained by a wavefront multiplexing transformation using a camouflaging image with an emphasizing factor greater than 2; and
    performing, by a device having a plurality of input ports, a wavefront demultiplexing transformation on the retrieved first data sets connected to the plurality of input ports to generate a plurality of second data sets representing recovered images, wherein performing the wavefront demultiplexing transformation comprises computing a weighted sum of the first data sets in a unique weighting distribution using a contracting factor being inverse of the emphasizing factor and applied to the input images, and wherein the number of the second data sets is equal to the number of the first data sets.

11. The data transport method of claim 10, wherein the emphasizing factor ranges from 3 to 100.

12. The data transport method of claim 10, wherein at least one of the first data sets comprises a known a priori data set.

13. The data transport method of claim 10, wherein at least one of the first data sets is a null data set.

14. The data transport method of claim 10, wherein performing the wavefront demultiplexing transformation on the first data sets to generate the second data sets comprises performing an inverse orthogonal matrix transform on the first data sets.

15. The data transport method of claim 10, wherein performing the wavefront demultiplexing transformation on the first data sets to generate the second data sets comprises performing an inverse Hadamard transform on the first data sets.

16. The data transport method of claim 10, wherein performing the wavefront demultiplexing transformation on the first data sets to generate the second data sets comprises performing an inverse Fourier transform on the first data sets.

17. The data transport method of claim 10, wherein performing the wavefront demultiplexing transformation on the first data sets to generate the second data sets comprises performing an inverse non-orthogonal full-rank matrix transform on the first data sets.

18. The data transport method of claim 10, wherein the first data sets comprise at least one redundant data set.

19. The data transport method of claim 10 further comprising:
comparing one of the second data sets to one of known data sets to monitor data integrity.

20. An apparatus comprising:
a processor; and
a memory storing a program that, when executed by the processor, causes the processor to perform operations comprising:
performing a wavefront multiplexing transformation on a plurality of first data sets representing input images having a camouflaging image to generate a plurality of second data sets representing output images, wherein performing the wavefront multiplexing transformation comprises computing a weighted sum of the first data sets in a unique weighting distribution using an emphasizing factor greater than 2 applied to the camouflaging image such that the output images have appearance of the camouflaging image, and wherein the number of the second data sets is equal to the number of the first data sets; and
storing one or more of the second data sets in one or more local folders synchronized with one or more separate storage devices in a network cloud via a network.

21. The apparatus of claim 20, wherein the emphasizing factor ranges from 3 to 100.

* * * * *